(12) United States Patent
Johnson et al.

(10) Patent No.: US 9,129,107 B2
(45) Date of Patent: Sep. 8, 2015

(54) DOCUMENT ENCRYPTION AND DECRYPTION

(75) Inventors: Michael E. Johnson, Jackson, MI (US); Kenneth L. Wilson, Albion, MI (US)

(73) Assignee: SECURENCRYPT, LLC, Jackson, MI (US)

( * ) Notice: Subject to any disclaimer, the term of this patent is extended or adjusted under 35 U.S.C. 154(b) by 91 days.

(21) Appl. No.: 13/371,021

(22) Filed: Feb. 10, 2012

(65) Prior Publication Data

US 2012/0210126 A1 Aug. 16, 2012

Related U.S. Application Data

(60) Provisional application No. 61/463,023, filed on Feb. 10, 2011.

(51) Int. Cl.
*G06F 21/00* (2013.01)
*G06F 21/52* (2013.01)
*G06F 17/30* (2006.01)

(52) U.S. Cl.
CPC ............... *G06F 21/52* (2013.01); *G06F 17/30* (2013.01)

(58) Field of Classification Search
CPC .......... G06F 21/52; G06F 21/24; G06F 17/30
USPC .............. 713/165, 167, 168; 726/29; 709/206
See application file for complete search history.

(56) References Cited

U.S. PATENT DOCUMENTS

| | | | |
|---|---|---|---|
| 2002/0078351 A1* | 6/2002 | Garib | 713/168 |
| 2003/0115490 A1* | 6/2003 | Russo et al. | 713/202 |
| 2003/0135565 A1* | 7/2003 | Estrada | 709/206 |
| 2005/0235163 A1* | 10/2005 | Forlenza et al. | 713/193 |
| 2006/0075228 A1* | 4/2006 | Black et al. | 713/167 |
| 2008/0134347 A1* | 6/2008 | Goyal et al. | 726/29 |
| 2010/0274721 A1* | 10/2010 | Hammad | 705/44 |
| 2011/0184982 A1* | 7/2011 | Adamousky et al. | 707/776 |

* cited by examiner

*Primary Examiner* — Syed Zaidi
(74) *Attorney, Agent, or Firm* — Warn Partners, P.C.

(57) ABSTRACT

A document encryption and decryption system and method for selectively encrypting and decrypting files and attachments, electronic mail, text messages, and any other items to protect or secure its contents by helping to prevent unauthorized individuals from viewing data in human-perceivable or readable form. The encryption and decryption system includes remote authentication to verify user credentials stored on a remote database hosted by a web server. The encryption system further includes remote deletion to automatically delete at least encrypted items stored on the user's computer, handheld or portable device, smartphone, tablet, and any other computer of any kind when enabled and logged onto a network. The encryption and decryption system includes selectively decrypting items by retrieving a decryption key and decrypting the item, and/or typing a decryption key if the item cannot be decrypted with the key, and/or sending an invitation to a recipient using the web server.

33 Claims, 39 Drawing Sheets

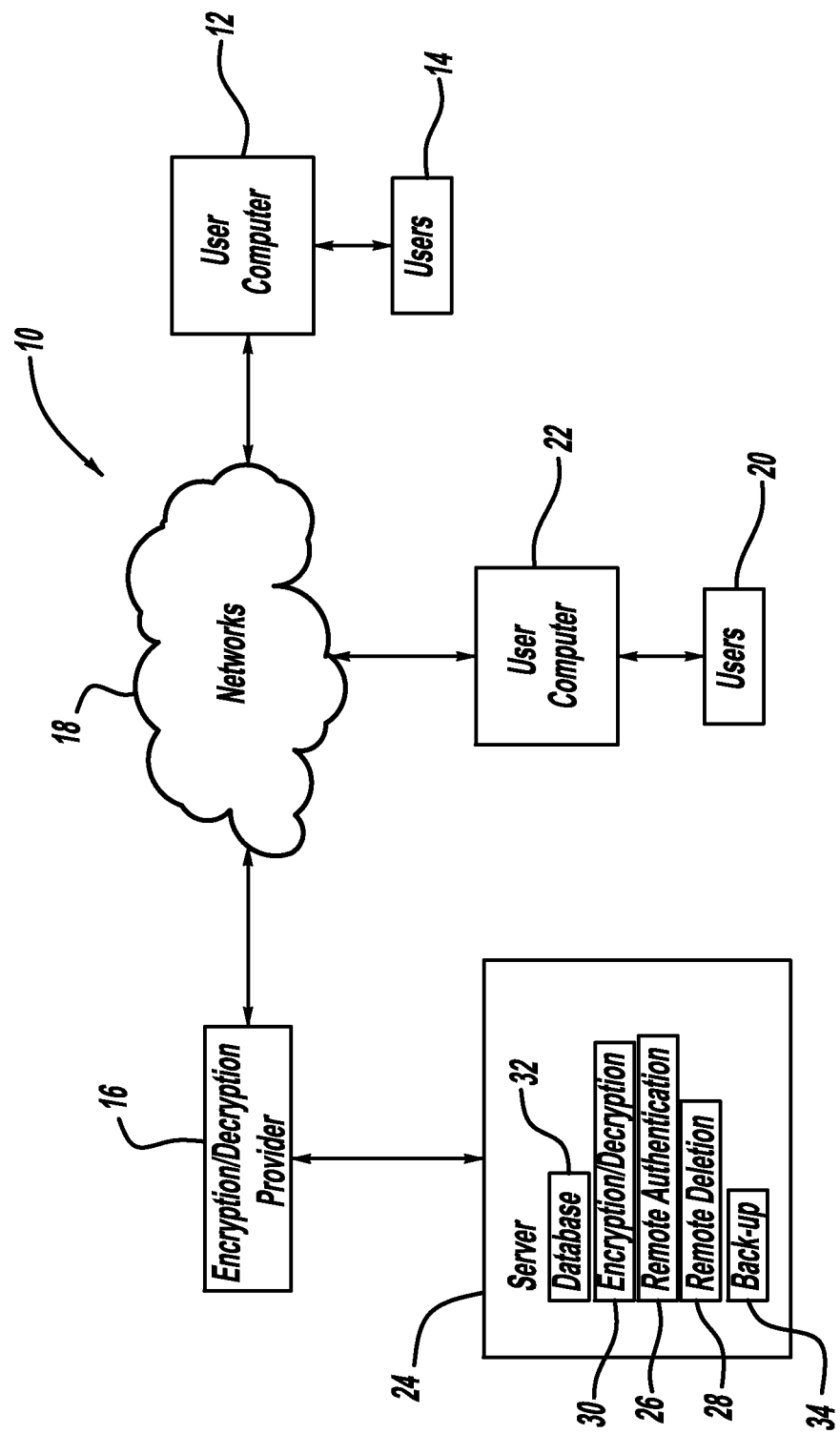

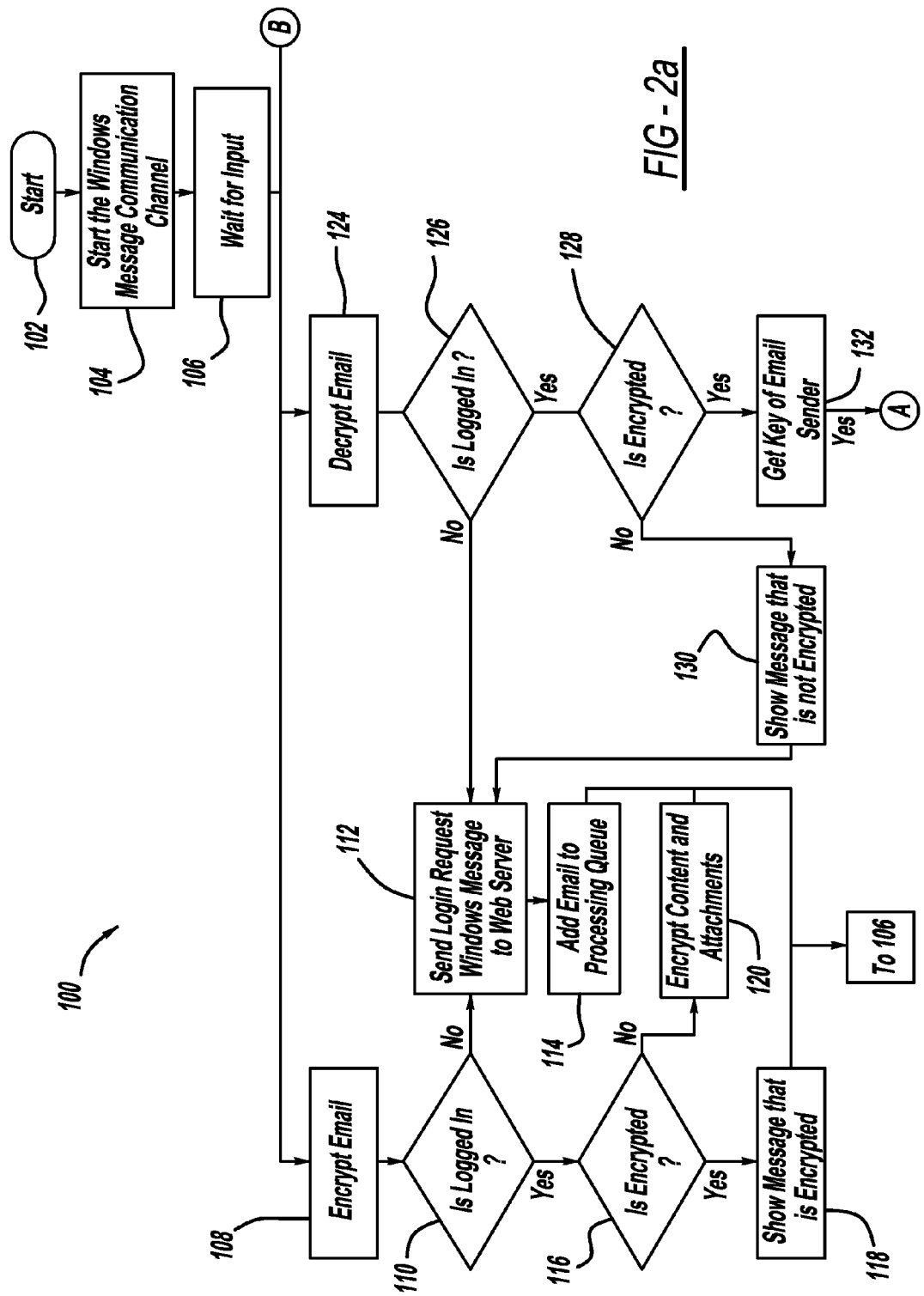

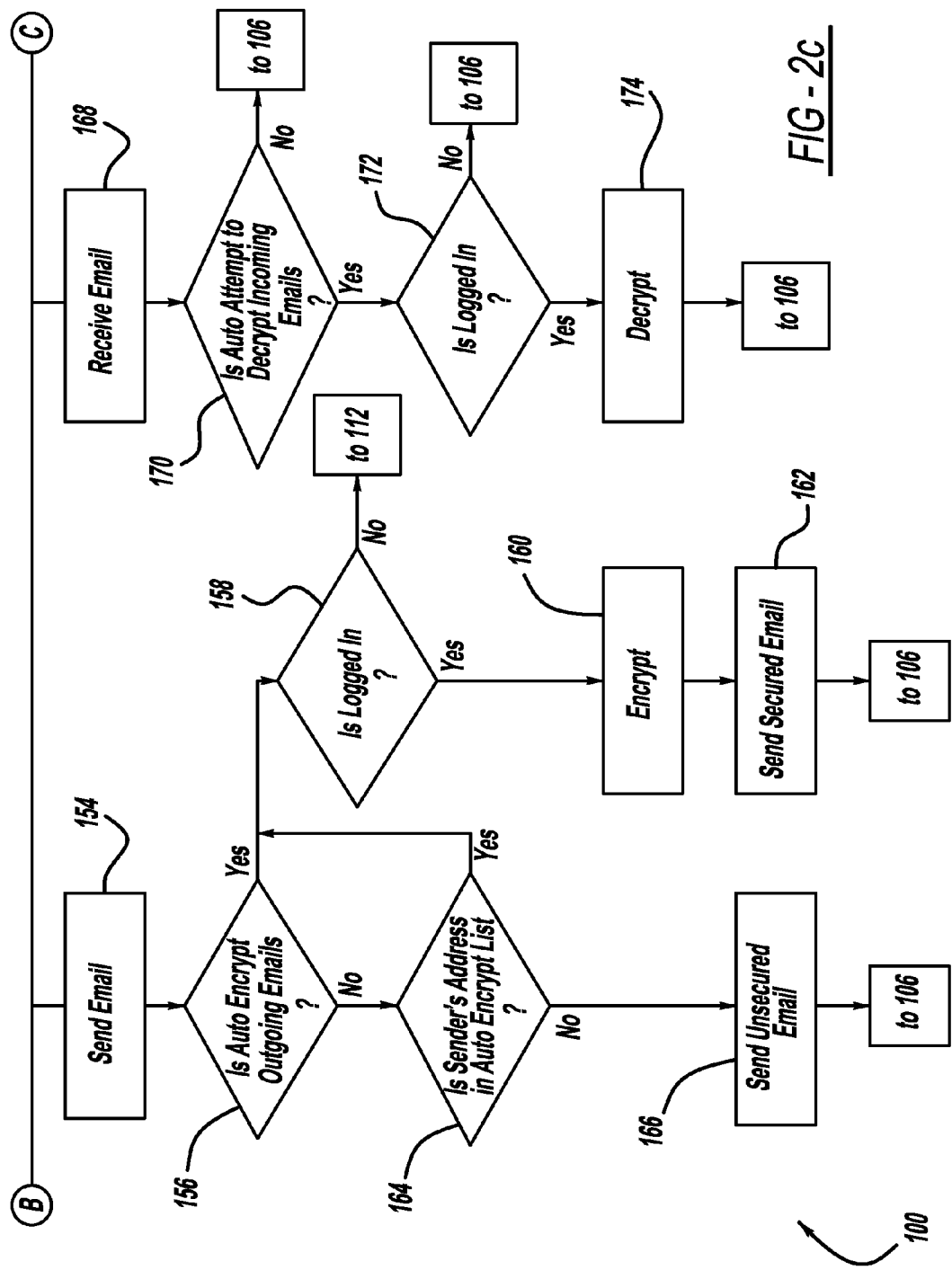

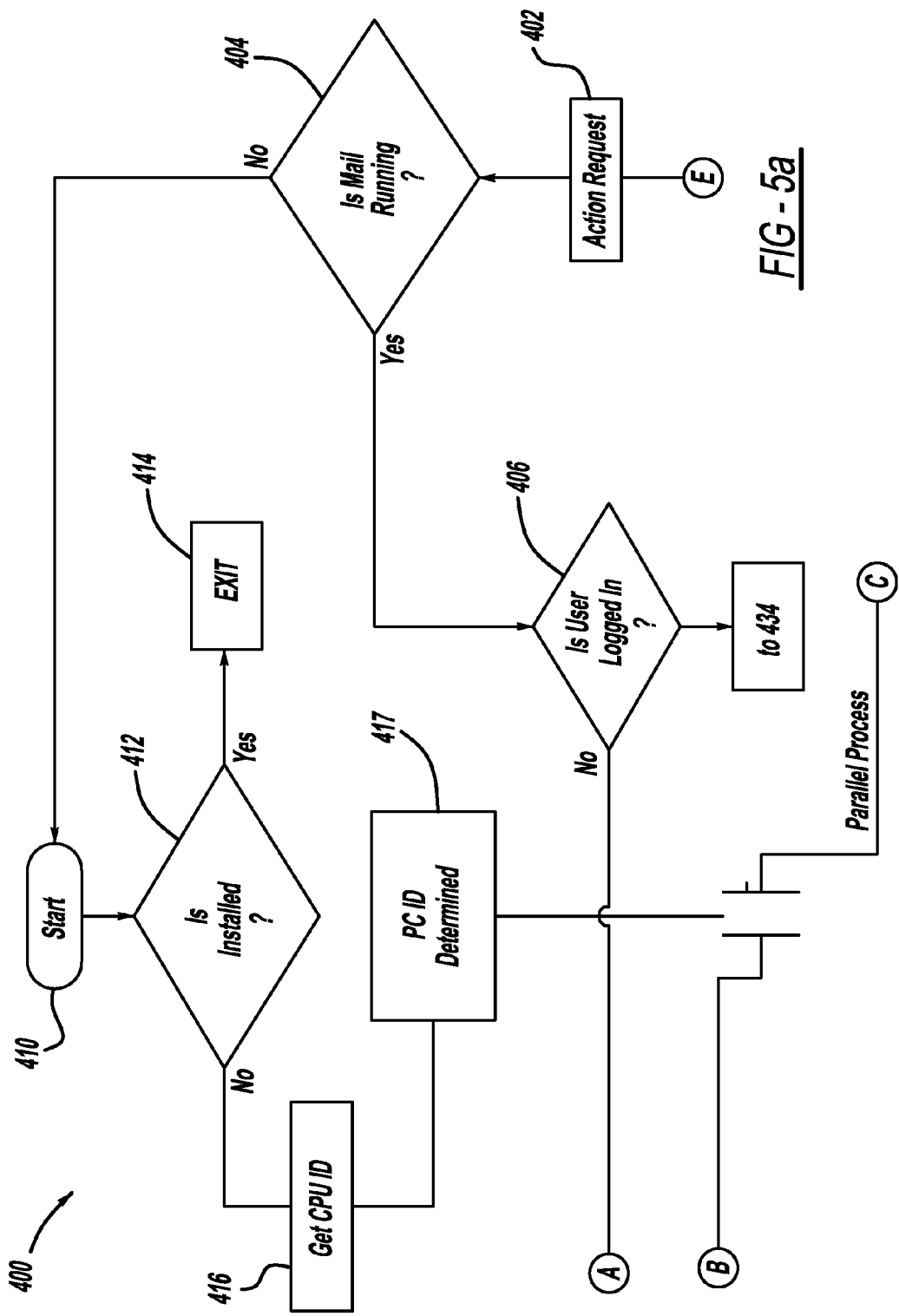

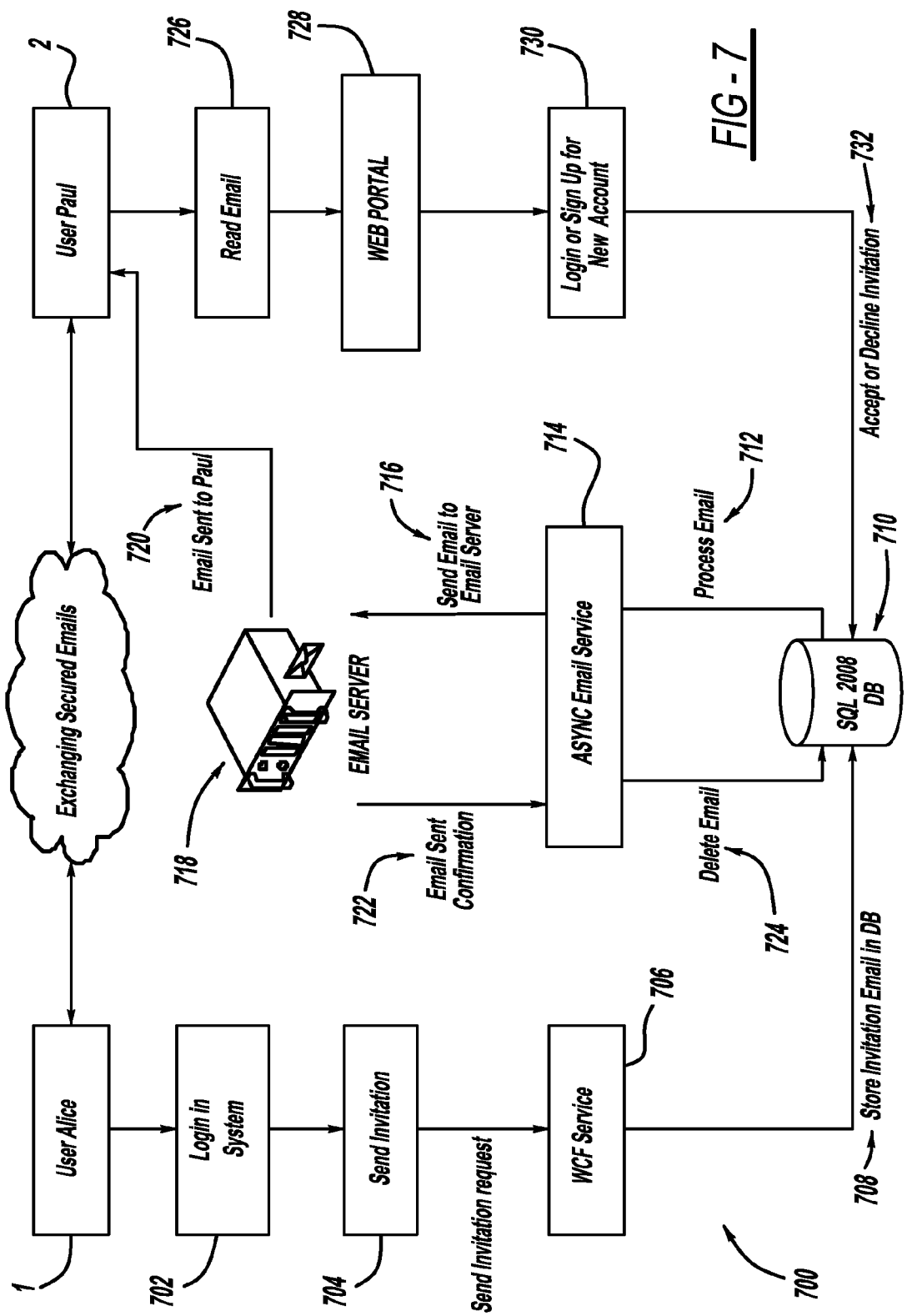

DOCUMENT ENCRYPTION AND DECRYPTION

CROSS-REFERENCE TO RELATED APPLICATION

The instant application claims priority to U.S. Provisional Patent Application Ser. No. 61/463,023, filed Feb. 10, 2011, the entire specification of which is expressly incorporated herein by reference.

FIELD OF THE INVENTION

The present invention relates to an encryption system for encrypting and decrypting files and Method for same.

BACKGROUND OF THE INVENTION

Some of the common problems with known encryption and decryption methods are that it is a difficult and time consuming process for a user to accomplish, which requires training, is not easily implemented, and is usually difficult, typically requiring several steps in order to encrypt a data file, e.g., 4-5 steps to navigate using the computer's mouse when attempting to set up for encryption/decryption and/or to encrypt/decrypt the file itself. Another common problem with conventional encryption applications is that the authentication data, e.g., password(s), name, address, secret answer, and the like, are stored on the user's personal computer allowing for a computer hacker or other unauthorized or malicious individual to break the protection and have access to the user's credentials. Ordinary encryption methods are inefficient in preventing such unauthorized individuals from embedding the key thereby allowing unauthorized access to the data file. In addition, it is also well known that any protection algorithm can be broken in a certain amount of time, e.g., time can vary from hours to years and thousands of years. Thus, security features like computer logins can be ineffective. Also, typical encryption only encrypts the communication and does not allow for remote deletion of encrypted files when the user's computer is lost or stolen. Attachments and an electronic (email) message are also typically not able to be bundled together for encrypting the whole message via Webmail. Typical encryption is also not available or compatible with mobile devices and does not pair encryption/decryption with a remote deletion feature. Typical encryption does not backup encrypted files on a remote server. Another common problem with typical encryption is that it does not automatically re-encrypt a data file upon a user closing out of the data file, thereby allowing its contents to be viewed by an unauthorized individual, e.g., by computer hacking remotely in a wireless communication environment. Accordingly, the need emerged for development of an affordable encryption system that is more effective, easier to use, and which provides secure user authentication and automatic remote deletion of files.

SUMMARY OF THE INVENTION

In accordance with the present invention an encryption system and method have been developed for encrypting and decrypting any type of file to protect or secure its contents by helping to prevent unauthorized individuals from viewing data in human-perceivable or readable form. In the event that a hacker or other unauthorized party tries to access information on a computer, they will not be able to easily view or read the encrypted information. It will appear to them as a jumbled series of letters, numbers and symbols. Thus, encrypted information can be useless to any intruder who is targeting personal, sensitive, and/or private information. A decryption key and/or "handshake" process allows encrypted files stored and/or emailed or otherwise transmitted to be selectively decrypted.

Generally, for file processing the user can request encryption, decryption, and/or opening a file. By way of non-limiting example, the authorized user creating a smartphone message, e.g., a SMS text message on an Android™, requests encryption, preferably with a "one-click" to encrypt touch screen button. Yet another non-limiting example is an invited user receives an encrypted email and can click a decrypt key to decrypt its contents, e.g., "one-cick" decrypt button on the mobile device touch screen.

Generally, the encrypting/decrypting processing steps can include getting a decryption key of an email sender and, if the key is retrieved, decrypting the email and/or typing a key if the email cannot be decrypted with the key, and/or sending a key invitation to the recipient using the web server ("handshake" process).

The present invention includes Remote Delete and Remote Authentication and includes an Internet Explorer™ Plug-in, as well as a reporting feature. A back up feature allows items to be stored on the remote server (not just a flash drive for example) and when a user obtains a new mobile phone or other computer, the user can log-in to retrieve the backed up items (e.g., to retrieve contact lists, files, photos, text messages). In addition, the items can be recovered no matter what mobile phone provider or carrier the user had/has (e.g., if a user had mobile phone carrier 1 before a smartphone was stolen and the user now has a new phone carrier 2, the user can recover their items for use with their new smartphone and phone carrier since they were backed up on the remote server; not by carrier 1). Additionally, the entire mobile phone is encrypted; not just the communication, e.g., all of a user's files, photos, contacts, everything is encrypted until the user logs on to decrypt. This is an important benefit over conventional systems which allowed any unauthorized person to pick up a mobile device and view its contents.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is schematic block diagram illustrating an exemplary encryption system network environment that may be used with various embodiments of the invention;

FIG. 2a is a schematic illustration of a portion of a flowchart of FIGS. 2a-2d illustrating primary processing steps of a file encryption and decryption system, in accordance with an embodiment of the present invention;

FIG. 2c is a schematic illustration of a portion of the flowchart of FIGS. 2a-2d illustrating primary processing steps of the file encryption and decryption system of the present invention;

FIG. 5a is a schematic illustration of a portion of a flowchart of FIGS. 5a-5d illustrating primary processing steps of a file encryption and decryption system including remote authentication and remote deletion that may be used with various embodiments of the invention;

FIG. 7 is a flowchart illustrating an invitation process of a file encryption and decryption system, in accordance with the present invention;

DETAILED DESCRIPTION OF THE PREFERRED EMBODIMENTS

Figure 2B:
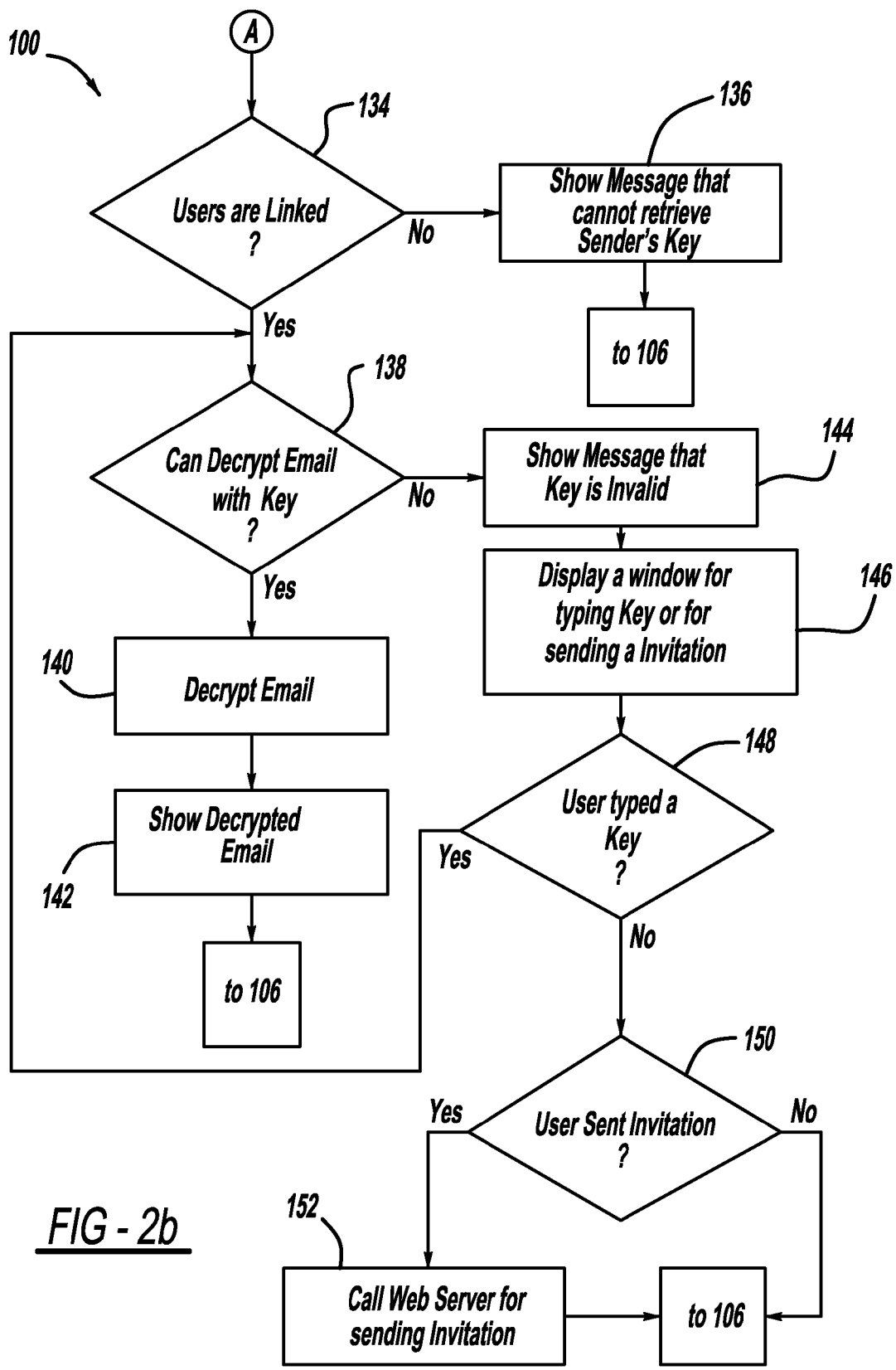
FIG. 2b is a schematic illustration of a portion of the flowchart of FIGS. 2a-2d illustrating primary processing steps of the file encryption and decryption system of the present invention.
Figure 2D:
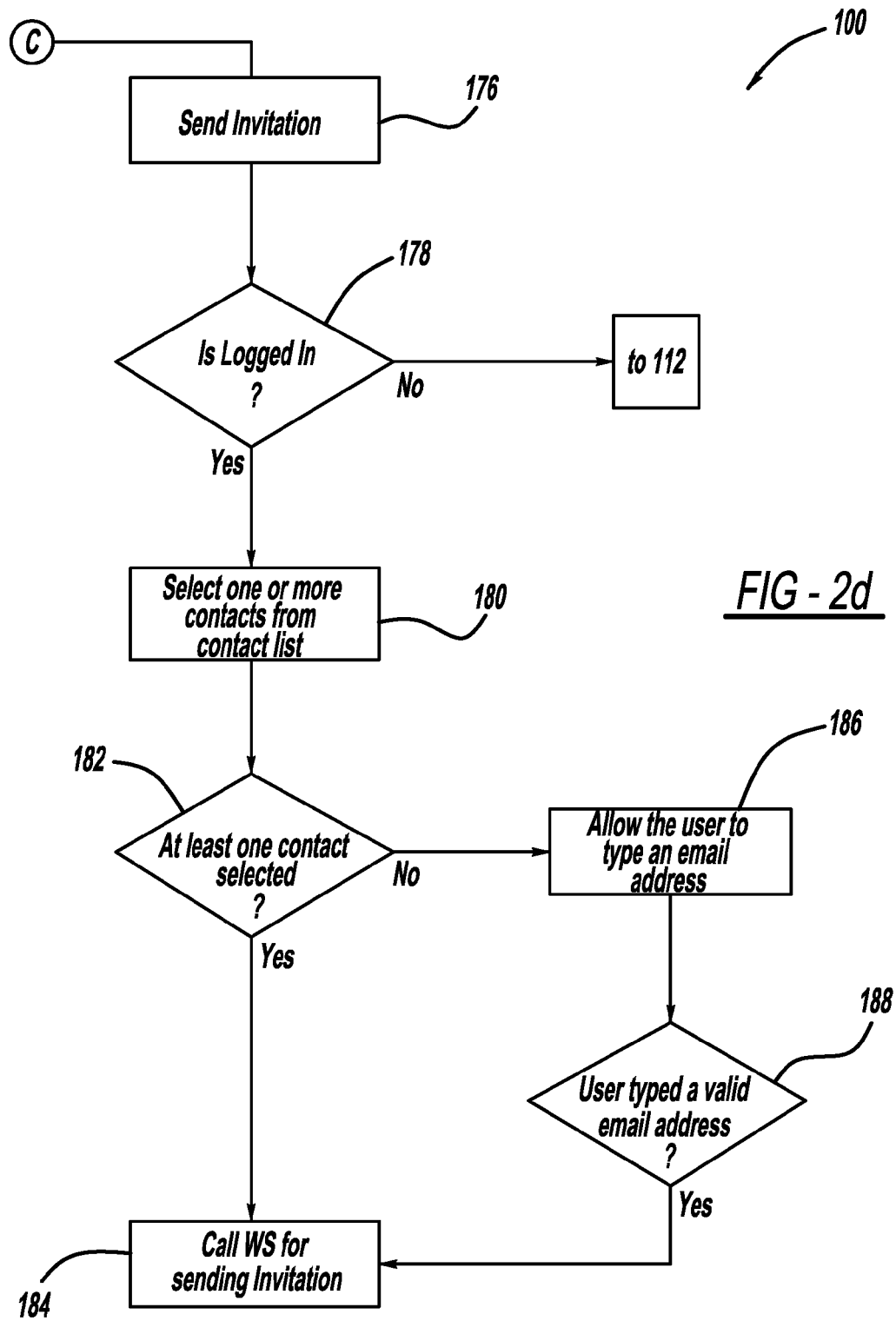
FIG. 2d is a schematic illustration of a portion of the flowchart of FIGS. 2a-2d illustrating primary processing steps of the file encryption and decryption system of the present invention.

The following description of the preferred embodiment(s) is merely exemplary in nature and is in no way intended to limit the invention, its application, or uses.

FIG. 1 illustrates an exemplary web-based encryption/decryption network environment, generally shown at 10, that may be used with various embodiments of the invention. At least one user computer(s) 12 of at least one user 14 is/are coupled to an encryption/decryption provider 16 via a communication network 18. Preferably, at least two users 14,20 with respective user computer(s) 12,22 are operably coupled to the encryption/decryption provider 16 via the communication network 18 for selective electronic communication. The encryption/decryption provider 16 can assemble, process, and store credentials, electronic mail (email), files, and attachments of the user 14,20 for use in providing authentication, communication and encryption/decryption services. The encryption/decryption network environment 10 further comprises at least one remote web server 24 coupled to the encryption/decryption provider 16 that includes at least remote authentication 26 of predetermined credentials, remote deletion 28 for selective deletion of at least encrypted files based on predetermined conditions, encryption and decryption 30 to selectively encrypt, decrypt, store, share and/or open files for user(s) 14,20. The web server 24 further comprises at least one database 32 for selectively compiling, storing, and/or processing user 14,20 emails, profiles and credentials and/or user computer 12,22 credentials and identification for selectively providing remote authentication, remote deletion, and encryption/decryption. In addition, the encryption/decryption provider 16 can assemble and store users) 14,20 files for providing a file back up 34 on the remote web server for providing retrieval and restoration of backed-up user 14,20 files if a user computer(s) 12,22 is lost, stolen, or otherwise compromised, and/or use of the device is discontinued by the user.

Redundant backup web servers and/or redundant internet connections can be used to help ensure users 14 can login at anytime for remote authentication and performing encryption and decryption. It is further understood that the web server 24 can typically include additional components or elements, e.g., processors, processing units, network connections, control circuitry, routers, hard drive and/or storage device(s), database(s), hardware, software, and etc and that the user computers 12 typically includes additional components, e.g., processors, processing units, monitors, network connections, e.g., for connecting to Internet, local area network, and/or intranet, USB ports, BUS, user interfaces/input devices, touch screens, hard drive and/or storage device(s), flash drives, and etc, and can utilize Web browsers and portals.

FIGS. 2a to 2d depicts a flowchart illustrating the steps when encrypting and/or decrypting and opening files, e.g., email(s) and/or attachment(s) for e-mail plug-ins, e.g., Microsoft Outlook™ Plug-in, generally shown at 100. The process begins (at 102) and a Microsoft® Windows Message Communication Channel (WCF) is started (at block 104) for processing messages, e.g., converting, and/or reading, and/or writing, and/or authenticating, and the like processing of messages from the network, and waits for input (at block 106) on what processing is requested. By way of non-limiting example, a user may wish to encrypt a newly drafted email for sending securely. If it is desired that the email be encrypted (block 108) and if it is determined that the user is not logged in (at decision 110), a login request is sent (at act 112) to the web server for remote authentication and the email is added to the processing queue (at act 114) for encryption. Once it is determined that the user is logged in (act 110) and if it is determined that the email is already encrypted (at decision 116), a message is shown that the email is encrypted (at act 118). The windows message communication channel (block 104) remains active and waits for additional input (block 106). If the user is logged in (act 110) and if it is determined that the email is not already encrypted (act 116), the email content and attachments are encrypted (at act 120) and a message is shown that the requested email encryption has been completed (at act 118). The windows message communication channel (block 104) remains active and waits for additional input (block 106).

If a user desires to decrypt and view an email (block 124) and if it is determined that the user is not logged in (at decision 126), a login request is sent (at act 112) to the web server for remote authentication and the email is added to the processing queue (at act 114) for encryption. Once it is determined that the user is logged in (act 126) and if it is determined that the email is not encrypted (at decision 128), a message is shown that the email is not encrypted (at act 130). If it is determined that the user is logged in (act 126) and if it is determined that the email is encrypted (act 128), the encryption key of the email sender is retrieved (at act 132) from the web server. If it is determined that the users are not linked (at decision 134), e.g., handshake and/or invitation process as will be explained in greater detail below, then a message is shown that the sender's key cannot be retrieved (at act 136). If it is determined that the users are linked, e.g., handshake and/or invitation, (at 134), then it is determined if the email can be decrypted using the retrieved key (at decision 138). If it is determined that the email can be decrypted using the retrieved key (at 138), the email is decrypted (at act 140) and the decrypted email is shown (at act 142), e.g., the content of the email and any attachments in viewable human-perceivable form. The windows message communication channel (block 104) can remain active and waits for additional input (block 106). If it is determined that the email cannot be decrypted using the retrieved key (at 138), a message is shown that the key is invalid (at act 144). A window is displayed (at act 146) for the user to type in a key, and/or send a user invitation, and/or call the web service for sending the invitation, e.g., WCF Service. If it is determined that the user typed in a key (at decision 148), the decrypted email is shown (at 142). If it is determined that the user did not type in a key (at 148), the user may send an invitation (at decision 150) and the web server is called for sending the invitation (at act 152). If the user does not type in a key the windows message communication channel (block 104) can remain active and waits for additional input (block 106).

If a user desires to send an email (block 154), e.g., automatically encrypted email, if it is determined that the automatic encryption of outgoing emails is on (at decisions 156) and if it is determined that the user is not logged in (at decision 158), a login request is sent (at act 112) to the web server for remote authentication and the email is added to the processing queue (at act 114) for encryption. Once it is determined that the user is logged in (act 158), the email content and attachments are encrypted (at act 160), and the encrypted email is sent (at act 162). The windows message communication channel (block 104) remains active and waits for additional input (block 106). If it is determined that the automatic encryption option for sending emails is not on for a user (at decisions 156), and if it is determined that that sender's address is not on the automatic encryption list (at decision 164) for automatic encryption, the email content and attachments will not be automatically encrypted and the unencrypted email is sent (at act 166). The windows message communication channel (block 104) remains active and waits for additional input (block 106).

If a user desires to decrypt and view an email (block 168), e.g., automatically decrypted email, if it is determined that the automatic decryption of incoming emails is on (at decisions 170) and if it is determined that the user is not logged in (at decision 172), the windows message communication channel (block 104) remains active and waits for additional input (block 106). If it is determined that the user is logged in (act 172), the email content and attachments are decrypted (at act 174). The windows message communication channel (block 104) remains active and waits for additional input (block 106). If it is determined that the automatic decryption option for sending emails is not on for a user (at 170), the email content and attachments will not be automatically decrypted, and the windows message communication channel (block 104) remains active and waits for additional input (block 106).

If a user desires to send an electronic invitation (block 176), if it is determined that the user is not logged in (at decision 178), a login request is sent (at act 112) to the web server for remote authentication and the email is added to the processing queue (at act 114) for encryption. Once it is determined that the user is logged in (act 178), the user selects at least one contact from a contact list (at act 180) that the user desires to send an invitation. If it is determined that the user selected at least one contact (at decision 182), the web server is called for sending the invitation (at act 184). If it is determined that the user did not select at least one contact (at 182), the user can type in an email address of the desired recipient (at act 186). Once it is determined that the user typed in a valid email address (at act 188), the web server is called for sending the invitation (at act 184).

It is understood that the encryption system and method is not limited to use with Microsoft Outlook™ plug-ins, and can be used with web-based email systems, e.g., Gmail™, Yahoo™, AOL™, Hotmail™, any web-based email system accessed using Internet Explore™ web browsers, and any other web-based email.

Referring to the figures generally, it is understood that an Internet Explorer™ Plug-in, e.g., used with Gmail™ and the like, allows a user to send/encrypt with a click of the mouse and/or touch screen and if the recipient also has the Internet Explorer™ plug-in, and/or the encryption/decryption system on their computer, they right-click to decrypt. The user does not have to send the decryption key in the email for example.

The recipient of the email receives an invitation from the sending user and if the invitation is accepted by the recipient, e.g., a "handshake" process, it is stored at the remote web server so that the users are linked with one another. Thus, the decryption key is stored on the remote server; not locally on the computer, e.g., not on the recipient's computer, for added security of the key and encrypted data. A user can also use different keys for different people for added security. A user can also selectively remove or delete their link with another person. It is further understood that the "handshake" process is not limited to being employed with Internet Explorer™ ActiveX™, and can be used in any alternative messaging environment, including, but not limited to, Mozilla Firefox™, Microsoft Outlook™, and etc.

Figure 3A:
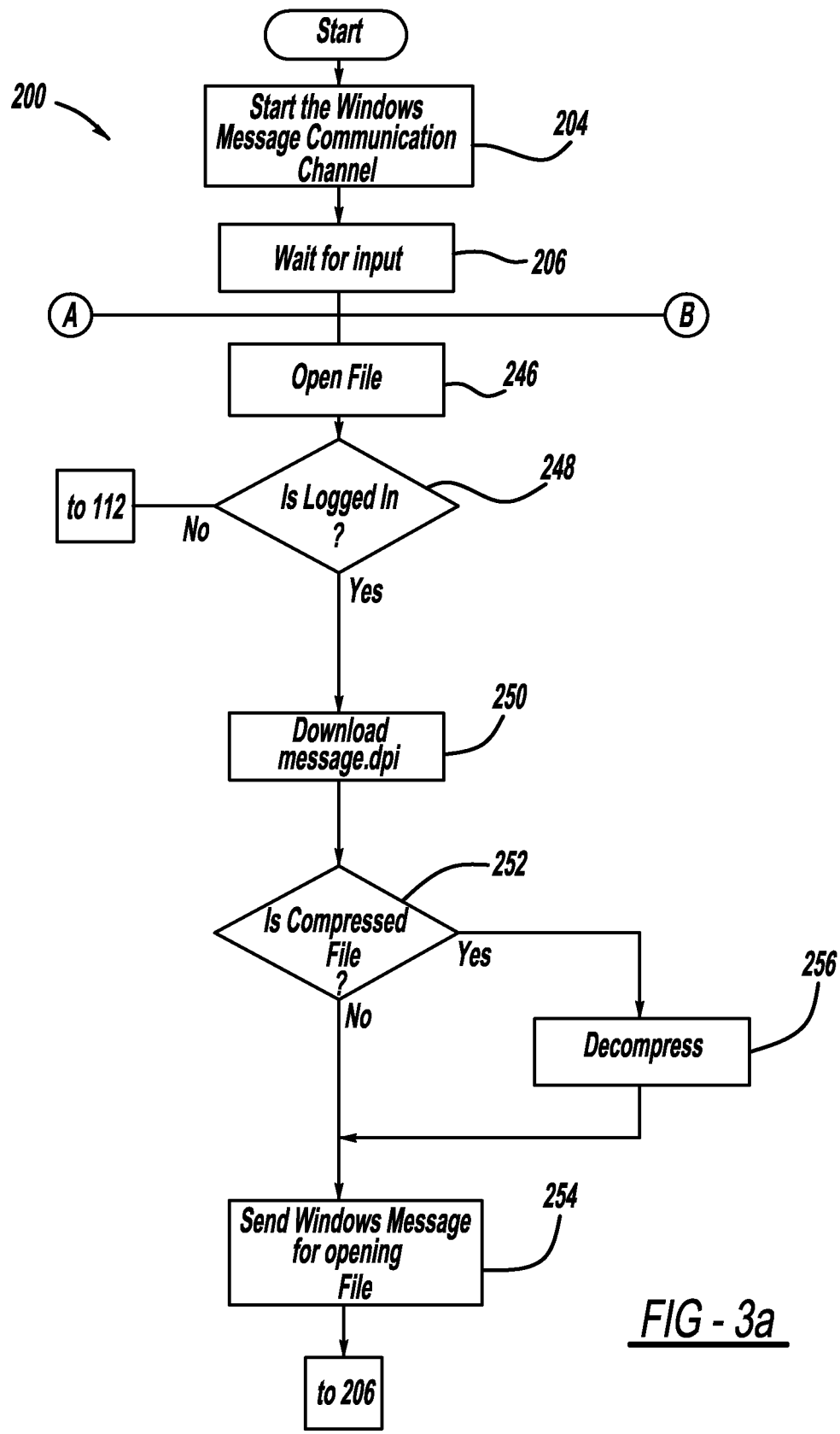
FIG. 3a is a schematic illustration of a portion of a flowchart of FIGS. 3a-3c illustrating primary processing steps of a file encryption and decryption system, in accordance with another embodiment of the present invention.
Figure 3B:
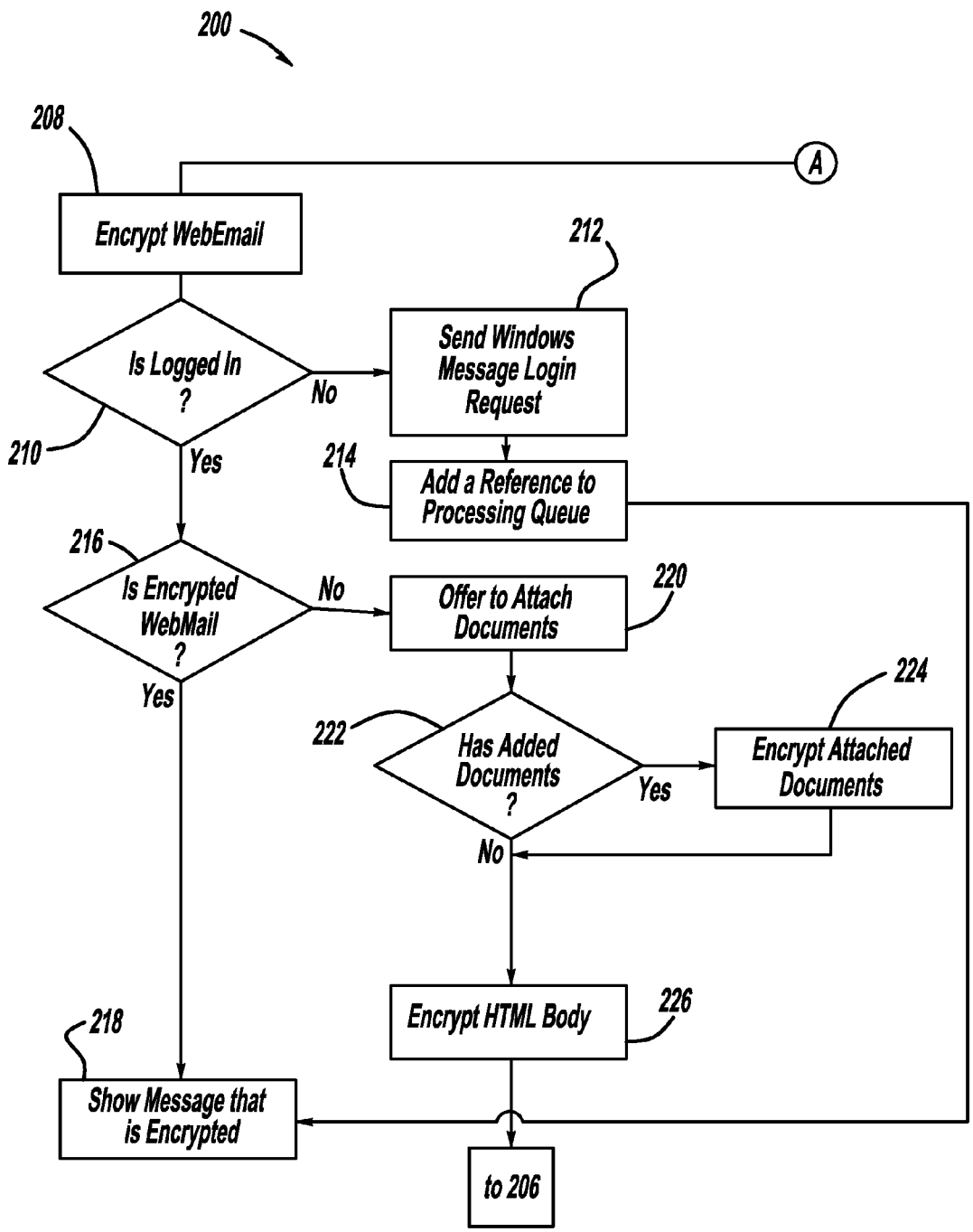
FIG. 3b is a schematic illustration of a portion of the flowchart of FIGS. 3a-3c illustrating primary processing steps of the file encryption and decryption system of the present invention.
Figure 3C:
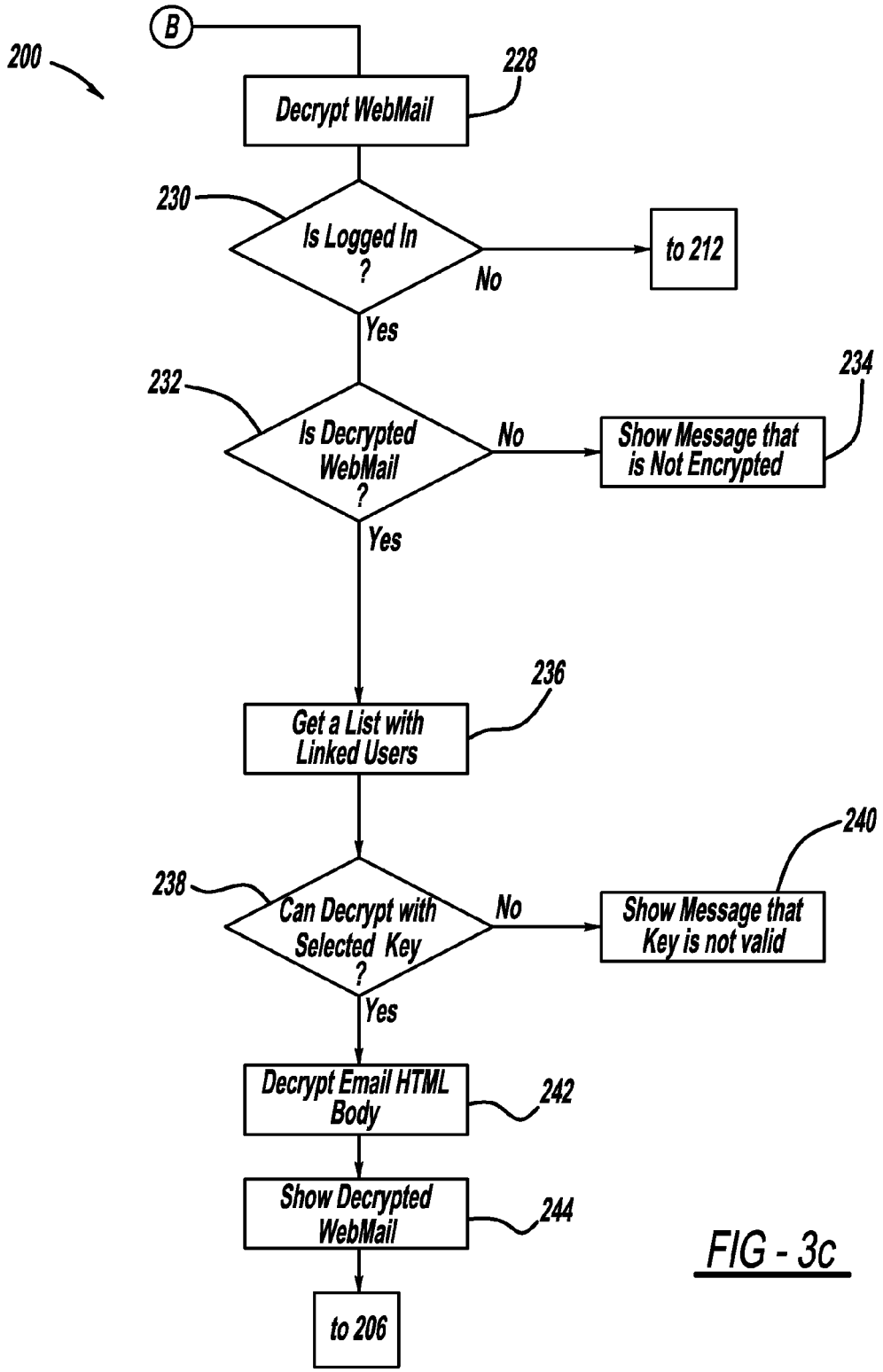
FIG. 3c is a schematic illustration of a portion of the flowchart of FIGS. 3a-3c illustrating primary processing steps of the file encryption and decryption system of the present invention.

Referring to FIGS. 3*a* to 3*c* generally, there is depicted a flowchart illustrating the steps performed for encrypting and/or decrypting and opening files, e.g., email(s) and/or attachment(s), for a web-based email plug-in, e.g., Microsoft® Internet Explorer Plug-in, generally shown at 200, in accordance with the present invention. The operations illustrated can be if implemented in at least the computer environment of the encryption system 10. Information and actions available to the user can be through graphical icons, touch screens, visual indicators, and other graphical user interfaces and combinations thereof. A windows message communication channel is started (at block 204) for processing messages, and waits for input (at block 206) on what type of processing is requested. A user may wish to encrypt a newly drafted Webmail (block 208) for secure sending by means of the Internet Explorer Active-X™ for example. If it is determined that the user is not logged in (at act 210), a login request is sent (at act 212) to the web server for remote authentication of the user's credentials and a reference of the Webmail is added to the processing queue (at act 214) for encryption. Once it is determined that the user is logged in (act 210) and if the Webmail is determined to be not encrypted (at decision 216), the user is offered to attach documents (at block 220). If the user has attached documents to the Webmail (at act 222), the attachments will be encrypted (at block 224) along with the process of encrypting the HTML (hypertext markup language) body of the Webmail (at block 226). Should the message be already encrypted (at act 216), a message is shown that the email is encrypted (at act 218). The windows message communication channel (block 204) remains active and waits for additional input (block 206).

If a user wishes to decrypt a Webmail (block 228) and if it is determined that the user is not logged in (at act 230), a login request is sent (at act 212) to the web server for remote authentication and a reference of the Webmail is added to the processing queue (at act 214) for decryption. If it is determined that the user is logged in (at 230) and if it is determined that the email is decrypted (at act 232), a message is shown that the email is not encrypted (at act 234). If it is determined that the user is logged in (act 230) and if the Webmail is decrypted (act 232), a list with linked users is retrieved (at act 236). If it is established that the Webmail cannot be decrypted by means of the selected encryption key of the email sender (at act 238), a message is shown informing that the used key is not valid (at act 240). In the scenario of linked users, the sender's key can be retrieved and used for email decryption by the recipient. If the Webmail can be decrypted using the selected key (at 238), the email HTML body is decrypted (at act 242) and presented to the user (at block 244), such that the Webmail can be viewable in human-perceivable form by the recipient.

If a user desires to open an email (at block 246) and if it is determined that the user is not logged in (at block 248), a login request is sent (at act 212) to the web server for remote authentication and a reference of the email is added to the processing queue (at act 214) for opening. If the user is logged in (at block 248), the Message.dpi, e.g., the message image, is downloaded (at act 250). If it is established that the file is compressed (at block 252), e.g., reducing the size of the file, it is decompressed (at act 256) and a Windows Message is sent for opening the file with the program (at act 254). If it is established that the file is not compressed (at block 252), a Windows Message is sent for opening the file with the program (at act 254).

Figure 4A:
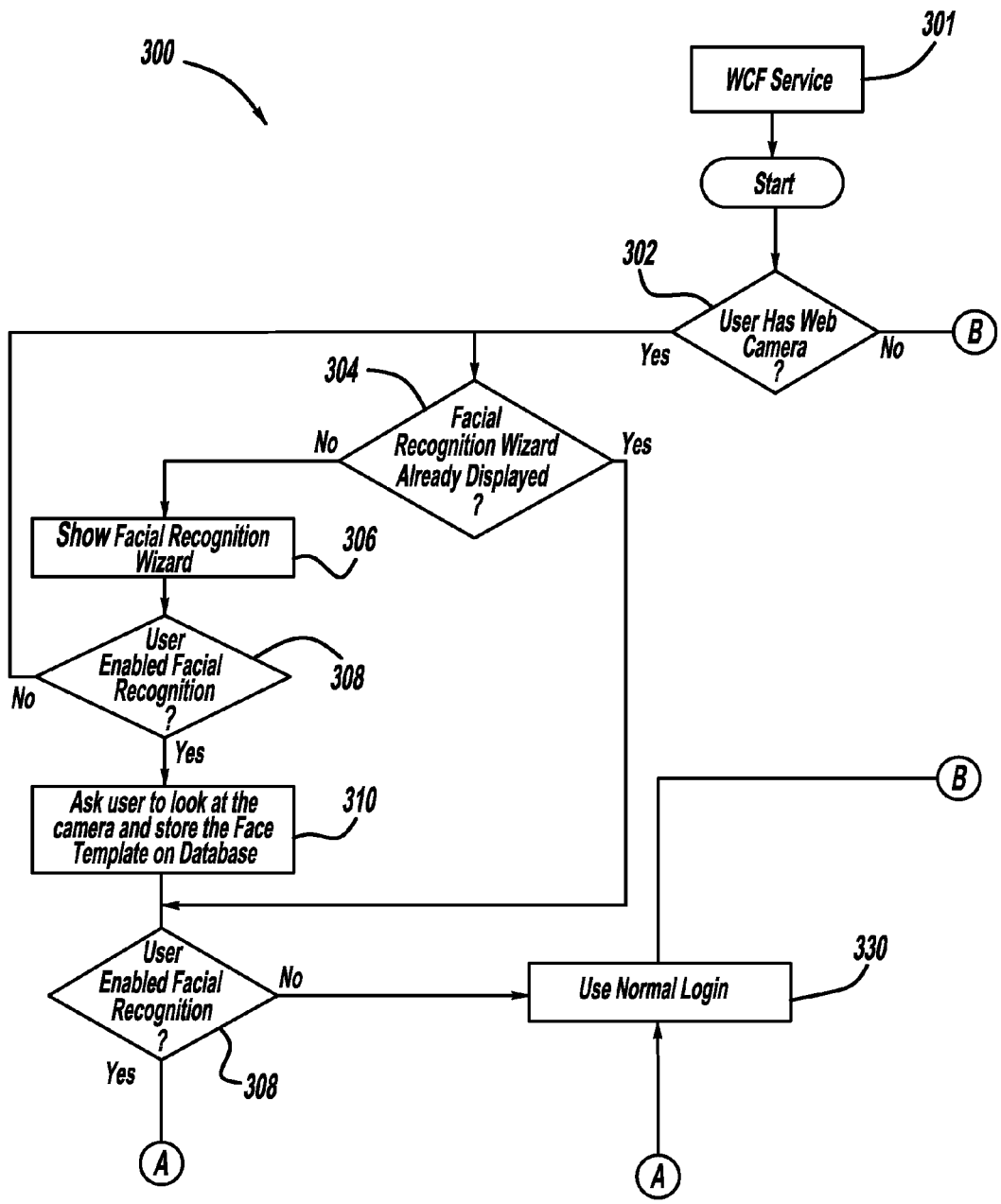
FIG. 4a is a schematic illustration of a portion of a flowchart of FIGS. 4a-4c illustrating primary processing steps of a remote authentication process of a file encryption and decryption system, in accordance with another embodiment of the present invention.
Figure 4B:
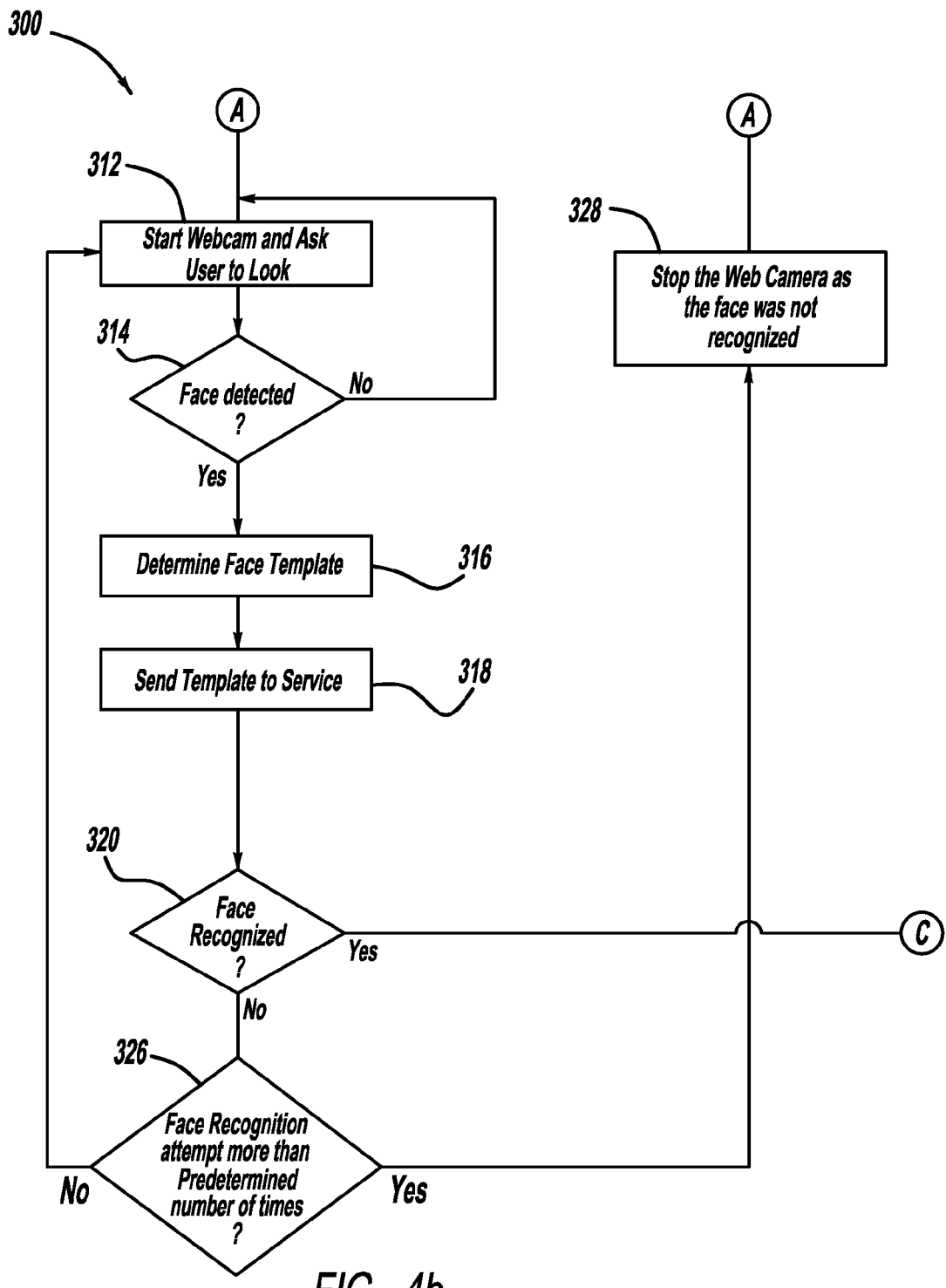
FIG. 4b is a schematic illustration of a portion of the flowchart of FIGS. 4a-4c illustrating primary processing steps of the remote authentication process of the present invention.
Figure 4C:
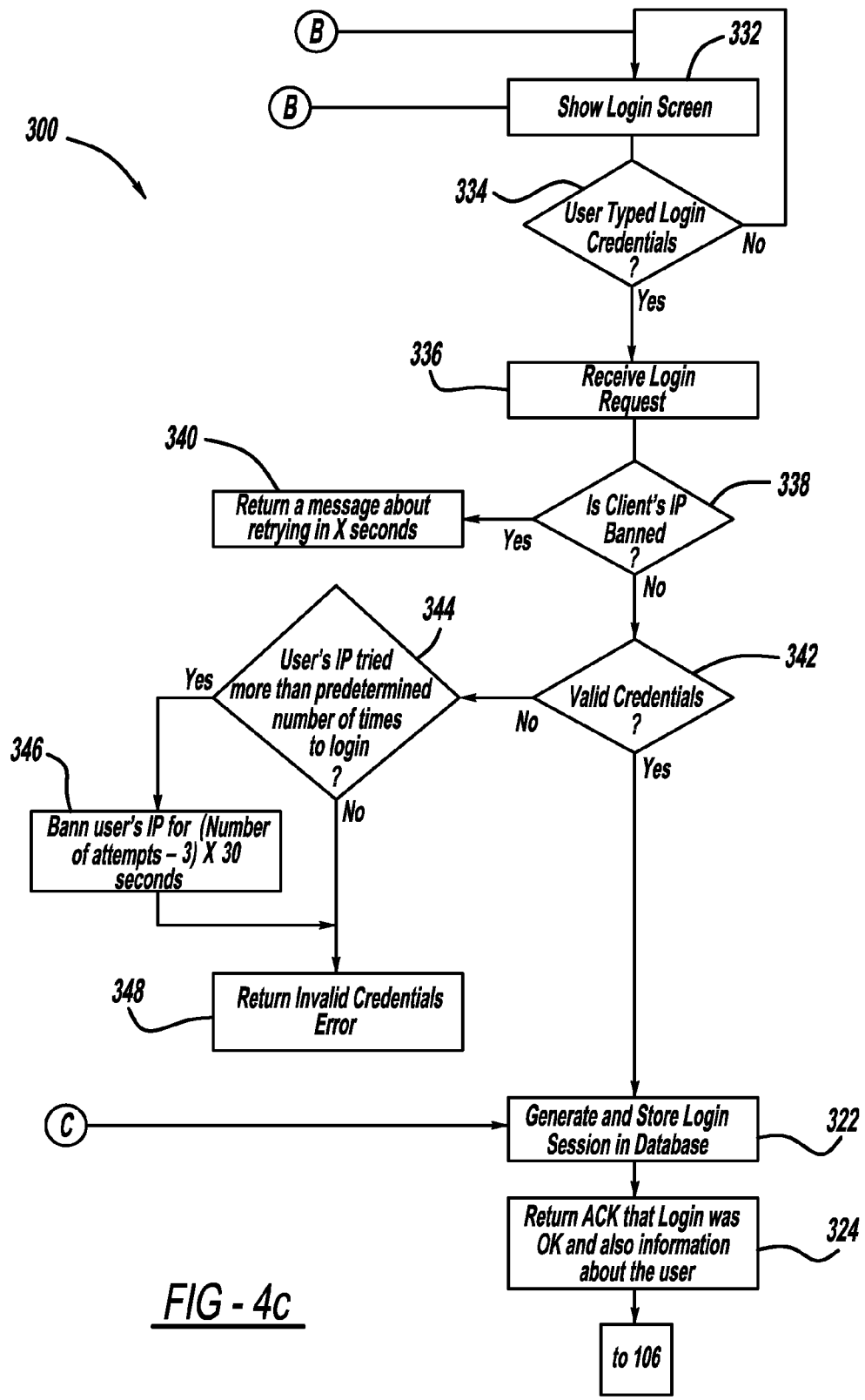
FIG. 4c is a schematic illustration of a portion of the flowchart of FIGS. 4a-4c illustrating primary processing steps of the remote authentication process of a file encryption and decryption system of the present invention.
Figure 5B:
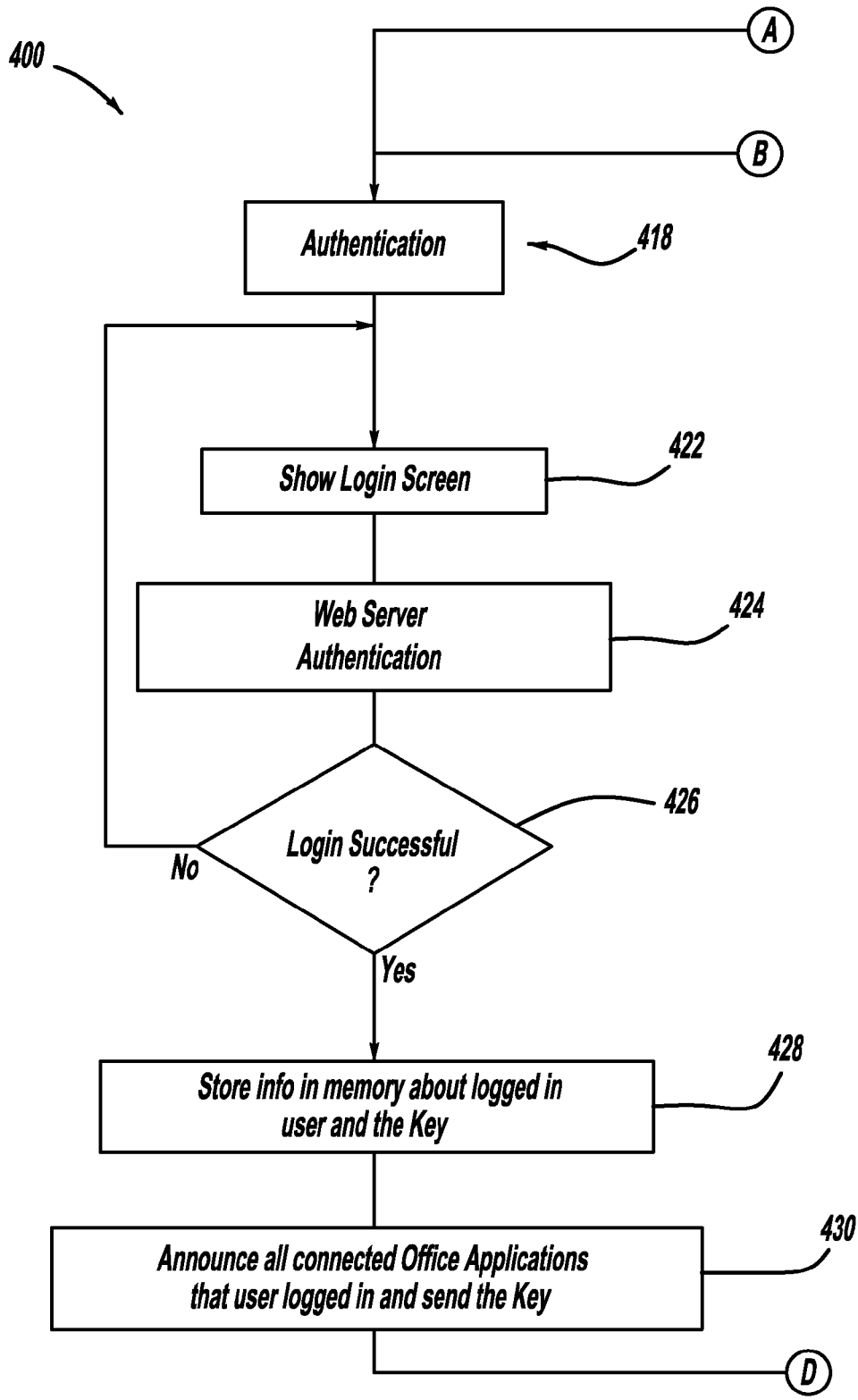
FIG. 5b is a schematic illustration of a portion of the flowchart of FIGS. 5a-5d illustrating primary processing steps of the encryption system including remote authentication and remote deletion of the present invention.
Figure 5C:
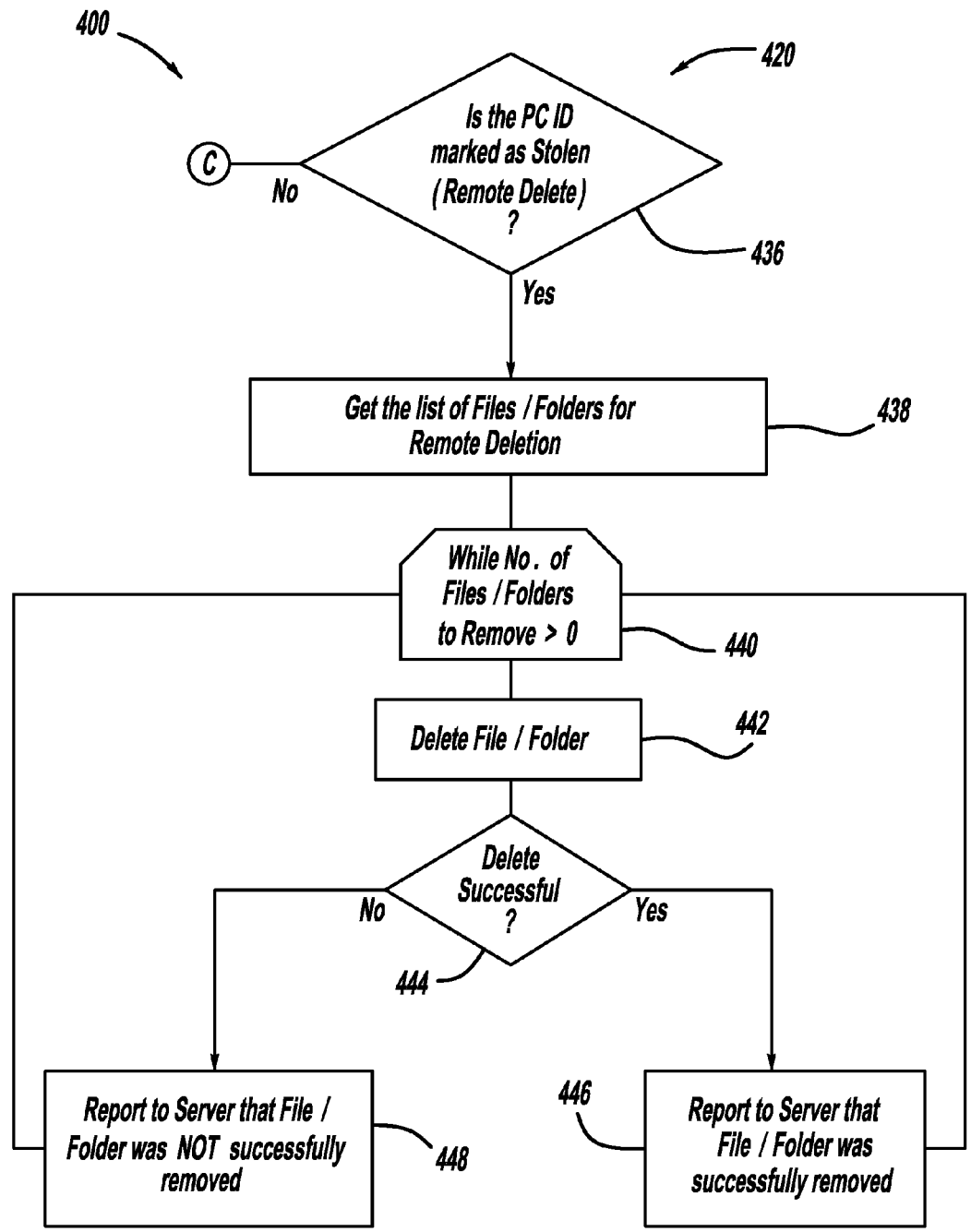
FIG. 5c is a schematic illustration of a portion of the flowchart of FIGS. 5a-5d illustrating primary processing steps of the file encryption and decryption system including remote authentication and remote deletion of the present invention.
Figure 5D:
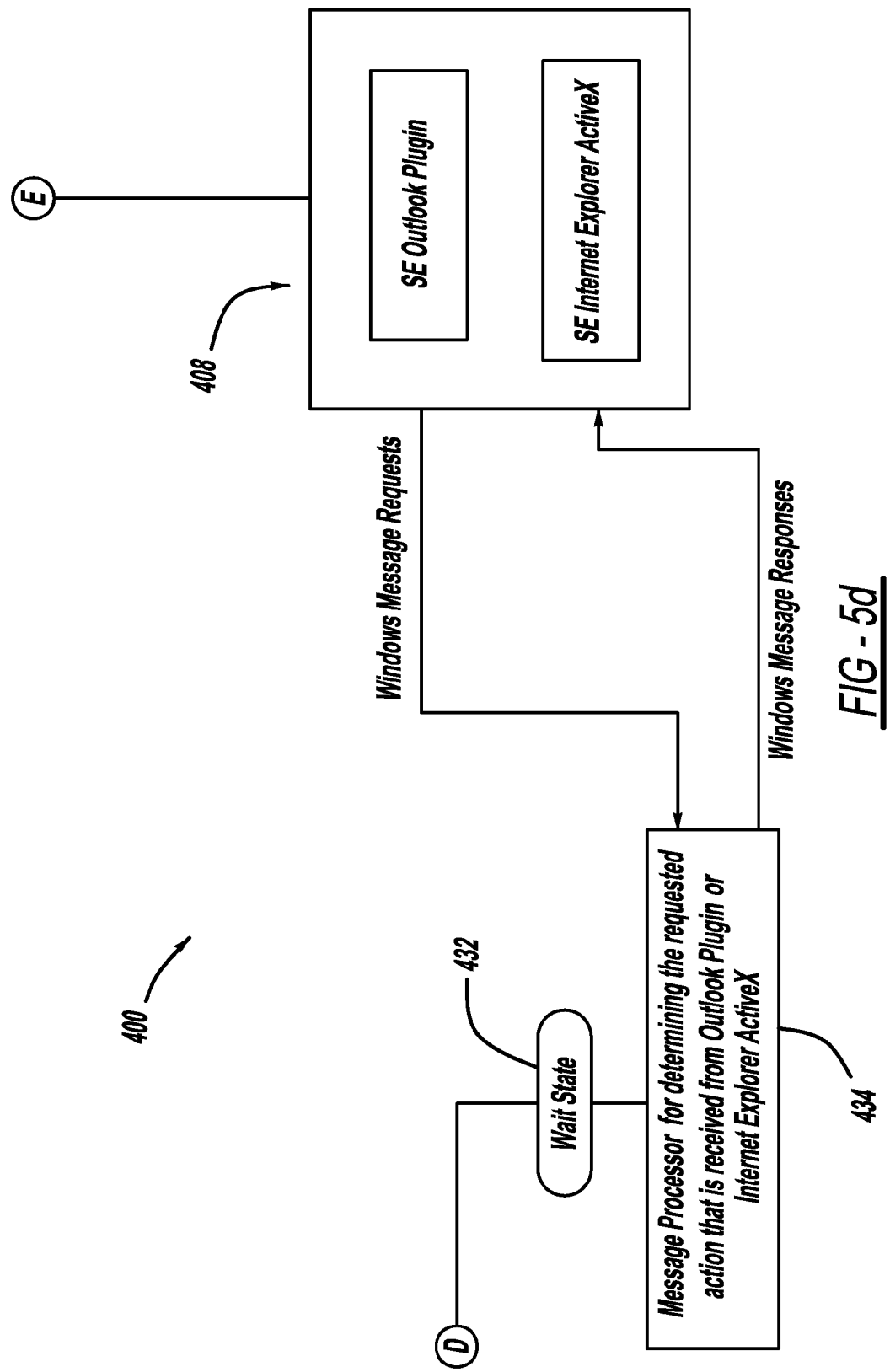
FIG. 5d is a schematic illustration of a portion of the flowchart of FIGS. 5a-5d illustrating primary processing steps of the file encryption and decryption system including remote authentication and remote deletion of the present invention.
Figure 6A:
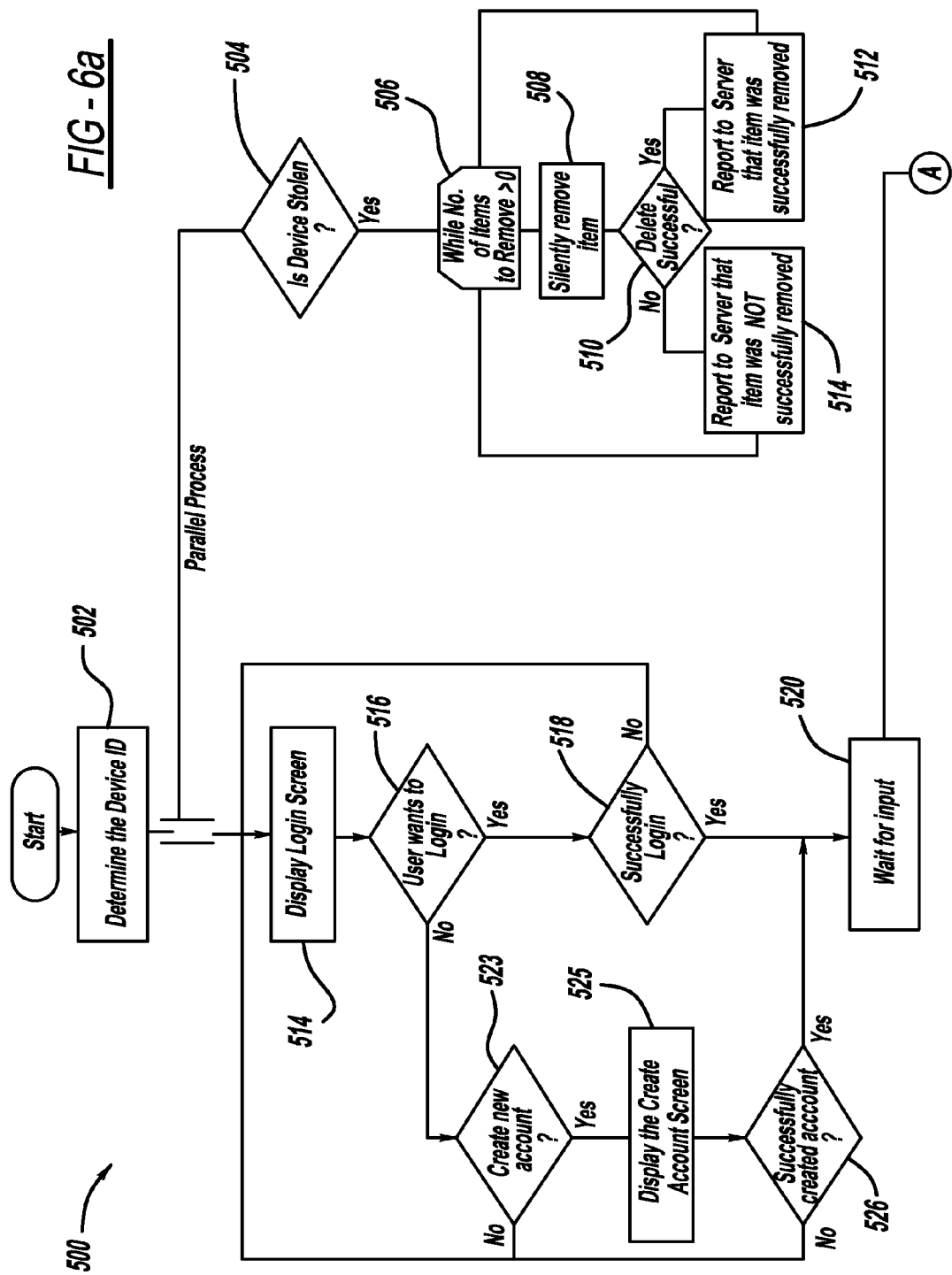
FIG. 6a is a schematic illustration of a portion of a flowchart of FIGS. 6a-6g illustrating primary processing steps of a file encryption and decryption system, in accordance with another embodiment of the present invention.
Figure 6B:
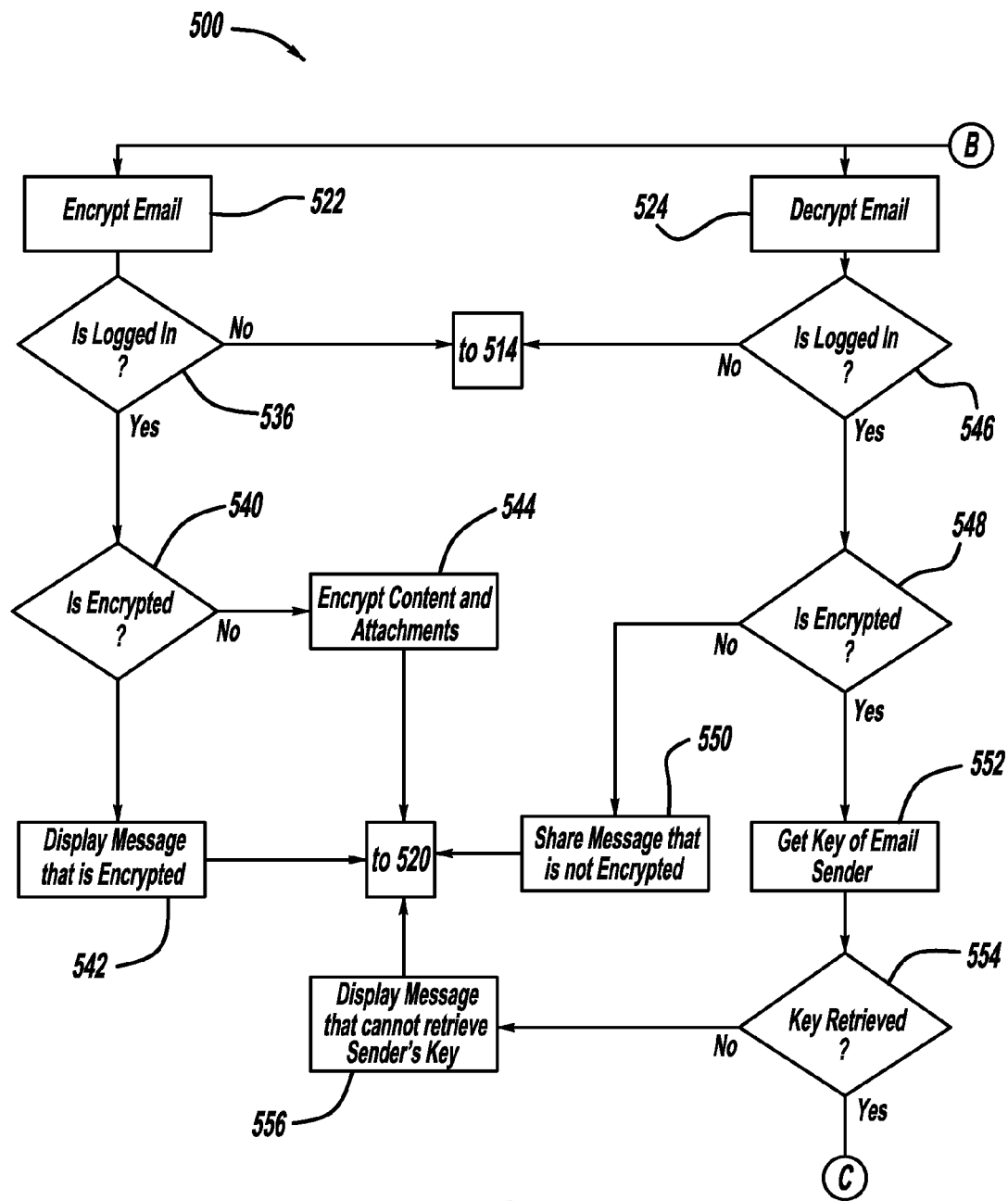
FIG. 6b is a schematic illustration of a portion of the flowchart of FIGS. 6a-6g illustrating primary processing steps of the file encryption and decryption system of the present invention.
Figure 6C:
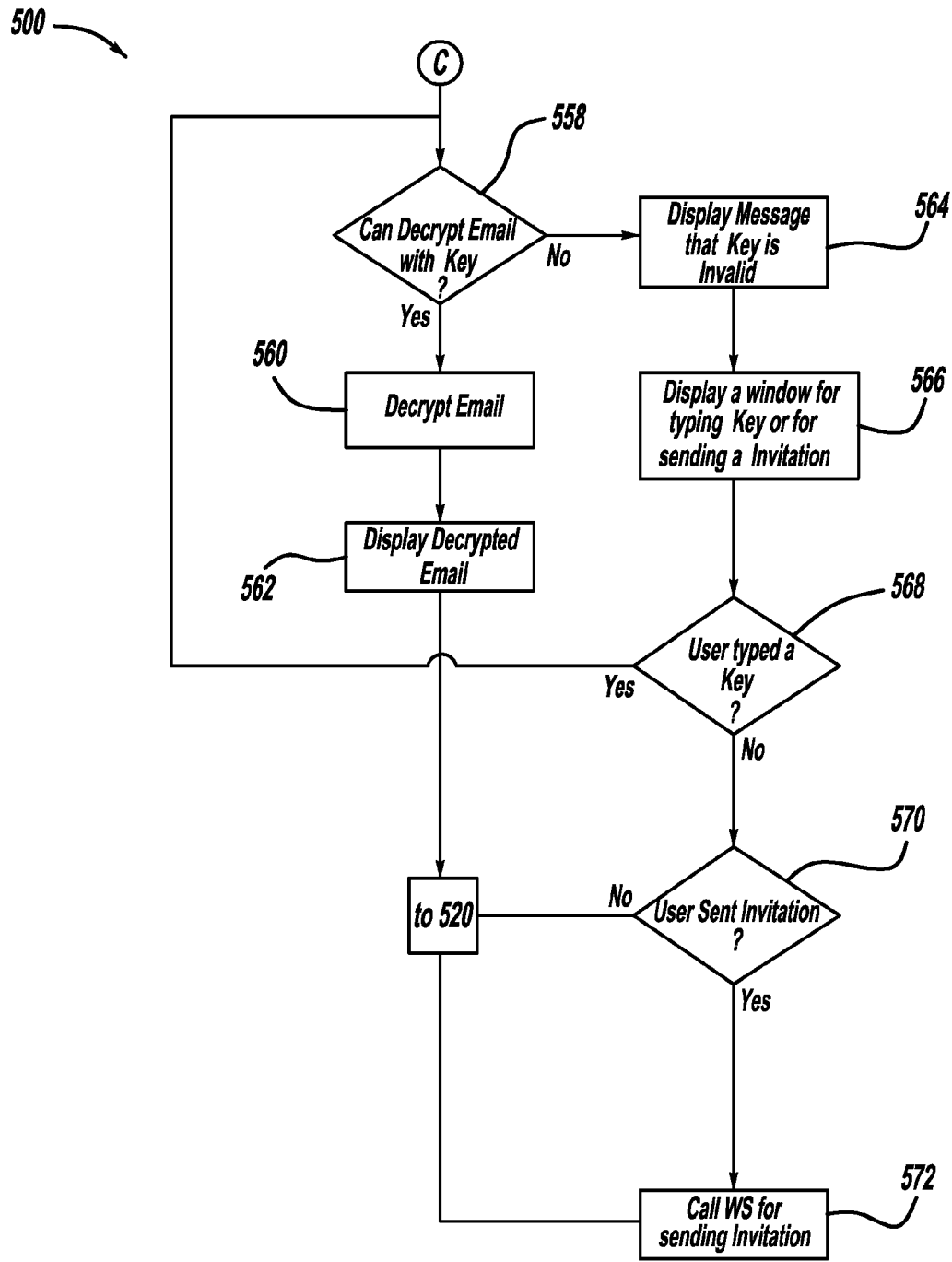
FIG. 6c is a schematic illustration of a portion of the flowchart of FIGS. 6a-6g illustrating primary processing steps of the file encryption and decryption system of the present invention.
Figure 6D:
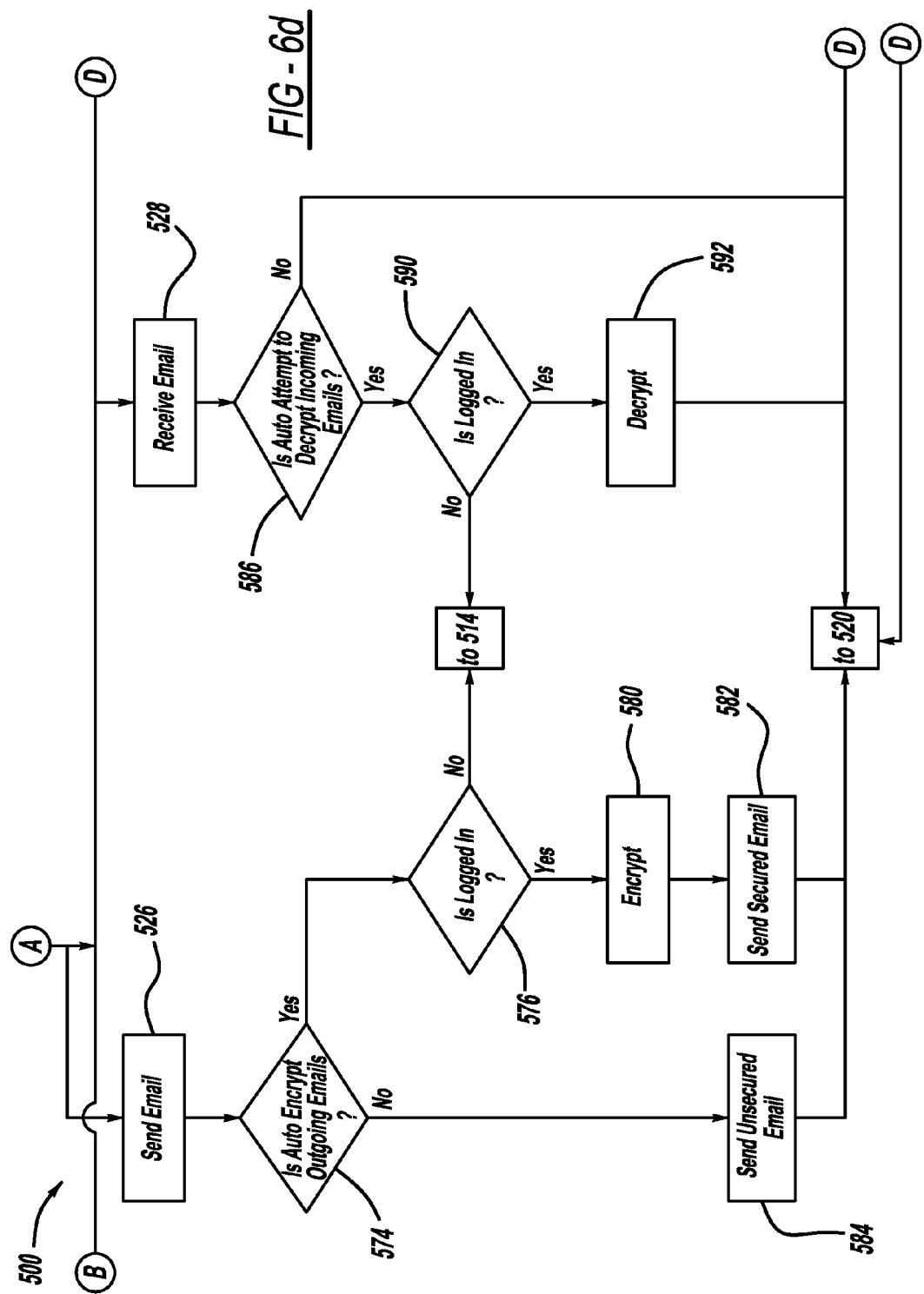
FIG. 6d is a schematic Illustration of a portion of the flowchart of FIGS. 6a-6g illustrating primary processing steps of the file encryption and decryption system of the present invention.
Figure 6E:
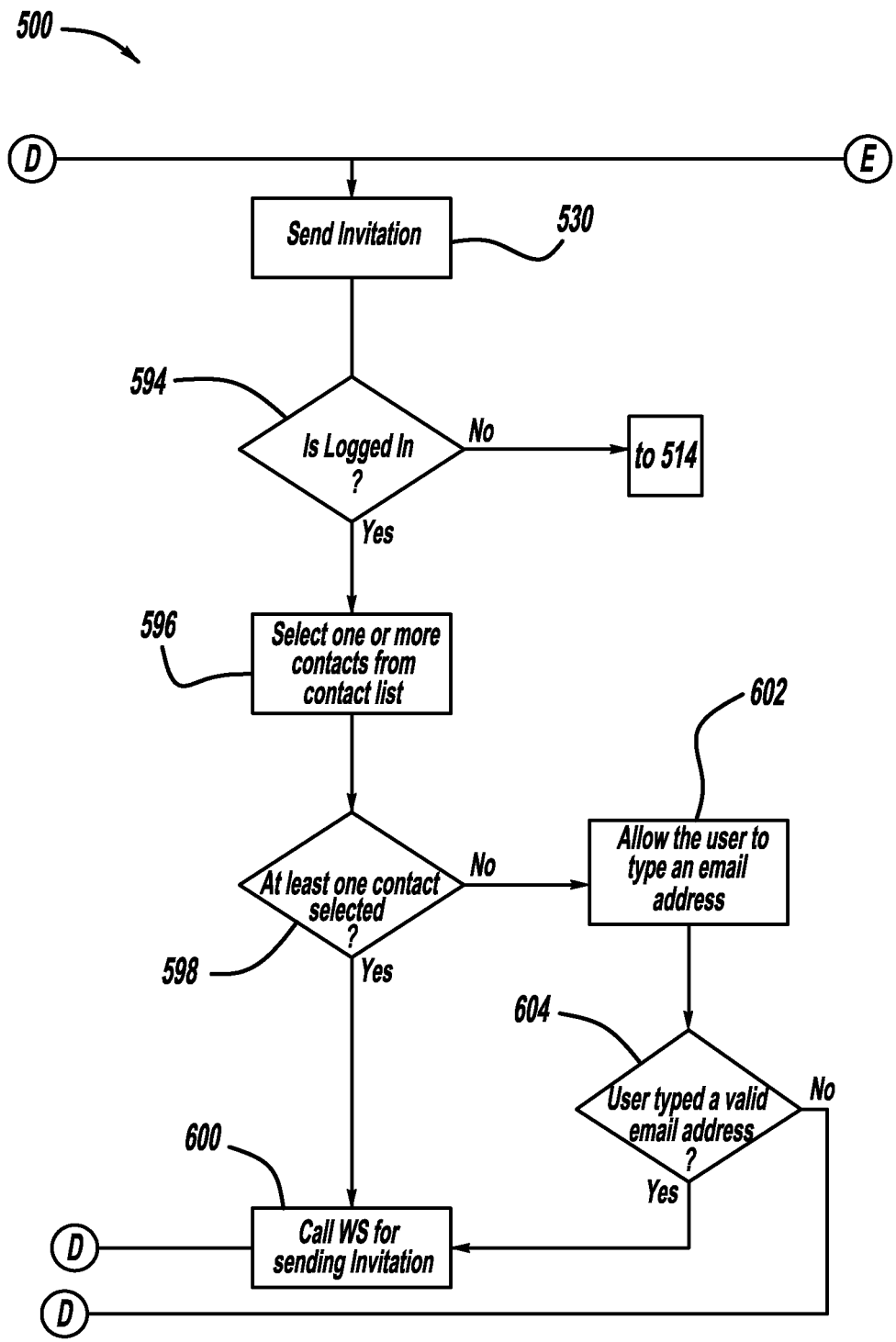
FIG. 6e is a schematic illustration of a portion of the flowchart of FIGS. 6a-6g illustrating primary processing steps of the file encryption and decryption system of the present invention.
Figure 6F:
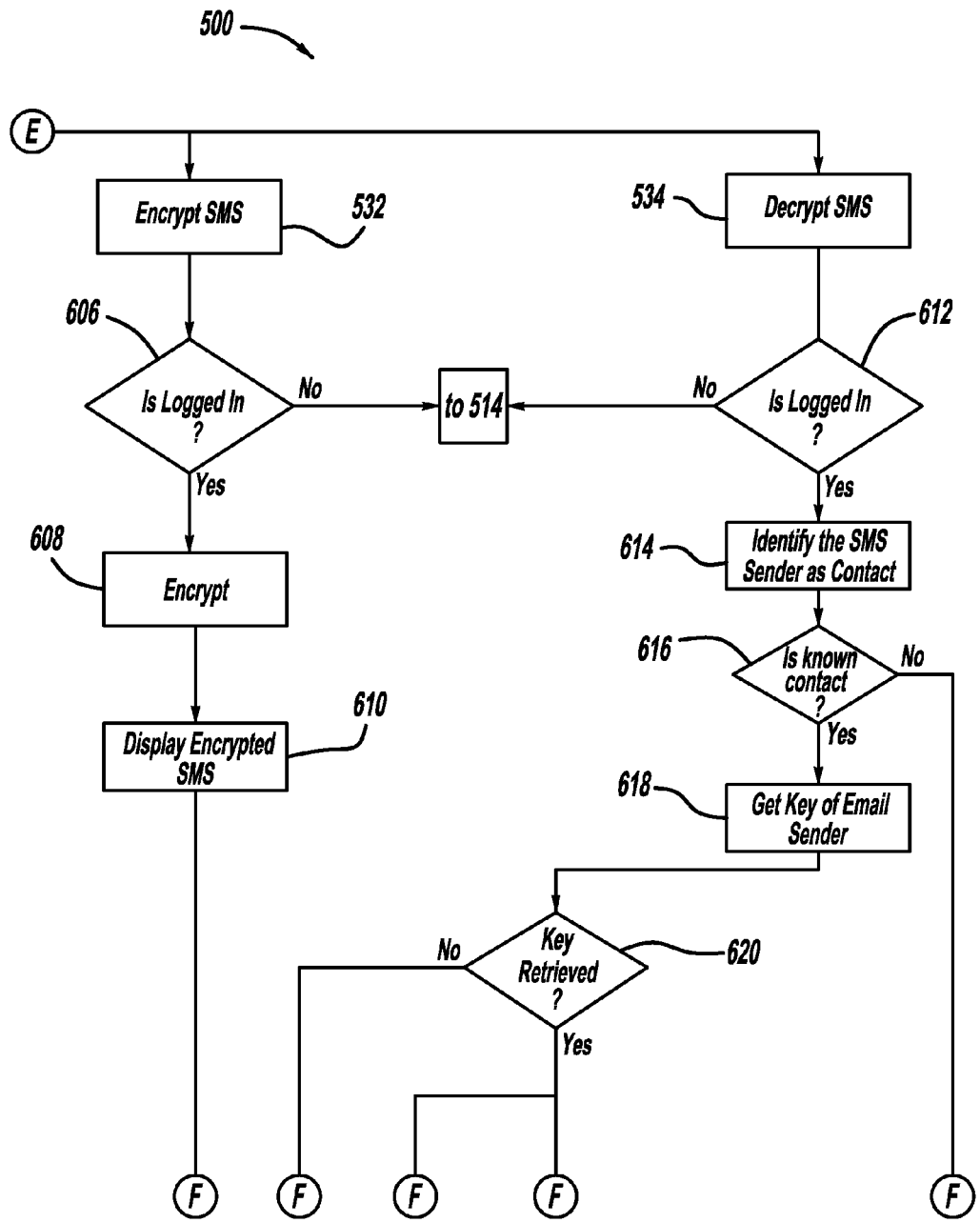
FIG. 6f is a schematic illustration of a portion of the flowchart of FIGS. 6a-6g illustrating primary processing steps of the file encryption and decryption system of the present invention.
Figure 6G:
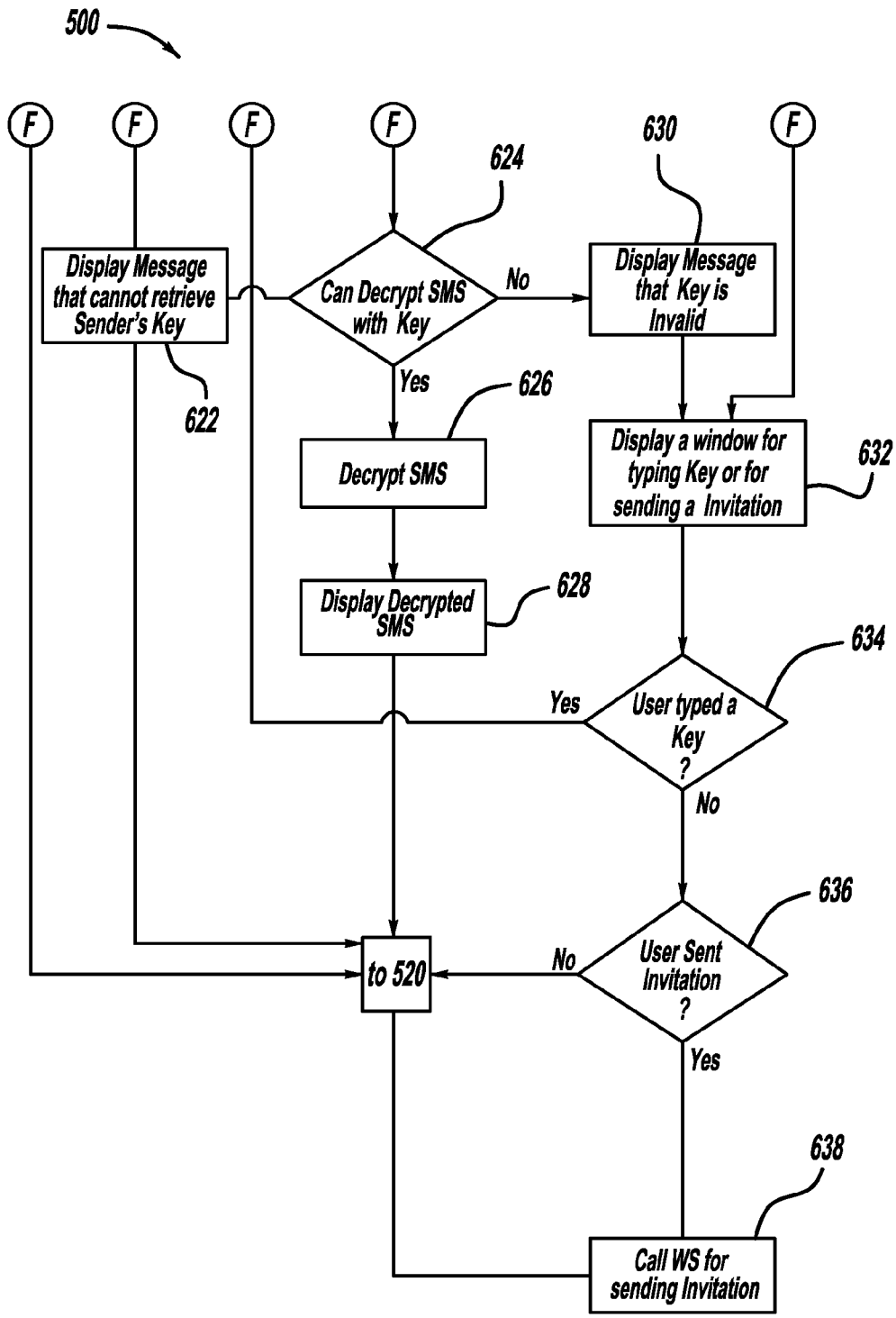
FIG. 6g is a schematic illustration of a portion of the flowchart of FIGS. 6a-6g illustrating primary processing steps of the file encryption and decryption system of the present invention.

The remote authentication process, e.g., at 212 and as will be explained in greater detail below and FIGS. 4a to 4c, is preferably based, at least in part, on a face recognition authentication feature, built upon secure and reliable algorithms, detecting the features of each individual's face and comparing them to the face characteristics stored in a secured database. The technology allows for a more complete analysis of the similarity between different faces.

The remote authentication helps to protect the user's private data by storing the credentials on a secured server. For improved security reasons, a SSL connection (e.g., secure sockets layer connection), is used for authentication and the password does not travel when the user tries to login. Instead, the hash code of the password is sent to the secured WCF Service for validating the credentials. A string hash code cannot be reversed for reconstructing the original password.

Generally, the login session has three purposes: authentication, authorization and identification. This means that the first step is represented by checking if the login session identification exists. If it does exist, the WCF Service will validate the access to certain functionality. If no WCF communication will be detected for a login session in a specific amount of time, which represents a WCF Service setting (e.g. 2 days), the login session will be deleted as it will be considered to be expired. After deleting the login session identification from the secured server side, at the next WCF method invocation, the user will be prompted for authentication.

Another advantage of the login session usage is represented by uniquely identifying a user. This functionality ensures that a WCF Method call does not retrieve information about the private data of another user (e.g. User Profile, Encrypted files, and the like). Another important aspect is represented by keeping only one login session for a user account. This restricts a user from the possibility of simultaneously using the same account from different applications (e.g. home and work). For exemplification, if a user is authenticated at work, and after the working hours he/she will use the same account from home, the program authenticated at work will be considered as expired. This implies that in the next working morning, the user will be prompted to type the application credentials.

Referring to FIGS. 4a to 4c generally, there is depicted a flowchart illustrating the main steps performed for the remote authentication process in accordance with another embodiment of the present invention, generally shown at 300, which starts by invoking the WCF service (at act 301). If it is determined that the user has a camera attached to the computer/laptop/phone (at decision 302), and if the facial recognition wizard has not been displayed (at act 304), the wizard is displayed to the user (at block 306), e.g., a user interface to guide the user through steps. If the user enabled facial recognition (at act 308), the user is asked to look at the camera and a face template is recorded in the database for that specific user (act 310). In the situation when the user enabled facial recognition (block 308), the webcam is started in the attempt of detecting the user's stored face template (act 312). If it is established that the user's face has been detected (at block 314), the face template is determined (act 316) and sent to the WCF service (at act 318) for authentication. If it is determined that the user's face has been recognized (at block 320), a login session will be generated and stored in the database (act 322) and an acknowledgement is returned about the successful login process, along with information about the current user (block 324). If the user's face has not been recognized as stored in the database (at act 320) and if there were more than a predetermined number of allowed authentication attempts (at block 326), e.g., greater than 10 authentication attempts, the camera will be stopped (act 328) and camera-less login will be used (at act 330). It is understood that, alternatively, dual authentication requiring both facial recognition and login process, e.g., username and password, can be required.

In case it is determined that the user does not have a camera (act 302) or if the allowed authentication attempts exceeds a predetermined number (at 326), a login screen is presented (at block 332). If it is determined that the user typed the login credentials (act 334), a login request is received (block 336). If it is determined that the client's IP, e.g., internet protocol, was banned for multiple consecutive attempts to login (at block 338), a message is presented about retrying to login after a certain amount of time (act 340). If it is established that the client's IP was not banned (block 338) and if the credentials were determined to be accurate (act 342), a login session will be generated and stored in the database (act 322) and an acknowledgement is returned about the successful login process, along with information about the current user (act 324). The login session will be sent by the program (e.g., Desktop Application, Mobile Application) at every WCF Communication step during the application session lifetime.

In the situation when the user's credentials were not determined to be accurate (at 342) and if it is determined that the user's IP accounted for multiple unsuccessful login attempts (at 344), the user's IP will be banned for a certain amount of time (at act 346). For protecting the user's credentials against Brute Force attacks, e.g., hacking programs, the WCF Service validates every login attempt. This means that if a user fails to login for a predetermined number of times, e.g., 3 times, the IP from which the user tried to authenticate will be banned for a predetermined period of time, e.g., 30 seconds (at act 346). By way of example, after the 30 seconds if the correct credentials will not be provided, the IP will be banned for another 60 seconds, and so on. The number of seconds can be calculated as "Attempt Number—3"×60 seconds. If it is determined that the user's credentials were not accurate (act 342) and that the user's IP did not attempt to login for several times, an invalid credentials error is displayed (at block 348).

It is understood that remote authentication does not demand that a user work from a specific registered computer, e.g., having a pre-registered serial number, for predetermined verification parameters. A user can access a portal from anywhere, e.g., a user can go to Yahoo™, GMail™, and etc. using another person's computer that has the program. Remote authentication can also run off the remote web server and the user just has to login, e.g., using their individual username and password. It is understood that client-less install is contemplated. All the processing power can be on that remote server so it is not running on a user's phone, laptop, or other computer and if a user's phone, laptop, or other computer crashes or otherwise becomes inoperable, files are not affected since the files can all be stored or backed-up on the remote server.

Referring to FIGS. 5a to 5d generally, there is depicted a flowchart illustrating steps that may be performed for encrypting and/or decrypting files and/or opening files, e.g., emails and/or attachments for the Microsoft Outlook™ plug-in and Internet Explorer ActiveX™ plug-in, shown generally at 400, comprising parallel processes implementing the remote authentication and remote deletion, in accordance with certain embodiments. When an action is requested (at block 402), it must be determined whether or the program is running (at act 404). Once it is determined that the program is running (at 404) and the user 14 is logged in (at 406), then a message processor (434) can determine the requested action that is received from the Microsoft Outlook™ and/or Internet Explorer ActiveX™ plug-in, generally shown at 408. The file can be processed, e.g., by encrypting it, decrypting it, and/or opening, etc as further depicted in FIGS. 2a to 2d.

If the program was determined not to be running (act 404), the program can be started (at block 410) by first determining whether the program is installed on the computer 12 (at decision 412). If the program is installed (at 412), the install status/process is exited (at act 414). If the program is not installed (at 412), the USB drive identification is retrieved (at act 416) and the computer 12 identification is determined (at act 417), e.g., device's a numbers.

Once the computer identification is determined (act 417), parallel processes implement the remote authentication, shown generally at 418, and remote deletion, shown generally at 420. Additionally, the user 14 must be logged-in to open and/or view encrypted files and to decrypt. Thus, if the user 14 is not determined to be logged-in (act 406) the remote authentication 418 and remote deletion 420 processes are entered.

A remote authentication login screen is shown (at 422) allowing the user 14 to enter the authentication user credentials and the web server 24 authenticates the entry (at act 424). If it is determined that the login was not successful (at decision 426), the user 14 is directed back to the login screen (at 422). If the user 14 logs-in on the login screen (at 422) using the user's 14 credentials and the web server 24 authenticates the information using the database (at 424), information can be stored in the memory about the logged in user 14 and the key (at act 428) and the user 14 is notified of all connected Microsoft Office™ applications and the web server 24 sends the user 14 the key (at act 430). A wait state (block 432) remains active and waits for additional input by the message processor 434.

It is understood that the user authentication/authorization decision can be taken and stored on the web server 24 side and the communication between the program and the web server 24 is encrypted.

Remote deletion, shown generally at 420, implements automatic deletion of encrypted files when a reported lost or stolen computer 12 is connected to the internet. The user 14 can have the computer 12 marked as lost, stolen, or otherwise compromised, e.g., by calling a support center and providing user credentials and/or secret answers(s). Once enabled, when the device attempts to authenticate with the remote server, a delete d is sent back to the device and all encrypted content is deleted. Alternatively, users can choose to have the entire contents of the computer deleted.

If it is determined that the computer identification is listed to a lost or stolen device (at decision 436), a list of files/folders for remote deletion is retrieved (at act 438). If the number of files/folders to delete is determined to be greater than zero (at act 440), the file/folder is deleted (at act 442), preferably silently allowing for remote deletion without the person who accessed the Internet with the reported stolen device even knowing that the file(s) is/are deleting. If it is determined that the file was deleted (at decision 444), a report is sent to the web server confirming that the file(s)/folder(s) was successfully removed from the device (at act 446). If it is determined that the file was not successfully deleted (at 444), a report is sent to the web server that the item(s) was not removed (at act 448), and deletion is attempted again. The remote deletion continues until the number of files to remove is zero.

Referring to FIGS. 6a to 6g generally, there is depicted a flowchart illustrating the steps performed for encrypting and/or decrypting and opening, receiving, and/or sending files, e.g., text messages and email(s), generally shown at 500, for mobile devices, e.g., smartphones, Blackberry™ Android™, and Windows Mobile™ operating systems, and tablets. Generally, the system and method in accordance with the present invention can be the primary email client and, preferably, a touch screen is provided with a "one-click" to encrypt touch screen button and/or "one-click" to decrypt touch screen button, for easier use. Once the mobile device identification (ID) is determined (at act 502), e.g., the device's serial numbers, a parallel process is implemented comprising authentication and remote deletion. Remote deletion implements automatic deletion of at least encrypted files of a reported lost or stolen mobile device, e.g., when the device is connected to the internet. Once enabled, when the device attempts to authenticate with the remote server, a delete command is sent back to the device and all encrypted content is deleted. Alternatively, users can choose to have the entire contents of the mobile device deleted.

If it is determined that the mobile device ID is listed to a lost or stolen device (at decision 504), if the number of files to delete is determined to be greater than zero (at act 506), the file is deleted (at act 508), preferably silently allowing for remote deletion without the person who accessed the internet with the reported stolen device even knowing that the file(s) is/are deleting. If it is determined that the file was deleted (at decision 510), a report is sent to the web server confirming that the file(s) was successfully removed from the device (at act 512). If it is determined that the file was not successfully deleted (at 510), a report is sent to the web server that the item was not removed (at act 514), and deletion is attempted again. The remote deletion continues until the number of files to remove is zero.

A login screen is displayed (at act 514) and the user is prompted to login. If it is determined that the user is logged in (at decision 516), and if it is determined that the login is successful (at decision 518), the windows message communication channel remains active and waits for additional input on what processing is requested (at act 520). If it is determined that the user is not logged in (at 516), and if it is determined that the user wants to create a new account for logging in (at decision 523), an account screen is displayed (at act 525) and if it is determined that the account is successfully created (at decision 526), the windows message communication channel remains active and waits for additional input on what processing is requested (at 520), e.g., converting, and/or encryption/decryption, and/or reading, and/or writing, and/or authenticating, and the like processing of messages from the network.

It is understood that the user's entire mobile device can be encrypted; not just the communication, e.g., all of a user's files, photos, contacts, data and text messages are encrypted until the user logs on to decrypt. This is an important benefit over conventional systems which allow an unauthorized person to pick up a mobile device and view its contents.

The flowcharts depicted in FIGS. 6a to 6g are similar to FIGS. 2a to 2d, in that a user may wish to encrypt a newly drafted email for sending securely (block 522), decrypt an email (block 524), send an email (block 526), receive an email (block 528), and/or send an invitation (block 530). A user may additionally desire to encrypt a text message (block 532) and/or decrypt a text message (block 534).

If it is desired that the email be encrypted (block 522) and if it is determined that the user is not logged in (at decision 536), a login request is sent (at act 538) to the web server for remote authentication. Once it is determined that the user is logged in (act 536) and if it is determined that the email is already encrypted (at decision 540), a message is shown that the email is encrypted (at act 542). The windows message communication channel remains active and waits for additional input (block 520). If the user is logged in (act 536) and if it is determined that the email is not already encrypted (act 540), the email content and attachments are encrypted (at act 544), and the windows message communication channel remains active and waits for additional input (block 520).

If a user desires to decrypt and view an email (block 524) and the user is not logged in (at decision 546), a login request is sent to the web server for emote authentication. Once it is determined that the user is logged in (act 546) and that the email is not encrypted (at decision 548), a message is shown that the email is not encrypted (at act 550), and the windows message communication channel waits for additional input (block 520). If the user is logged in (act 546) and if the email is encrypted (act 548), the encryption key of the email sender is retrieved (at act 552) from the web server. If the key cannot be retrieved (at 554), a message is shown that the key cannot be retrieved (at act 556), and the windows message communication channel waits for additional input (block 520). If the key is retrieved (at 554) and the email can be decrypted using the retrieved key (at decision 558), the email is decrypted (at act 560) and the decrypted email content is shown (at act 562), e.g., the content of the email and any attachments in viewable human-perceivable form. The windows message communication channel can remain active and waits for additional input (block 520). If the email cannot be decrypted using the retrieved key (at 558), a message is shown that the key is invalid (at act 564). A window is displayed (at act 566) for the user to type in a key, and/or send a user invitation, and or call the web service for sending the invitation, e.g., WCF Service. If it is determined that the user typed in a key (at decision 568) and that the email can be decrypted using the key (at 558), the email is decrypted (at 560) and shown (at 562). If the user did not type in a key (568), the user may send an invitation (at decision 570) and the web server is called for sending the invitation (at act 572). If the user does not send an invitation (570), the windows message communication channel can remain active and waits for additional input (block 520).

If a user desires to send an email (block 526) and if it is determined that the automatic encryption of outgoing emails is on (at decisions 574) and the user is not logged in (at decision 576), a login request is sent to the web server for remote authentication. If the user is logged in (act 576), the email content and attachments are encrypted (at act 580), and the encrypted email is sent (at act 582). The windows message communication channel waits for additional input (block 520). If automatic encryption for sending emails is not on (at 574), the email content and attachments will not be automatically encrypted and the unencrypted email is sent (at act 584). The windows message communication channel waits for additional input (block 520).

If a user desires to decrypt and view a received email (block 528) and if it is determined that the automatic decryption of incoming emails is on (at decisions 586) and if it is determined that the user is not logged in (at decision 590), a login request is sent to the web server for remote authentication. If the user is logged in (act 590), the email content and attachments are decrypted (at act 592), and the windows message communication channel waits for additional input (block 520). If it is determined that the automatic decryption option for sending emails is not on for a user (at 586), the email content and attachments will not be automatically decrypted, and the windows message communication channel) waits for additional input (block 520).

If a user desires to send an invitation (block 530), if it is determined that the user is not logged in (at decision 594), a login request is sent to the web server for remote authentication. If the user is logged in (act 594), the user can select at least one contact from a contact list (at act 596), and if at least one contact is selected (at decision 598), the web server is called for sending the invitation (at act 600). If it is determined that the user did not select a contact (at 598), the user can type in an email address of the desired recipient (at act 602). Once it is determined that the user typed in a valid email address (at act 604), the web server is called for sending the invitation (at 600), and the windows message communication channel waits for additional input (block 520). If the user did not type in a valid email address (at 604), the windows message communication channel waits for additional input (block 520).

If it is desired that a short message service (SMS), e.g. text message, be encrypted (block 532) and if it is determined that the user is not logged in (at decision 606), a login request is sent to the web server for remote authentication and the message can be added to a processing queue for encryption. Once it is determined that the user is logged in (act 606) the text message content is encrypted (at act 608) and the encrypted SMS is displayed (at act 610). The windows message communication channel remains active and waits for additional input (block 520).

If a user desires to decrypt and view an SMS (block 534), e.g., text message, and if it is determined that the user is not logged in (at decision 612), a login request is sent to the web server for remote authentication and the message can be added to a processing queue for decryption. Once it is determined that the user is logged in (act 612), the SMS sender is identified as a contact (at act 614). If it is determined that the sender is a known contact (at decision 616), the encryption key of the message sender is retrieved (at act 618) from the web server. If it is determined that the key cannot be retrieved (at 620), a message is displayed that the key cannot be retrieved (at act 622), and the windows message communication channel waits for additional input (block 520). If the key can be retrieved (at 620) and if it is determined that the key can decrypt the SMS using the key (at decision 624), the message is decrypted (at act 626) and the decrypted message is shown (at act 628), e.g., the content of the text message in human-perceivable form. The Windows message communication channel can remain active and waits for additional input (block 520). If it is determined that the SMS cannot be decrypted using the retrieved key (at 624), a message is shown that the key is invalid (at act 630). A window is displayed (at act 632) for the user to type in a key, and/or send a user invitation, and or call the web service for sending the invitation, e.g., WCF Service. If it is determined that the user typed in a key (at decision 634), and it is determined the key can decrypt the SMS (at 624), the message is decrypted (at 626) and the decrypted message is shown (at 628). If it is determined that the user did not type in a key (at 634), the user may send an invitation (at decision 636) and the web server is called for sending the invitation (at act 638). The windows message communication channel can remain active and waits for additional input (block 520).

Figure 8:
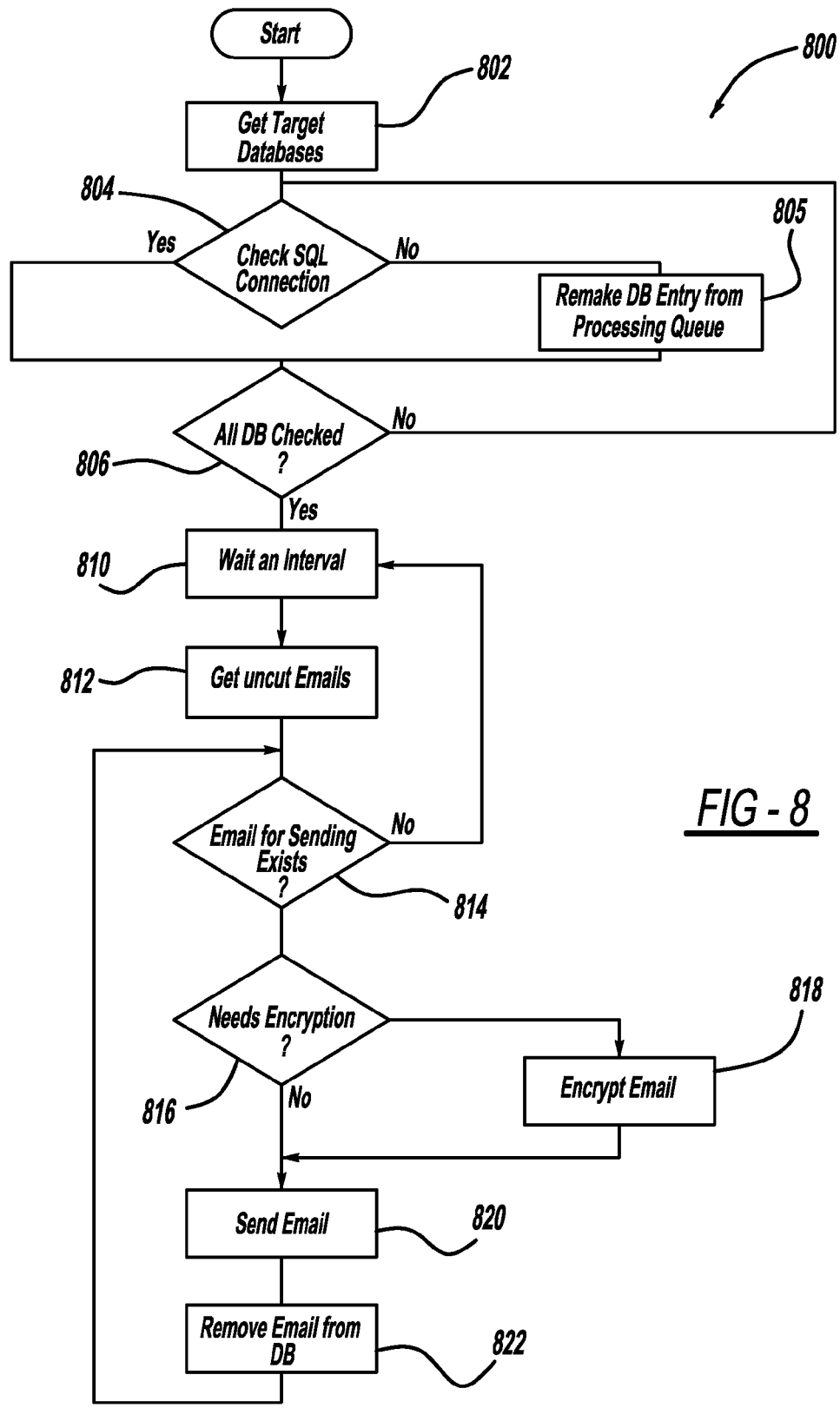
FIG. 8 is a flowchart illustrating a process of sending email that can be used with various embodiments of the invention.

FIG. 7 depicts a flowchart illustrating an invitation process of the encryption system for exchanging secured emails, generally shown at 700. User 1 logs in using user credentials (at act 702) and sends an invitation (at act 704) invoking the Windows® Communication Foundation (WCF) (at act 706). The invitation electronic mail (email) is stored (shown generally at 708) on the web server database(s) (DB) (shown generally at 710) and the email is processed (shown generally at 712), e.g., by ASYNC Email Service (at 714) (further depicted in FIG. 8), and sent (shown generally at 716) to the email server, generally shown at 718. At the next step, the email is sent to user 2, generally shown at 720. An email sent confirmation is sent (shown generally at 722), e.g., by ASYNC Email Service (at 714) (further depicted in FIG. 8), and the email is deleted, shown generally at 724. The invitation email that was sent to user 2 can be read (at act 726) by user 2, e.g., via a web portal (at 728), wherein the user 2 can login using user 2 credentials and/or request user credentials (at act 730), e.g., by signing up for an account having user credentials unique to user 2, in order to view the content of the email in, e.g., to read the encrypted/decrypted contents of the email of a "linked" user. User 2 can either accept or decline the invitation email, generally shown at 732. It is understood that user 2 does not need to login, have user credentials, and/or sign up for an account having user credentials in order to decline the invitation email.

The purpose of the ASYNC Email Service, asynchronous email service, is improving performance at the point of sending an email. When an email is sent from the program, whether or not having an enclosed attachment, it is not actually sent, but put in a waiting queue, which represents a database table. The actual process of email sending is described in FIG. 8, which is accomplished by the ASYNC Email Service, a distinct application, shown generally at 800, and may be used with various embodiments of the invention.

The ASYNC Email Service supports the processing of multiple email queues (block 802) at once. At startup, the connections (at act 804) to all the waiting queues (at 806) are verified and after validating all the connections, an internal timer is started (at act 810). It connections are not validated the database entry is remade from the processing queues (805). The purpose of the timer is extracting emails (at act 812) from the database, one by one, at a certain period of time. When an email is found (at 814), it is extracted from the waiting queue and preprocessed, in the situation when the email is intended to be sent encrypted (at block 816) it is encrypted (at act 818). Only then the email, along with the attachments, is successfully sent (at act 820) and removed from the waiting queue (at act 822). In case an email is prevented from being sent, due to the occurrence of errors, it will be marked as invalid and ignored for a certain amount of time. The process will be continued until all emails from all the waiting queues have been successfully sent.

Figure 9:
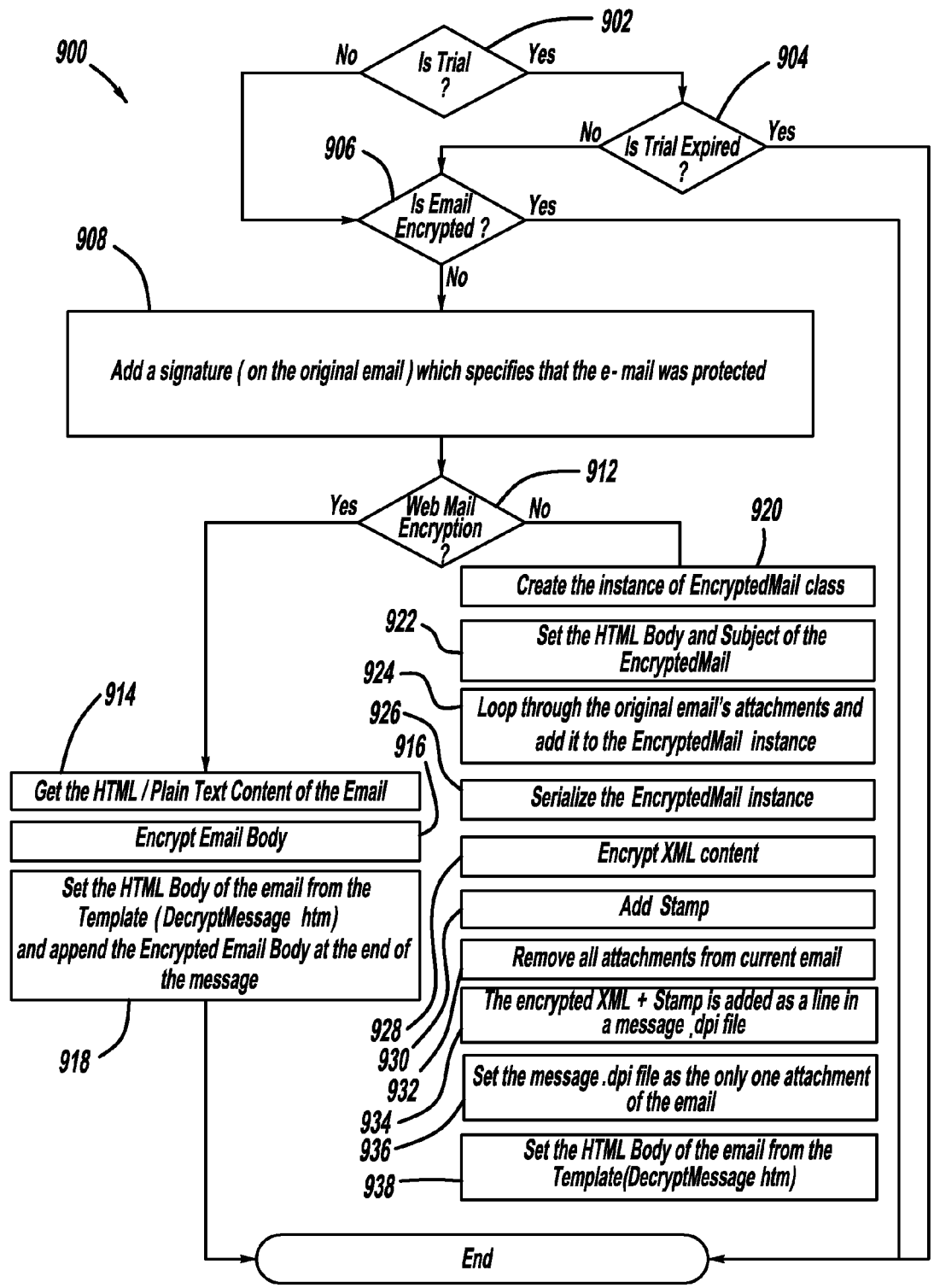
FIG. 9 is a flowchart illustrating a process of email encryption that can be used with various embodiments of the invention.

FIG. 9 details the process of email encryption, shown generally at 900, that can be used with various embodiments of the invention. When an encryption request is sent by a user action, the application will first verify if the current authenticated user uses a trial version (at 902) and whether it is an expired trial version of the program (at decision 904). If the current user has a licensed version of the program or a not expired trial (at 904), and if it is determined that the email is not encrypted (at 906), the program will add a generic timestamp at the end of the email body containing the program version and the time when the email to be encrypted (at act 908). Based on the program that requests email encryption (at 912), the software will behave differently. Therefore if the request is sent from a web browser, the program create a XML structure containing the HTML body of the email and the attachments (at act 914). The XML string will be encrypted (at act 916). After obtaining the final encrypted string, the email body will be replaced with a standard email template that can be read by a user (at act 918). The template will specify that the current email is an encrypted one and provide few indications about how to install the required software. At the end of the template, the encrypted string will be inserted (at act 918). If the encryption request will be sent from Microsoft Outlook, for example, the process is similar. An instance of encrypted mail class is created (at act 920) and the HTML body and subject is set (at act 922). The program loops through the original email's attachments and adds it to the encrypted email instance (at act 924). At the end of the HTML body the software will add a generic statement containing the program version and the time when the email is to be encrypted. The newly resulted HTML Body and the email attachments will be serialized to an XML String (at act 926) and encrypted (at act 928). At the end of the encrypted string a Stamp will be added (at act 930) for containing information about the date and the software version. Attachments are removed from the current email (at act 932) and the encrypted XML and stamp that is added is added as a line in a message.dpi file (at 934). The resulted encrypted string will be put in a file (message.dpi) which will become the only attachment of the email (at act 936). In the same manner as the mails encrypted from a web browser, the original email will be replaced with a standard template specifying that the current email is an encrypted one and provide few indications about how to install the required software (at act 938).

Figure 10:
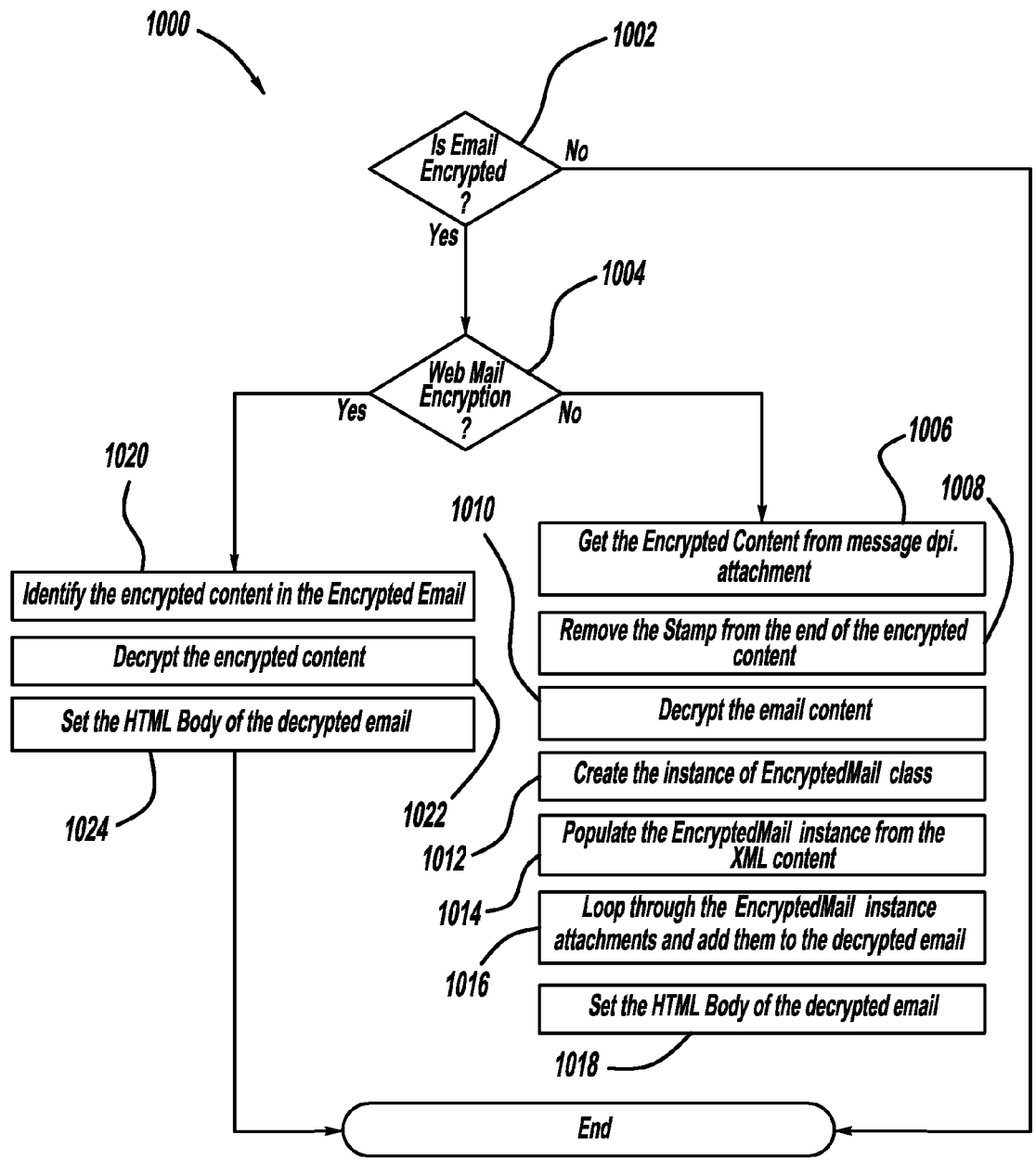
FIG. 10 is a flowchart illustrating a process of email decryption of received encrypted email that can be used with various embodiments of the invention.

FIG. 10 represents the decryption process of a received encrypted email, shown generally at 1000, that can be used with various embodiments of the invention. If it is determined that the email is encrypted (at decision 1002), the decryption process detects (at decision 1004) if the email that will be decrypted was sent from a web browser or from Microsoft Outlook by checking the existence of the message.dpi attachment. Based on the program that requests email encryption the steps performed will be different. In all situations, the encrypted content will be extracted (at act 1006) and the Stamp is removed from the end of the encrypted string (at act 1008). After removing the stamp, the encrypted text will be decrypted (at act 1010) using the sender's encryption key, and create the instance of the encrypted mail class (at act 1012). The decrypted string will contain the serialized XML (at act 1014) that stores the original email body and the attachment (at act 1016). Based on this information, the decryption process will present the original email and will allow the email recipient to access the email attachments (at act 1018). If it is determined that the email that will be decrypted was sent from a web browser (at 1004), the encrypted content is identified (at act 1020) and the encrypted text will be decrypted (at act 1022). The HTML body of the decrypted email will be set and will allow the email recipient to access the decrypted email and attachments (at act 1024)

Figure 11:
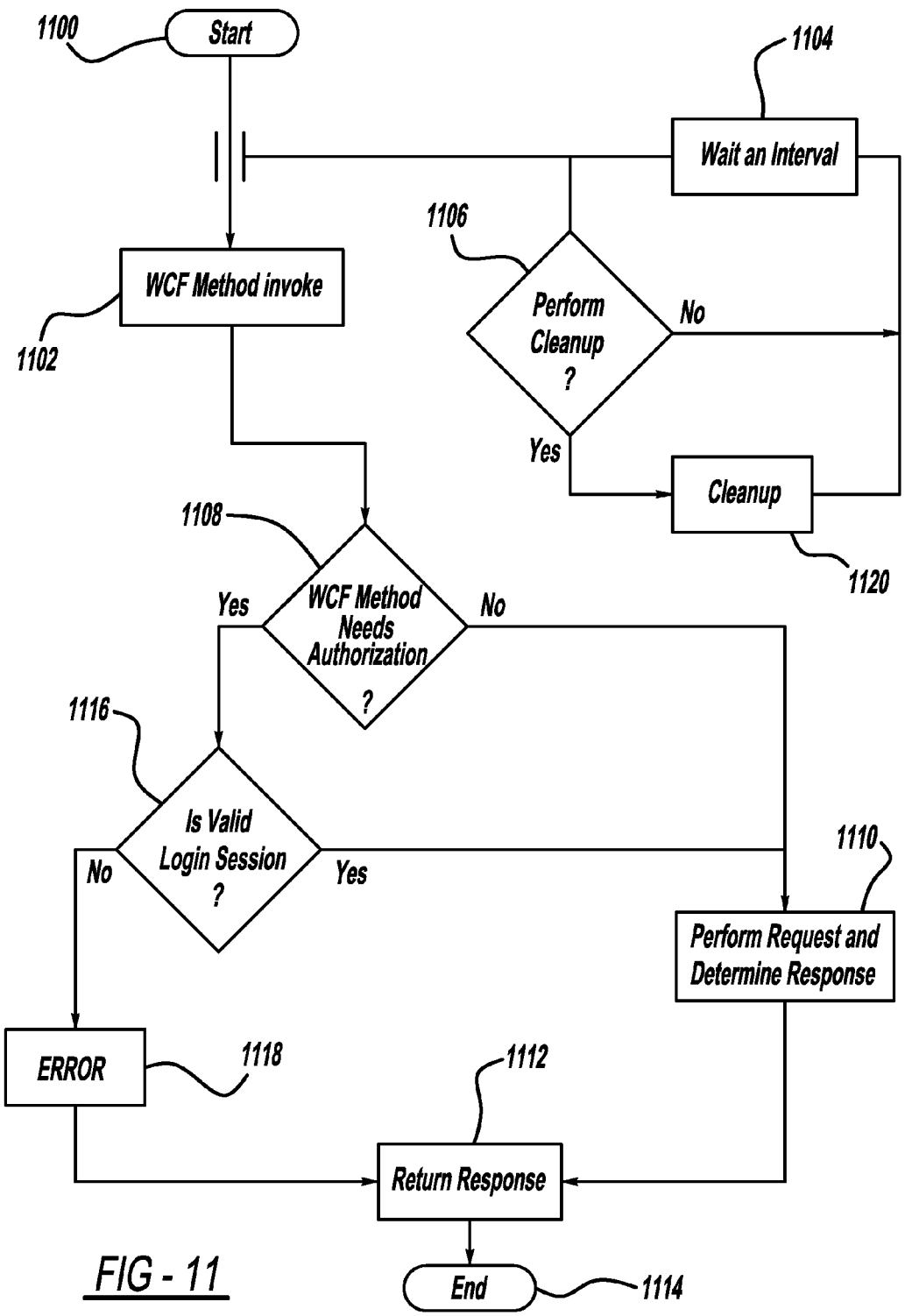
FIG. 11 is a schematic illustration of a flowchart illustrating processing steps of a Windows Communication Foundation service for remote authentication for a file encryption and decryption system, in accordance with the present invention.
Figure 12:
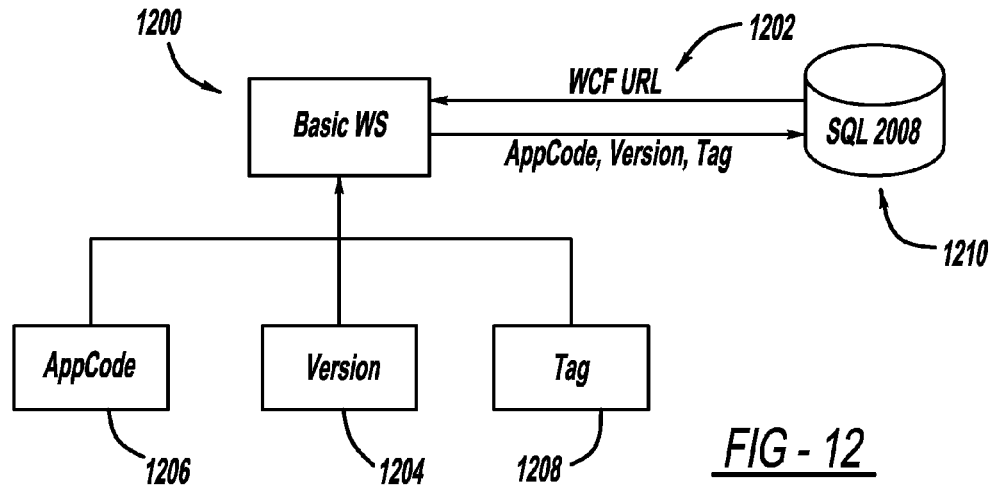
FIG. 12 is a schematic illustration of a flowchart illustrating processing steps of a Basic Web Service for identifying the Windows Communication Foundation service of FIG. 11 for remote authentication, in accordance with the present invention.
Figure 13:
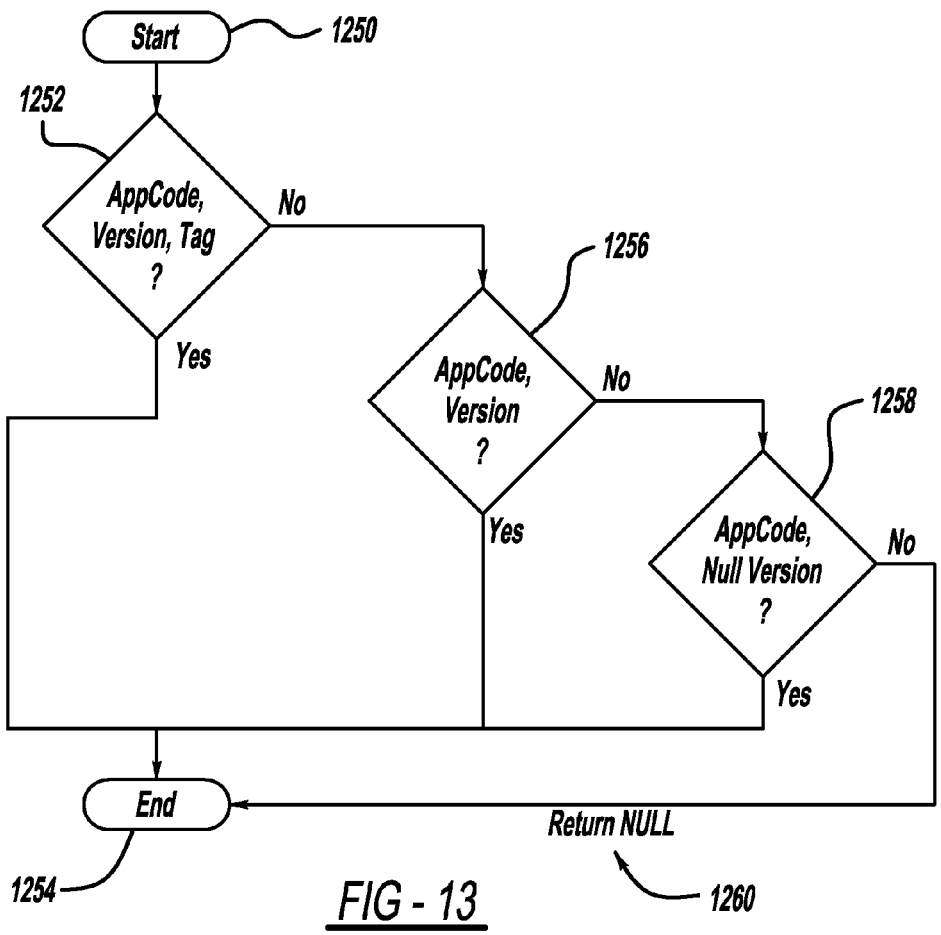
FIG. 13 is a schematic illustration of a flowchart illustrating processing steps for returning the Windows Communication Foundation uniform resource locator (WCF URL) of the Basic Web Service of FIG. 12, in accordance with the present invention.

Referring to FIG. 11-13 generally, there is shown a flowchart illustrating a process for establishing the web server connection 24 between at least the computer 12 and web server 24 to implement remote authentication using a Windows Communication Foundation ("WCF") service, in accordance with various embodiments of the invention. Generally, this process is implemented before traffic is allowed to get through such that the remote connection must be authorized before there is access to the web server 24. The process starts, shown as block 1100, and moves to a parallel process wherein a WCF method is invoked (at act 1102), e.g., Basic WCF Service, and a cleanup process is performed starting at act 1106. Generally, the web server 24 validates user logins. Typically, every time a user requests that an action be performed, e.g., email encryption, the web server 24 must authenticate the user's 14 login and/or the user 14 has to re-establish the connection, e.g., Internet connection, and be re-authenticated, e.g., the user 14 must re-instate their login if timed out.

It is understood that the user's authentication credentials can be stored and processed by the web server 24 every time a request is made such that credentials are not held locally on the computer 12. It is further understood that authentication can be processed every time a user wants to perform an action, e.g., encrypt a file. These are significant benefits over conventional arrangements that allow caching of credentials locally, and ongoing connections, which can be retrieved by computer hackers, e.g., using hacker-based software.

The cleanup process 1106 enables a user 14 to "cleanup" an invalid entry during authentication. By way of non-limiting example, if a user enters an invalid username the web server 24 can establish what the login error is and communicate the defect to the user, e.g., notify the user that the username and/or password is invalid. If it is determined that a cleanup is required (at act 1106), the cleanup is performed (at act 1120) prior to waiting a predetermined interval (block 1104) to determine if additional cleanup is necessary (at 1106).

The WCF method is invoked (act 1102) as an application programming interface (API) not local to the user computer 12. If it is determined that the WCF method does not need authorization (at act 1108), the requested action is performed and a response is determined (at act 1110). The response is then given (at act 1112), e.g., encryption complete, and the process ends (at 1114). If it is determined that the WCF method needs authorization (act 1108) and the user inputs a valid login (at act 1116), the requested action is performed and a response is determined (at act 1110). The response is then given (at act 1112) and the process ends (at 1114). If the login session is not determined to be valid (act 1116), an error Message is issued (at block 1118) and a response notification is given (act 1112), and the process ends (at 1114).

Referring to FIGS. 12 and 13 generally, the WCF service is an API in a .NET function or framework, e.g., Microsoft .NET framework, for guiding connections to selectively restrict or allow communications with the web server 24 in order to allow encrypting and/or decrypting of files. The Basic WCF Service or Web Service, shown generally at 1200, is a process that guides the applications that are part of the system to communicate with the proper WCF Service. Thus, the Basic WCF Service does not handle the communication per se, but instead tells an application which URL to use. Generally, the first call made by the application is to the Basic WCF Service 1200. Typically, this is a non-continuous one-time process, e.g., and/or for a predetermined period of time, unless the user 14 changes the address from the settings section. The Basic WCF Service 1200 will return the WCF uniform resource locator (URL) of the main WCF Service, shown generally at 1202. This is beneficial when there are users running an old version, e.g., program versions, and also users running newer or latest versions. The Basic WCF Service 1200 can take the current application version (at act 1204) and the application code (at act 1206), which can be unique per application and not per version, and also optionally a tag (at act 1208) to identify the WCF Service that can communicate with them. A benefit of the Basic WCF Service is to guide an application to use the service that works for it; rather than having to overwrite the service if modifications are made to the service. If any changes are made on the web server 24 side, both old and the latest applications can be used. Preferably, the Secured Query Language (SQL) is SQL 2008, shown generally at 1210.

Referring to FIG. 13, there is shown a flowchart illustrating the process of returning the WCF URL. Typically, for any application that the Basic WCF Service does not find a match between AppCode and version, the Basic Service will return NULL when no match can be found. It is understood that the application can try to use the default service URL. Beginning at start 1250, if it is determined that the AppCode, Version, and Tag operably matches (at act 1252), the process moves to end block 1254. If it is determined that the AppCode, Version, and Tag do not match (act 1252) to predetermined parameters, but that it is determined that AppCode and Version operably match (at act 1256), the process moves to end block 1254. If it is determined that the AppCode, Version, and Tag do not match (act 1252) and it is determined that AppCode and Version do not match (act 1256), and if it is determined that is AppCode Null Version (at 1258), e.g., Null version that matches all for which a version cannot be matched with a version column, the process moves to end block 1254. If it is determined that the AppCode, Version, and Tag do not match (act 1252) and it is deters pined that AppCode and Version do not match (act 1256) to predetermined verification parameters, and if it is determined that is not AppCode Null Version (at 1258), a Return NULL is made, shown generally at 1260, and the process moves to end block 1254 and access can be granted.

Figure 14:
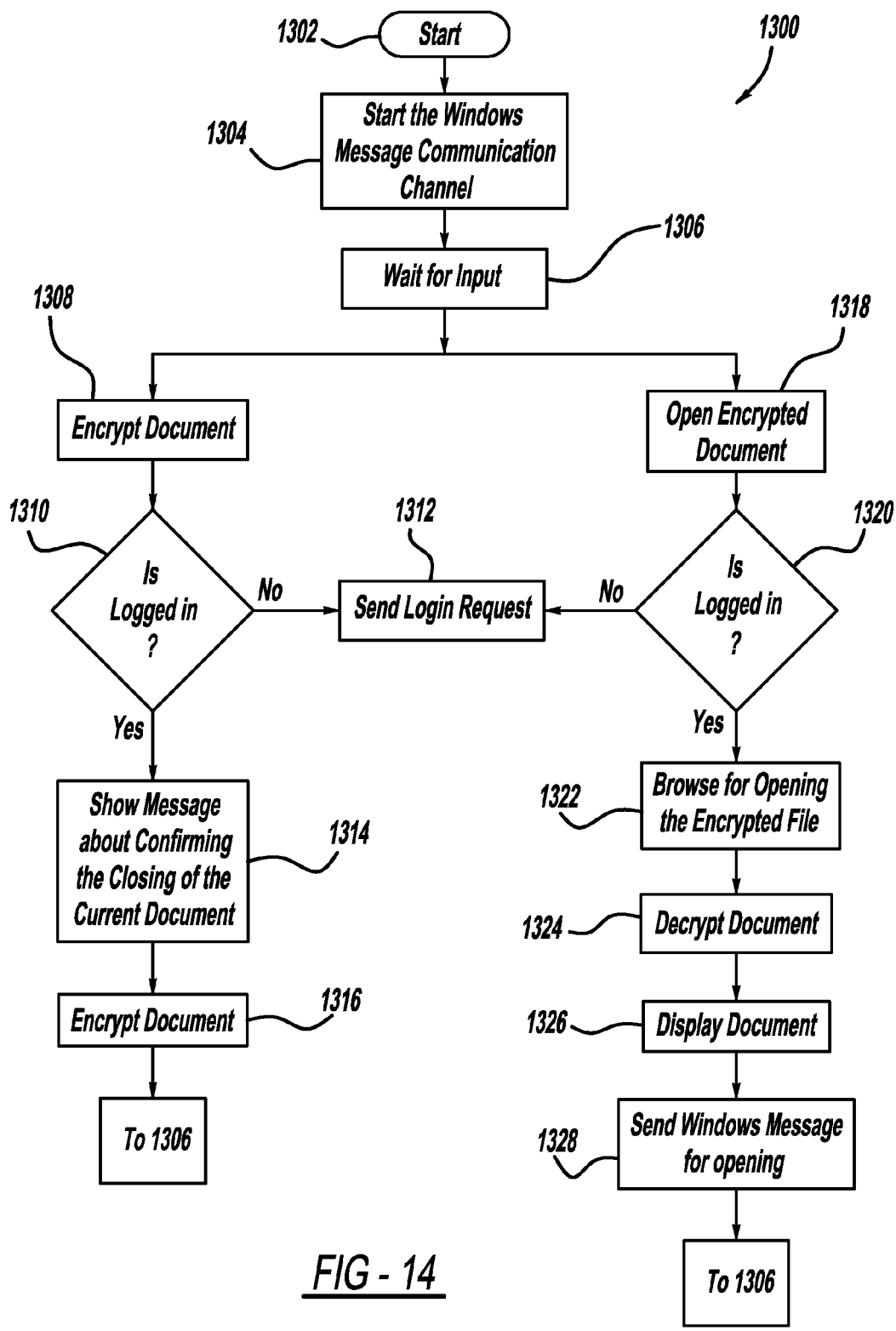
FIG. 14 is a schematic illustration of a flowchart illustrating processing steps of a file encryption and decryption system, in accordance with another embodiment of the present invention.

FIG. 14 shows a flowchart illustrating the steps performed when encrypting and/or decrypting and opening files, e.g., documents, for a Word, Excel, and/or PowerPoint Plug-in or Add-in that will automatically load when the application is opened for additional functionality (block 1302), generally shown at 1300. A Windows message communication channel is started (at block 1304) for processing messages, e.g., converting, and/or reading, and/or writing, and/or authenticating, and the like processing of messages from the network, and waits for input (at block 1306) on what processing is requested. By way of non-limiting examples, a user working on a document can request document encryption or browse for encrypted documents in the storage device and/or network. If it is desired that the document be encrypted (block 1308) and it is determined that the user is not logged in (at act 1310), a user's login request is sent (at act 1312) to the web server 24 for remote authentication, as set forth in greater detail below.

If it is determined that the user is logged in (act 1310), message is shown notifying and confirming that the current document will close (at act 1314). The document is then encrypted (at act 1316). The windows message communication channel (block 1304) remains active and waits for additional input (block 1306). If a document is already encrypted and the user desires to open the encrypted document (block 1318) and if it is determined that the user is not logged in (at act 1320), a login request is sent (act 1312) to the web server 24 for remote authentication, as set forth in greater detail above. If it is determined that the user is logged in (act 1320), the user can browse for the encrypted document (at act 1322) to open. The document is then decrypted (at act 1324). The document is displayed to the user (at act 1326) and a Windows message is sent for opening the document (at act 1328) in human-perceivable or readable form. The windows message communication channel (block 1304) remains active and waits for additional input (block 1306).

Referring to FIGS. 15a to 15e generally, there is depicted a flowchart illustrating the steps performed for encrypting and/or decrypting files, shown generally at 1400, in accordance with certain embodiments of the invention. There are depicted various types of application plug-ins, e.g., Word, Outlook, shell extension(s), Internet Explorer ActiveX, that can be in data communication with a graphical user interface (GUI). Information and actions available to the user 14 can be through graphical icons, visual indicators, and the like, shown generally at 1402. When an action is requested (at block 1404), it must be determined whether or not the program is running (at act 1406). It is understood that the requested action can originate from the program interface, shell extension, and/or Office application, and the like. If the program is running (at 1406) and the user 14 is logged in (at act 1408), then a message processor 1410 determines the requested action that is received from the program user interface, shell extension(s), and/or Office application(s). The file can be processed by encrypting it, decrypting it, and/or opening an unencrypted file (see FIGS. 15*b* and 15*c*).

For file processing (at block 1412), the user can request encryption, decryption, and/or opening an unencrypted file. When the user's 14 requested action is encryption, shown generally at 1414, if the file is not determined to be a folder (at act 1416), e.g., is not a folder containing greater than one file therein, the file is encrypted (at block 1418). A report 1420 is sent to the web server 24 confirming that the file was encrypted for that computer identification ("ID"), e.g., computer serial number, to which the user 14 is logged-in (login is associated) and an announcement that the requested action is finished and the next state to enter is made (at act 1421). If the file is determined to be a folder (at 1416) and while the number of files are determined to be greater than zero (at 1422), each file in the folder will be encrypted (at block 1424). A report 1426 is sent to the web server 24 confirming that the files were encrypted for that computer ID and an announcement that the requested action is finished and the next state to enter is made (act 1421).

For file processing (at block 1412), if the user's 14 requested action is decryption, shown generally at 1415, and if the file is not determined to be a folder (at act 1428), e.g., is not a folder containing greater than one file therein, the file is decrypted (at block 1430). A report 1432 is sent to the web server 24 confirming that the file was encrypted for that computer ID and an announcement that the requested action is finished and the next state to enter is made (act 1421). If the file is determined to be a folder (at act 1428) and while the number of files are determined to be greater than zero (at 1434), each file in the folder will be decrypted (at block 1436). A report is sent to the web server 24 (at act 1438) confirming that the files were encrypted for that computer ID and an announcement that the requested action is finished and the next state to enter is made (act 1421).

Figure 15A:
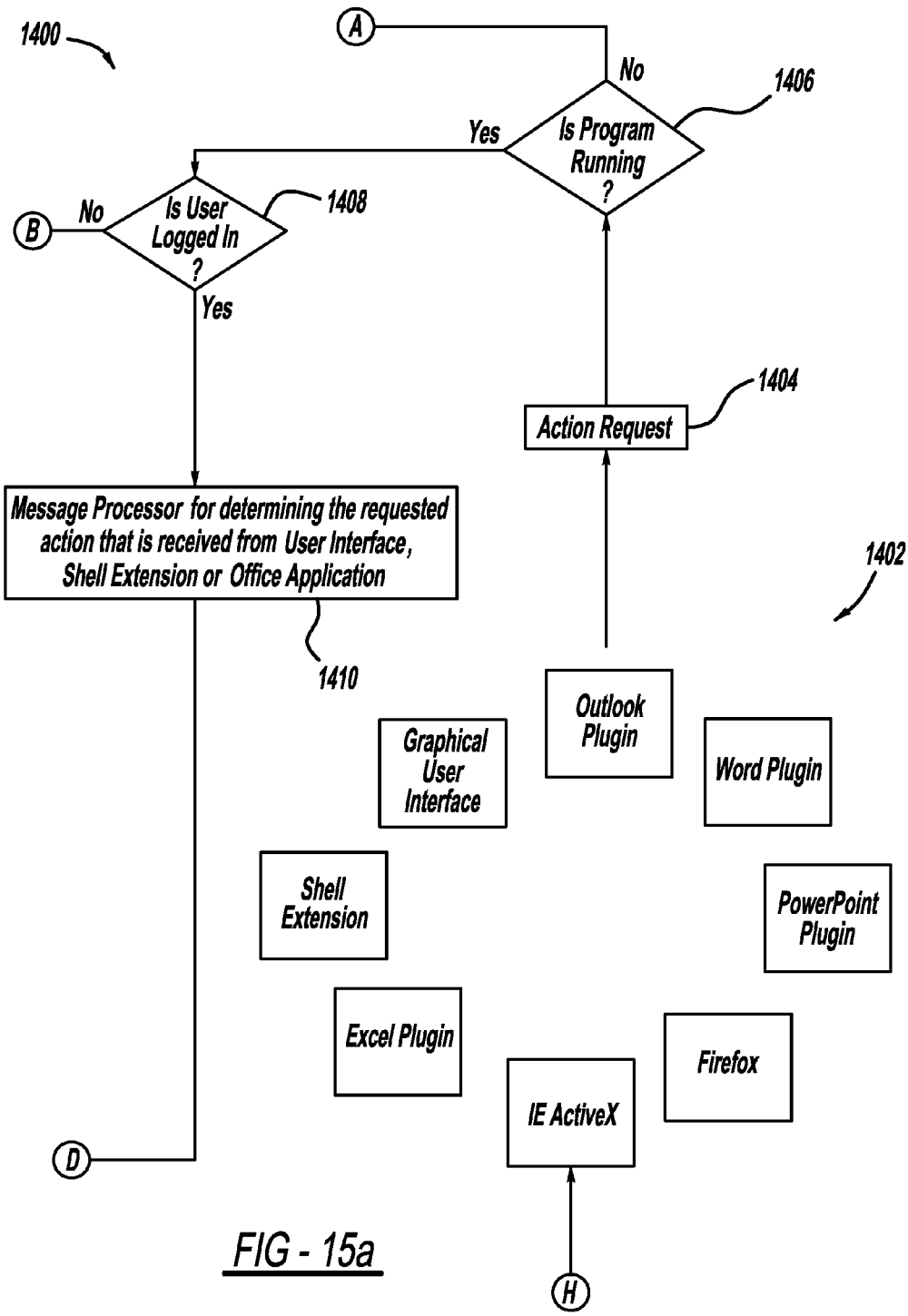
FIG. 15a is a schematic illustration of a portion of a flowchart of FIGS. 15a-15e illustrating primary processing steps of a file encryption and decryption system, in accordance with another embodiment of the present invention.
Figure 15B:
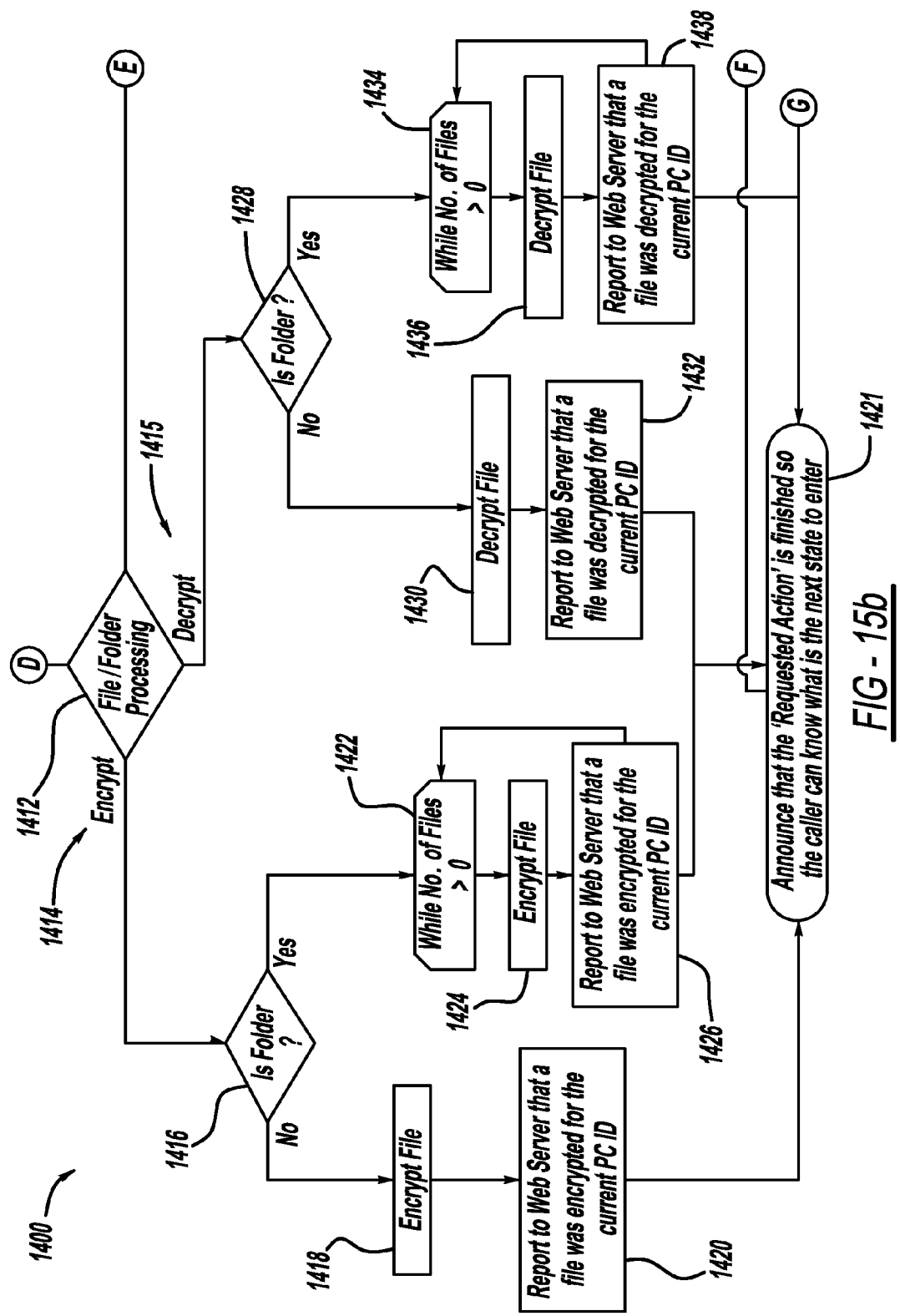
FIG. 15b is a schematic illustration of a portion of the flowchart of FIGS. 15a-15e illustrating primary processing steps of the file encryption and decryption system, in accordance with the present invention.
Figure 15C:
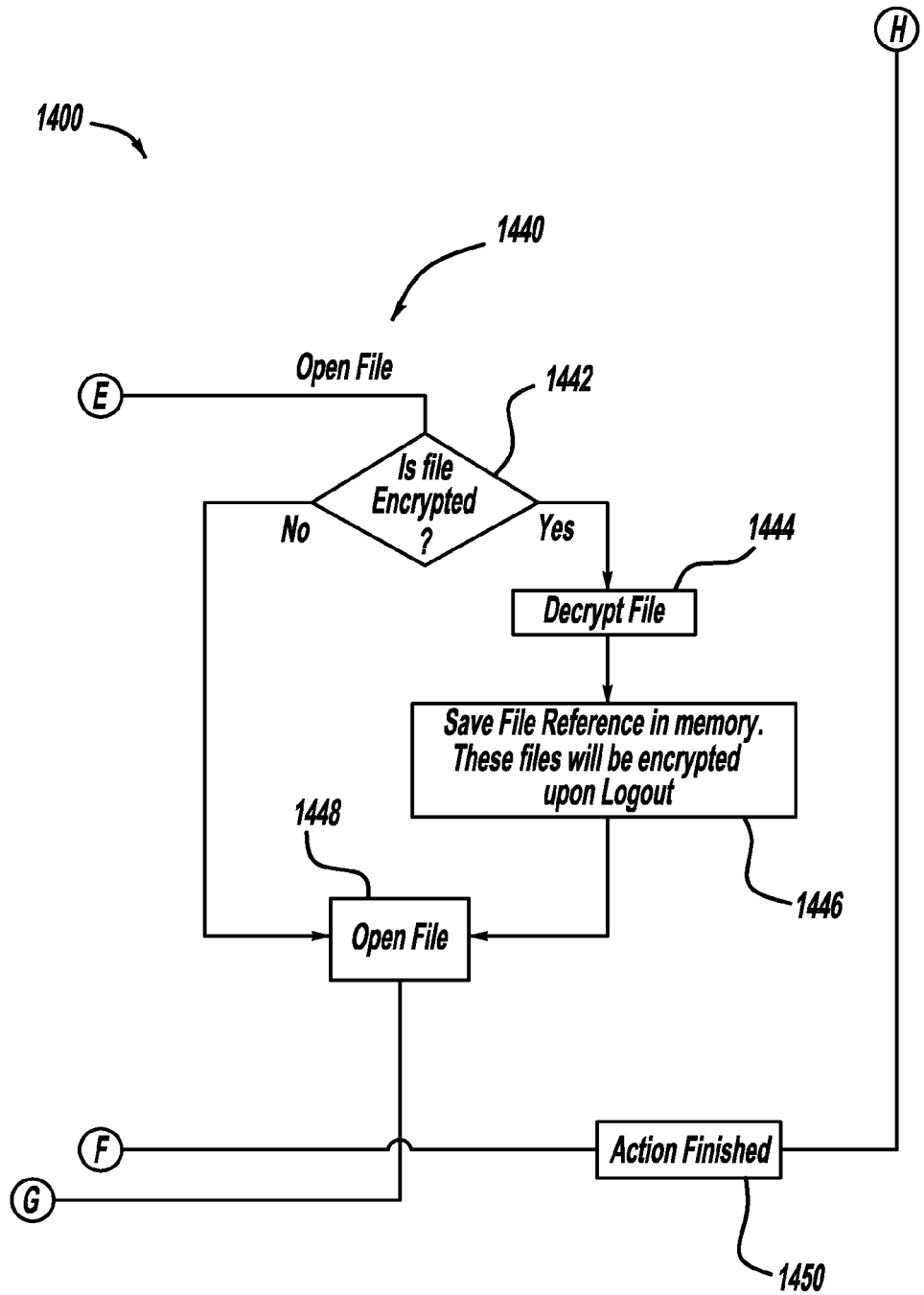
FIG. 15c is a schematic illustration of a portion of the flowchart of FIGS. 15a-15e illustrating primary processing steps of the file encryption and decryption system, in accordance with the present invention.

For file processing (at block 1412), if the user's 14 requested action is to open a file, shown generally at 1440 in FIG. 15*c*, and if the is not determined to be encrypted (at act 1442), the file is opened (at act 1448) allowing the user 14 to read its contents and work with and/or save down the file unencrypted and/or request encryption. If the file is determined to be encrypted (act 1442), the file will be decrypted (at block 1444). The file reference will be saved in the memory (at act 1446) and the file can be encrypted upon the user 14 logging out. The file is opened (act 1448) allowing the user 14 to read its contents and work with the file, and an announcement that the requested action is finished and the next state to enter is made (act 1421). File processing action is finished (at block 1450).

By way of non-limiting example, the user 14 can input number and letter characters and calculations into a Microsoft Excel document and click on an encryption key operably disposed in a toolbar or dropdown menu to request or command that the file be encrypted to help mask the data from being viewable by an undesired party. Preferably, the encryption key is a "one-click" to encrypt key. Another example is a user 14 creates a new email sage in Outlook and requests encryption, preferably with a "one-click" to encrypt key, prior to sending. Another example is a user 14 creating a smartphone message, e.g., on a Droid™, and requests encryption, preferably with a "one-click" to encrypt touch screen button. Yet another non-limiting example is a registered party receives an encrypted email and clicks a decrypt key to decrypt its contents, preferably with a "one-click" to decrypt key.

Figure 15D:
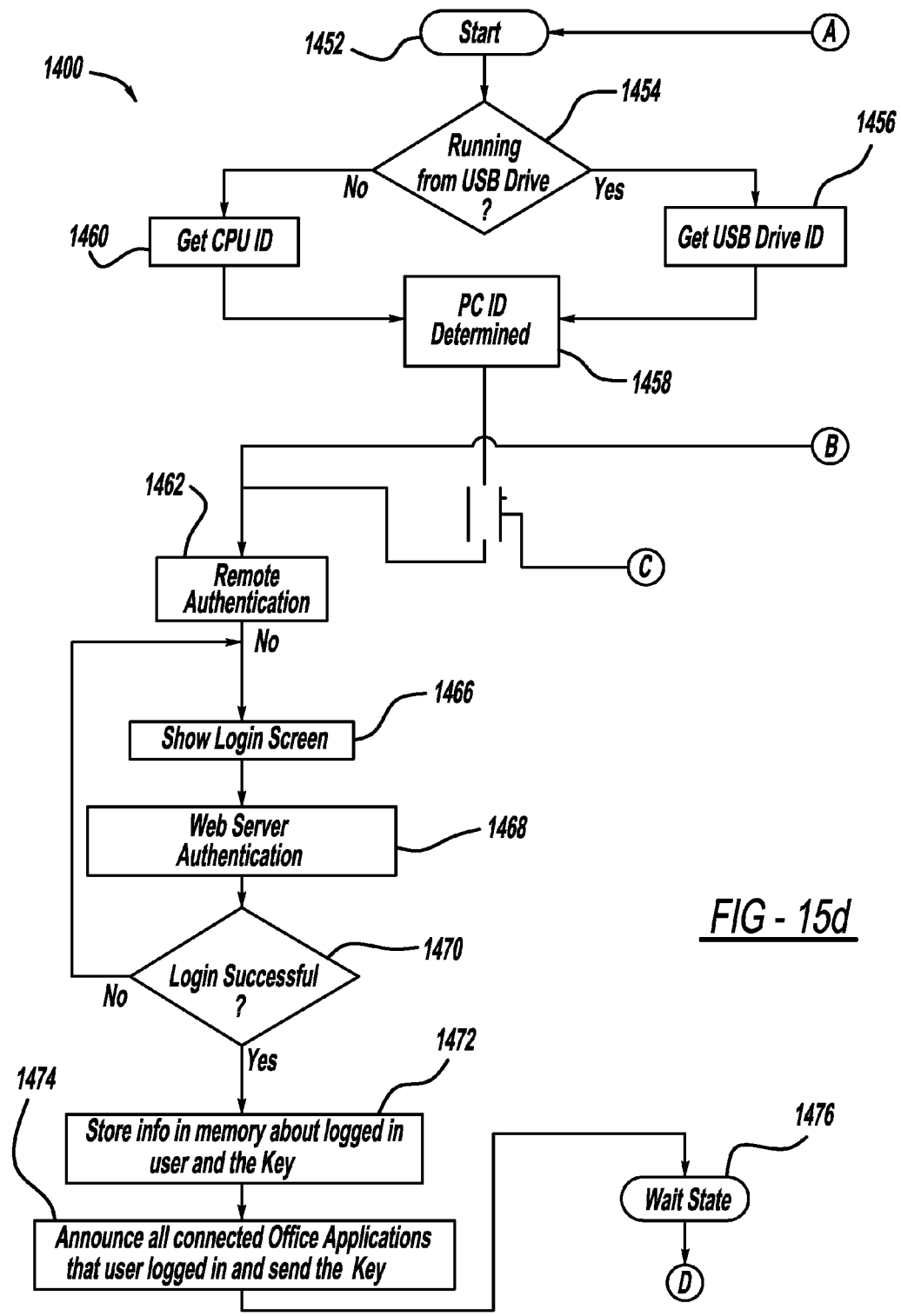
FIG. 15d is a schematic illustration of a portion of the flowchart of FIGS. 15a-15e illustrating primary processing steps of the file encryption and decryption system, in accordance with the present invention.
Figure 15E:
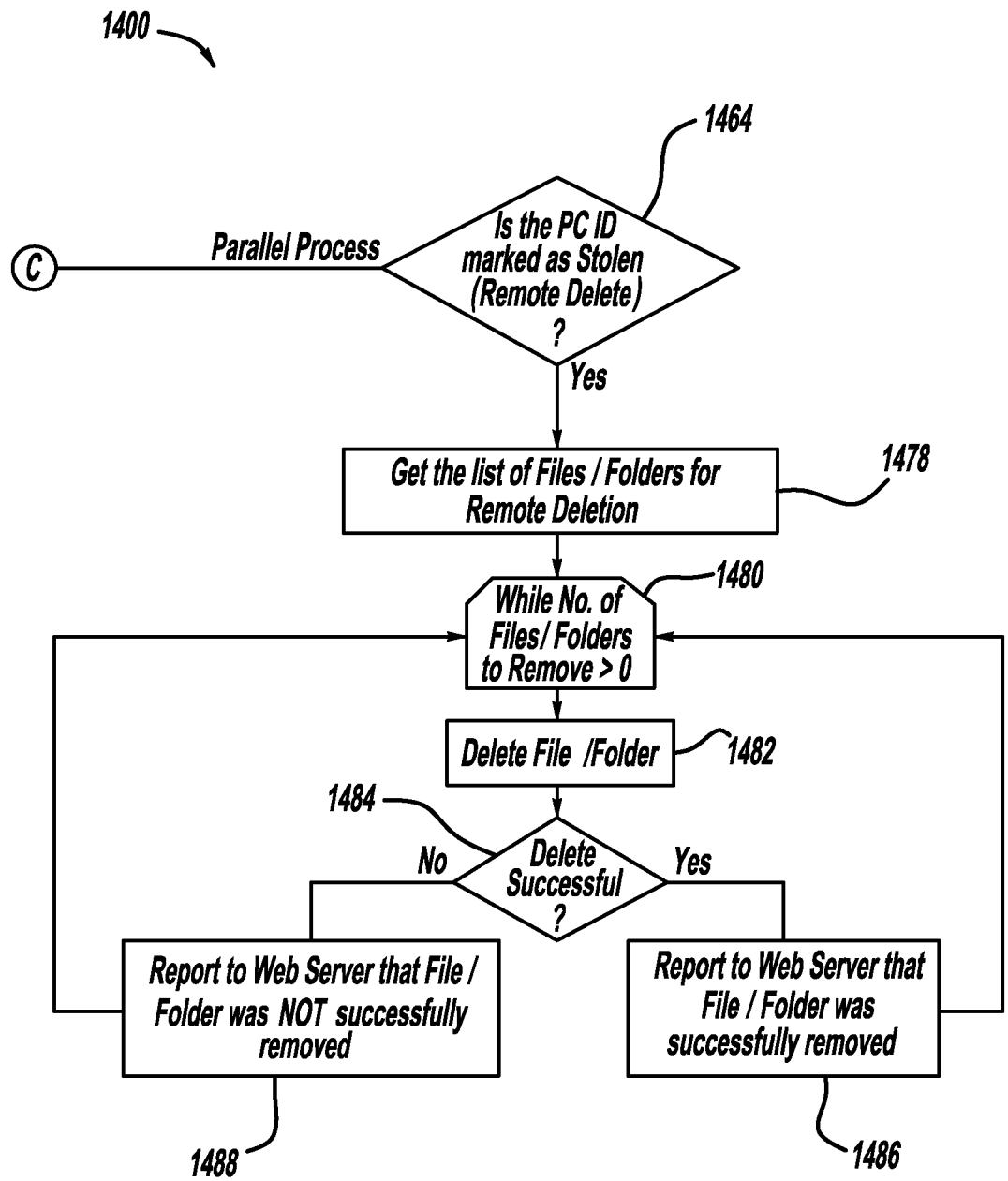
FIG. 15e is a schematic illustration of a portion of the flowchart of FIGS. 15a-15e illustrating primary processing steps of the file encryption and decryption system, in accordance with the present invention.

Referring to FIGS. 15*a* to 15*e* generally, and more particularly to FIGS. 15*d* and 15*e*, there is depicted a flowchart illustrating the steps performed for remote authentication 1462 and remote deletion 1464 for authenticating credentials prior to encrypting/decrypting and/or opening files, in accordance with certain embodiments of the present invention. If the program was determined not to be running (at 1406 shown in FIG. 15*a*), the program can be started (at block 1452) by first determining whether the program is running from a universal serial bus (USB) (at act 1454), if it is running from the USB drive, the USB drive identification is retrieved (at act 1456) and the computer 12 identification is determined (at act 1458). If it is not running from the USB drive, the central processing unit (CPU) identification is retrieved (at act 1460) and the computer 12 identification is determined (act 1458). Once the computer 12 identification is determined (act 1458), e.g., computer serial numbers and the like automatically obtained, parallel processes implement the remote authentication and remote deletion. Additionally, the user 14 must be logged-in to open and/or view encrypted files and to decrypt. Thus, if the user 14 is not determined to be logged-in (act 1408 shown in FIG. 15*a*) the remote authentication and remote deletion processes are entered (starting at blocks 1462 and 1464 respectively).

A remote authentication login screen 1466 allows the user 14 to enter the authentication user credentials and the web server 24 authenticates the entry (at act 1468), e.g., matches entered credentials with stored credentials on the web server 24 database. It is understood that authentication can additionally require that at least the computer identification that was determined (act 1458) correspond with the user credentials entered by the user 14 on the login screen 1466, e.g., user credentials and computer identification matches stored credentials on the web server 24 database. If it is determined that the login was not successful (at act 1470), the user 14 is directed back to the login screen 1466. If the user 14 logs-in on the login screen 1466 using the user's 14 credentials and the web server 24 authenticates the information using the database (at 1468), the login can be determined to be successful (act 1470) and the logged in user 14 and key information e.g., encryption key and/or decryption key, can be stored in the memory (at act 1472). The user 14 is notified of all connected applications 14, e.g., Office Applications, that the user 14 logged in and the web server 24 sends the user 14 the key (at act 1474). It is understood that user credentials can include personal information, name, address, secret answer, password(s), and the like.

The user authentication/authorization decision can be taken on the web server 24 side and the communication between the program and the web server 24 is encrypted. Another important protective benefit is that the web server authentication (act 1468) database is only accessible from the server/network where it resides, so it helps to prevent being broken into by outside hackers due to its isolation.

Once the user 14 is notified of all connected applications 14 and the key is sent (act 1474), a wait state (block 1476) can be entered followed by the message processor 1410 (FIG. 15*a*)

determining the requested action that is received from the program user interface, shell extension(s), and/or Office application(s). The file(s) can be processed by encrypting, decrypting, and/or opening an unencrypted file (See FIGS. 15b and 15c).

Remote deletion implements automatic deletion of at least encrypted files when a reported lost or stolen computer 12 is connected to the internet. The user 14 can have the computer 12 marked as lost, stolen, or otherwise compromised, e.g., by calling a support center and providing user credentials and/or secret answers(s). Once activated, remote delete will delete all encrypted files from a hard drive and/or storage device substantially immediately upon connection to the internet. The compromised computer's identification is automatically determined upon connecting to the internet. When connected to the internet if it is determined that the computer 12 identification is marked as lost or stolen (at act 1464) the files will automatically be deleted. A list of files for remote deletion is obtained (at act 1478), e.g., these can include a list of encrypted files on the hard drive. Optionally, the user 14 can additionally define other paths for being deleted from the stolen computer 12 (e.g., D:\My Documents, unencrypted files). If the number of files to delete is determined to be greater than zero (at act 1480), the file will be deleted (at act 1482). If it is determined that the file was successfully deleted (at act 1484), a report 1486 is sent to the web server 24 confirming that the file was successfully removed. If it is determined that the file was not successfully deleted (act 1484), a report 1488 is sent to the web server 24 confirming that the file was not successfully removed, and deletion is again attempted. The remote delete continues until the number of files to remove is zero.

Referring to the Figures generally, it is understood that the encryption key can be stored on the remote server.

It is within the contemplation of this invention that any previously encrypted the can optionally be re-encrypted automatically upon the user dosing out of the and/or upon logging off.

Generally, in accordance with the present invention, encryption/decryption keys allow selective decryption of encrypted items that are on the computer or computer of any kind. A Microsoft® Windows Communication Foundation (WCF) service can help authenticating the users with the encryption/decryption key and login process shared and processed by the web server. Typically, the WCF service is used to authenticate users with the encryption/decryption key and login process stored and processed by the web server through WCF. Typically, the WCF service and computer ID can be used to identify and remote delete a compromised computer. Typically, the remote authentication and WCF service can be used to encrypt and/or decrypt.

The encryption system, in accordance with the present invention, has "Plug-ins" for applications in the Microsoft Office™ Suite for example. It is understood however, that "Plug-ins" for other applications can be used, including, but not limited to, Macintosh and the like. Thus, the encryption system, can include plug-ins, including, but not limited to, Microsoft Office™ Suite plug-ins and Internet Explorer (IE) ActiveX™, Firefox™ add on, and etc, and encrypts files directly from the application, including, but not limited to, Word™, PowerPoint™, Outlook™, and etc, and can be compatible with various operating systems, including, but not limited to, Microsoft Office™ 2003, 2007, 2010, Windows Mobile™, Macintosh™, Windows Internet Explorer™, BlackBerry™ OS (operating system), Android™ OS, and the like. It is understood that plug-ins for other applications can be used, including, but not limited to Adobe™, Photoshop™, QuickTime™, media players, Acrobat™ Reader, Inuit QuickBooks™, and etc. Typically, in accordance with the present invention, a Microsoft® SQL Server 2008 platform can be utilized and is built on a Microsoft.NET framework. The communication with the web servers) can be performed using secured Microsoft® Windows communication Foundation services. The encryption system and method can comprise a direct plug-in for Microsoft Windows®, Internet Explorer®, and etc for use with Outlook™, Outlook Web Access, Gmail™, Yahoo™, AOL™, Hotmail™, and any other web-based email clients. It is understood that Microsoft® SQL Server 2000 to 2008, Microsoft® Access 2003 to 2010, and the like can be supported.

The encryption system also includes remote authentication to verify a user's credentials and/or key stored in a remote database on a host or web server. The encryption system further includes remote delete to automatically delete encrypted files stored on or otherwise tied to the user's computer, e.g., when the computer is connected to the internet, if the user reports the computer as lost or stolen.

Referring to the Figures generally, encryption used herein includes encryption that allows for selectively converting, sending and/or storing encrypted files to protect or secure the file contents by helping to prevent unauthorized individuals from viewing files in human-perceivable or readable form. Decryption used herein includes decryption that allows for selectively decrypting files to be viewed in human-perceivable or readable form. The description herein assumes a basic understanding of encryption and decryption by the reader.

It is understood that the terms "file", "document", and "item(s)" used herein includes, but is not limited to, any type of file, folders, documents, data, plaintext, electronic mail ("emails"), attachments, music photos, digital images, videos, graphics, scanned items, spreadsheets, displays, personal information, contact lists, directories, confidential or privileged information, SMS messages, text messages, calendars, notebooks, electronic messages, and any other file of any kind, and combinations thereof. It is further understood that the term "email" includes any email content, e.g., files, attachments, etc. Additionally, it is understood that any operating environments, and/or systems, and/or configurations described herein in which the invention may be implemented is not intended to limit the invention, its application, or uses and that other computing systems, environments and/or configurations may be used. It is understood that the network can include Internet, wireless network, and etc. The term computer can include any type of computer including, but not limited to, personal computers, laptop computers, computing device, handheld or portable devices, smartphones, e.g., Android™, BlackBerry™, Nokia™, and HTC™, mobile phones, portable media players, portable gaming consoles, Global Positioning Units (GPS), notebook computer, tablet, and any other computer of any kind are all contemplated.

The method in accordance with the present invention can obtain and transmit predetermined credentials via a network such as the Internet to the web server for remote authentication and/or remote deletion of encrypted files using wireless or wired communication or any other type of data communication network. Any encrypted files on the computer remain unreadable or unperceivable until decrypted even if the computer is lost, stolen, or otherwise compromised. If the user reports the computer as lost or stolen, the encrypted files will automatically be deleted remotely via remote delete when the computer is first connected to the Internet, thereby helping to prevent encrypted files from ever being seen or read by a thief or other undesired party. Additionally, the user can optionally selectively send encrypted files to at least a second user's computer, e.g., sending an email and/or text message to another person's email address and/or phone number accessible on any computer via the network, and the receiving party can selectively decrypt the file using a key retrieved if the users are linked.

It is understood that up to at least about Advanced Encryption Standard (AES) 512-bit encryption, e.g., at least AES 256-bit robust encryption, can be used, in accordance with the present invention.

Storing customer, client, and patient information on a user's laptop or personal computer requires security of important, private information that will protect all electronic information and data. The encryption system can help aid the user in compliance with privacy and confidentiality laws, service provider requirements, industry standards, customer/client/patient confidentiality, and any other type of Federal and State privacy/confidentiality laws and regulations, e.g., the Health Insurance Portability and Accountability Act (HIPAA), HITECH Act, Sarbanes—Oxley Act (SOX) ('Public Company Accounting Reform and Investor Protection Act'), the Visa Payment Card Industry Document Security Standards (VISA PCI DSS), Basel Accords (Basel II), and the like. By encrypting files the user improves protection of valuable data from being hacked, used, or accessed by anyone. In addition, the encryption system does not use valuable system resources or take up additional hard drive space for encryption. The program can run quietly in the background without burdening the user's system resources. Running in the background of the user's computer also helps to keep their information private, protected and unreadable.

Figure 16:
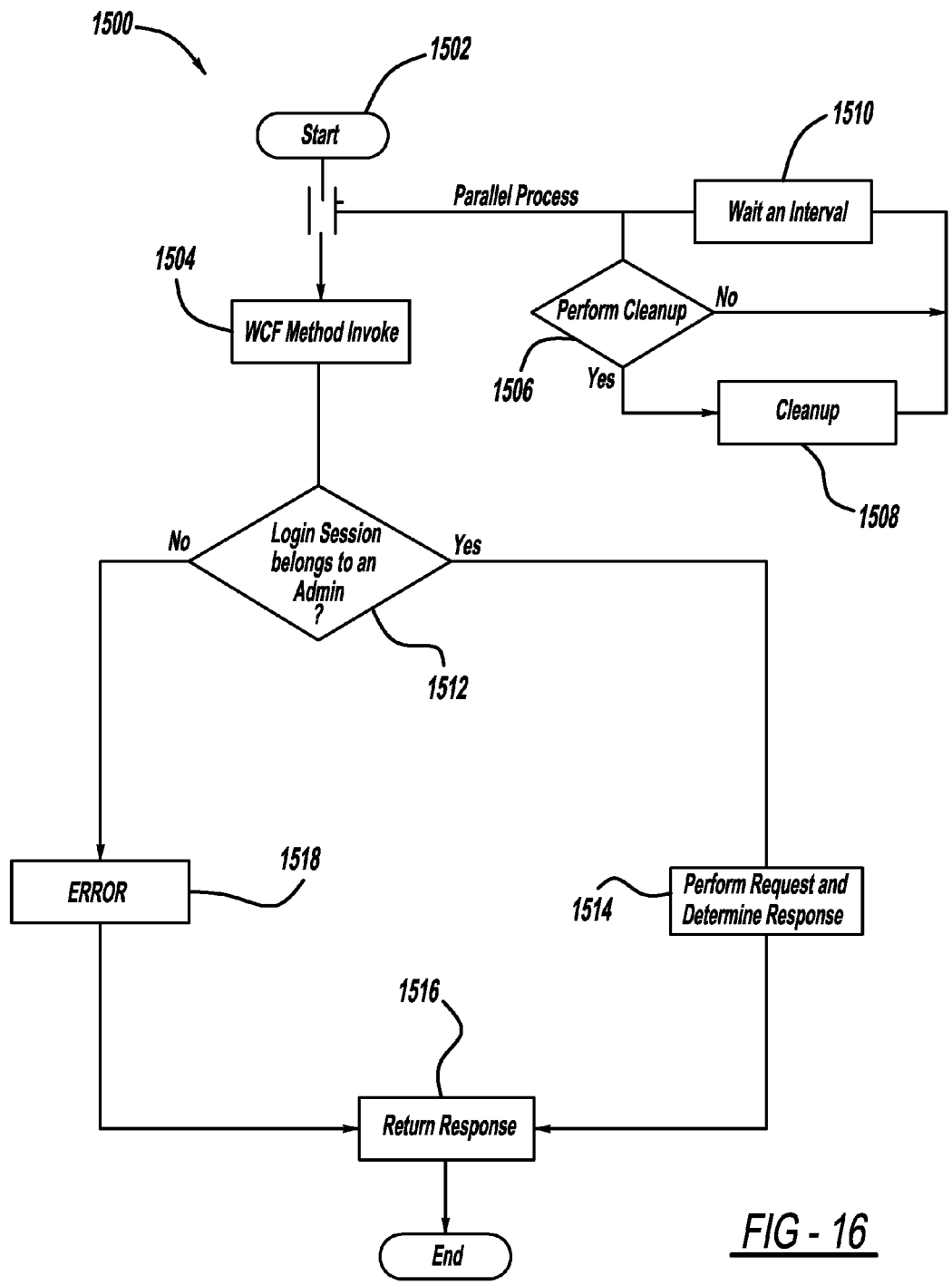
FIG. 16 is a schematic illustration of a flowchart illustrating processing steps of a Windows Communication Foundation service for authentication for a file encryption and decryption system, in accordance with another embodiment of the present invention.

FIG. 16 depicts a flowchart illustrating a process for establishing a connection between at least one computer and an administrative web server using a Windows Communication Foundation ("WCF") service, shown generally at 1500, in accordance with another embodiment of the invention.

The process starts, shown as block 1502, and moves to a parallel process wherein a WCF method is invoked (at act 1504) and a cleanup process is performed starting at act 1506. Generally, a server validates user logins. Typically, every time a user requests that an action be performed, e.g., email encryption, the server must authenticate the user's 14 login and/or the user 14 has to re-establish the connection and be re-authenticated, e.g., the user 14 must re-instate their login if timed out. It is understood that the user's authentication credentials can be stored and processed by the server every time a request is made such that credentials are not held locally on the computer 12.

The cleanup process 1506 enables a user 14, e.g., administrator, to "cleanup" an invalid entry during authentication, e.g., a login error can notify the user that the username and/or password is invalid. If it is determined that a cleanup is required (at act 1506), the cleanup is performed (at act 1508) prior to waiting a predetermined interval (block 1510) to determine if additional cleanup is necessary.

The WCF method is invoked (act 1504), e.g., as an application programming interface (API), and if it is determined that the user inputted a valid login (at decision 1512), the requested action is performed (at act 1514) and a confirmation response is given (at act 1516). If the login session is not determined to be valid (act 1512), an error message is issued (at block 1518) and a corresponding return response is given (act 1516).

Figure 17:
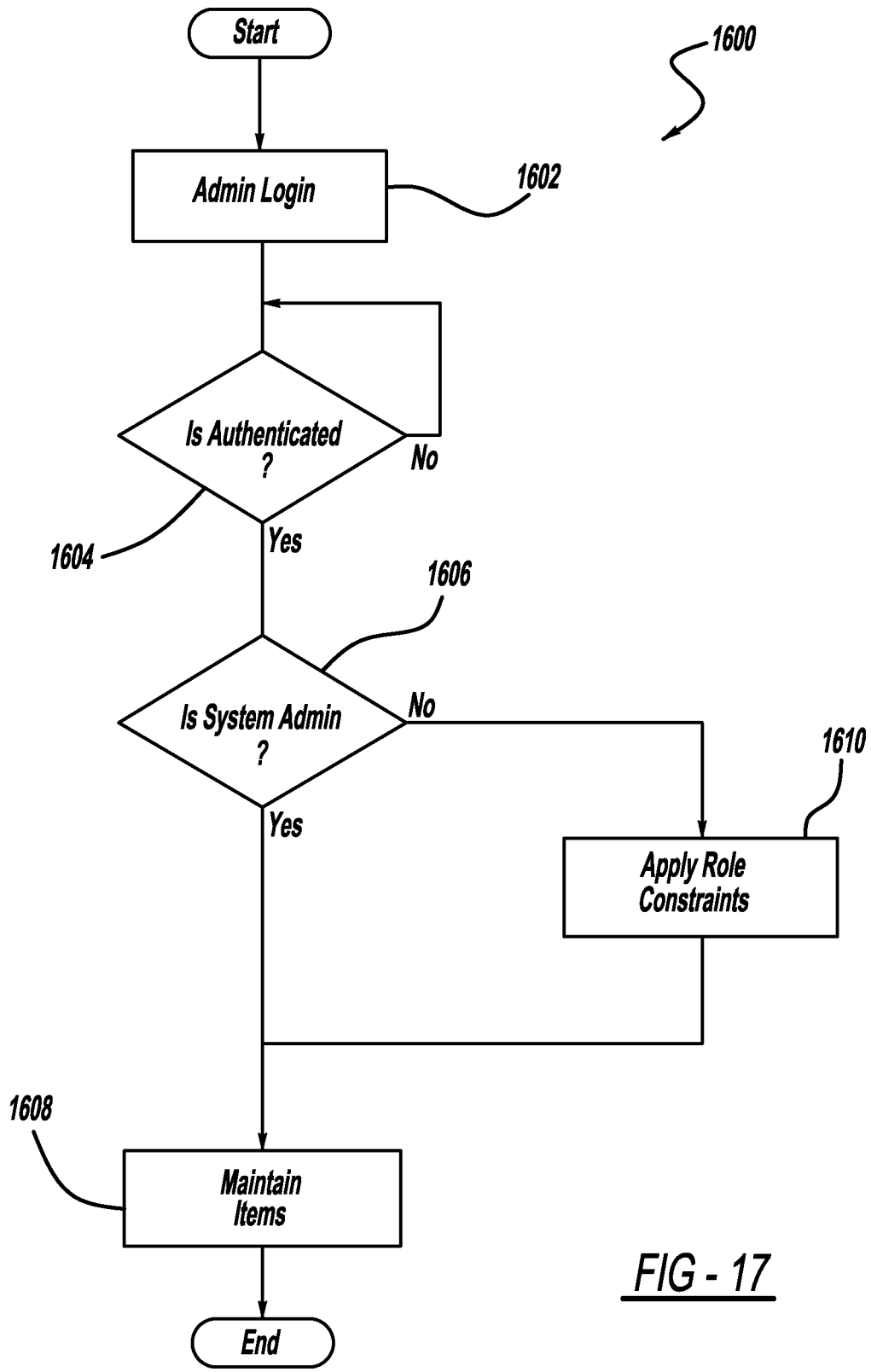
FIG. 17 is a schematic illustration of a flowchart illustrating processing steps for authenticating a system administrator for a file encryption and decryption system, in accordance with another embodiment of the present invention.

FIG. 17 is an illustration of an exemplary helpdesk application, shown generally at 1600, comprising an administrator login (at act 1602), in accordance with another embodiment of the present invention. Once the administrator's login is authenticated (at decision 1604) and the computer is authenticated as an administrative system (at decision 1606), the encrypted/decrypted items and/or access thereto is maintained (at act 1608). If it is determined that the system is not administrative (act 1606), role constraints are applied (at act 1610) limiting or eliminating access and/or retrieval of encrypted items.

Referring to FIGS. 16 and 17 in general, generally, an administrative console and/or at least one administrative computer can be enabled allowing a user, e.g., an entity or person(s), to utilize the user's own server(s), e.g., intranet servers, administer internal licenses for use and encryption/decryption keys, add and/or delete users, and/or set user encryption policies, e.g., company policies.

Figure 18:
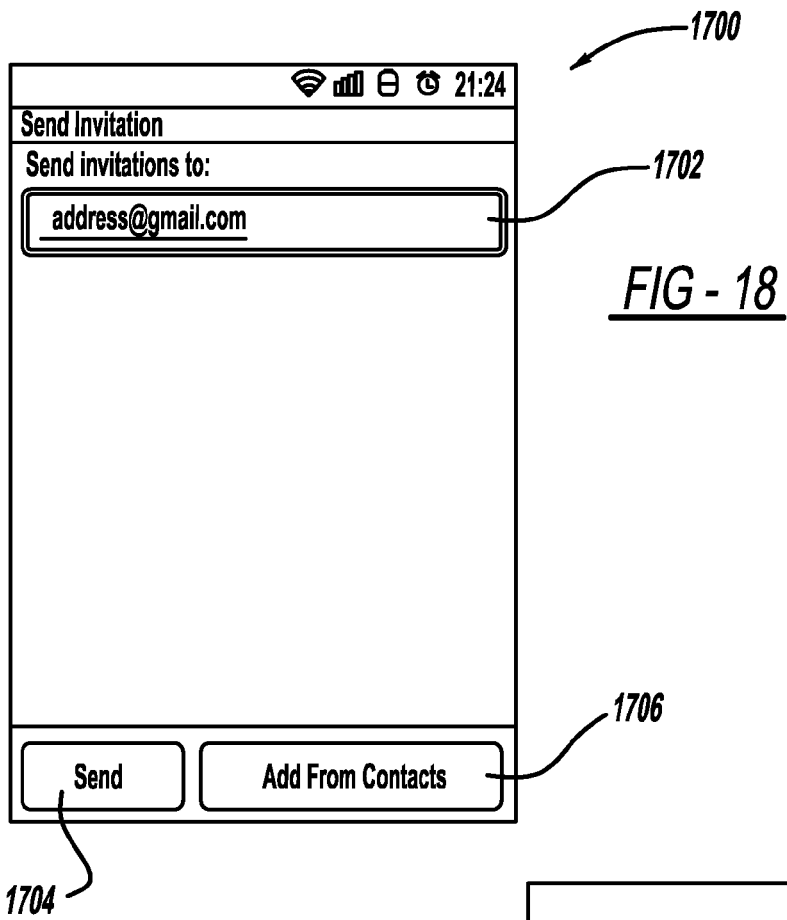
FIG. 18 is a screen capture of an exemplary mobile device depicting a touch screen for sending an invitation that can be used with various embodiments of the invention.

FIG. 18 is a screen capture of an exemplary mobile device, e.g., Android™, depicting a touch screen for sending an invitation to at least one webmail address, shown generally at 1700, that can be used with various embodiments of the invention. If the recipient accepts the invitation, it is stored at the remote web server so that the users are linked with one another. This can allow a user to not have to send a decryption key with an encrypted message. The user can type in the recipients email address (at 1702) or add at least one recipient from the users contact list (at 1706) and send the invitation (at 1704).

Figure 19:
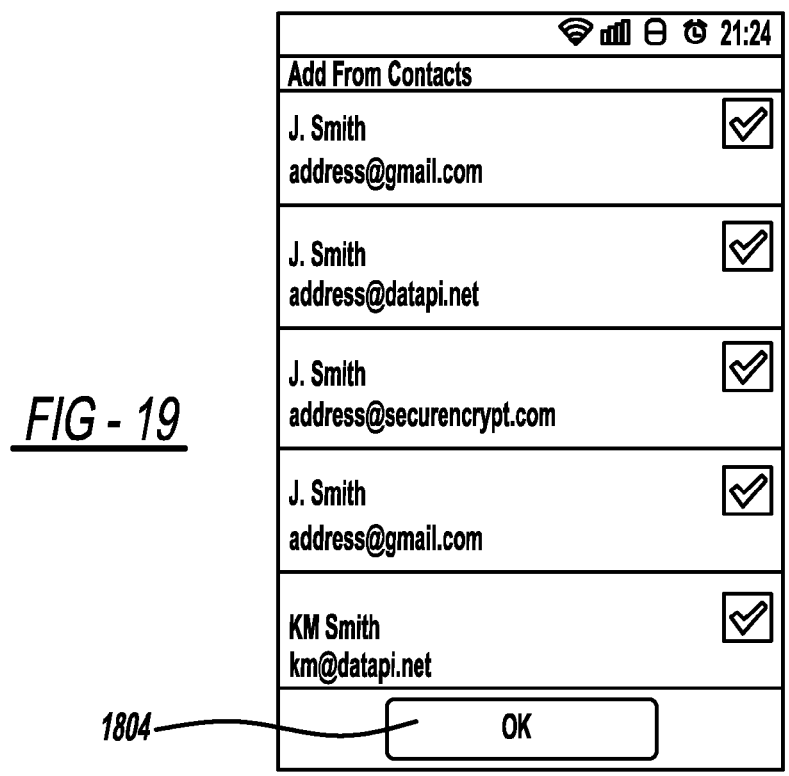
FIG. 19 is a screen capture of an exemplary mobile device depicting a touch screen contact list for selecting contacts for sending an invitation that can be used with various embodiments of the invention.

FIG. 19 is a screen capture of an exemplary mobile device illustrating a touch screen for selecting at least one contact from said users contact list, shown generally at 1802, and adding (at 1804) the contact(s) to the invitation of FIG. 18, that can be used with various embodiments of the invention.

Figure 20:
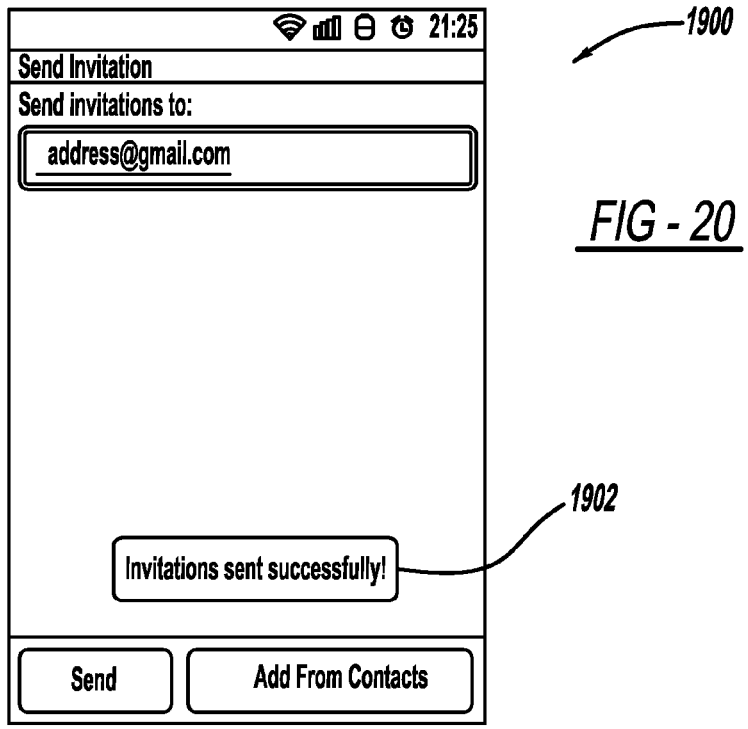
FIG. 20 is a screen capture of an exemplary mobile device depicting a touch screen notification that invitations were sent successfully that can be used with various embodiments of the invention.

FIG. 20 is a screen capture of an exemplary mobile device illustrating a touch screen, shown generally at 1900, notifying the user that the invitation was sent successfully (at 1902), that can be used with various embodiments of the invention.

Figure 21:
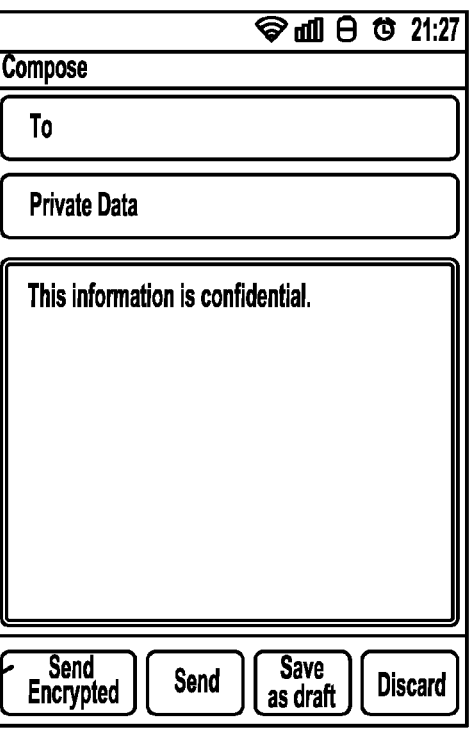
FIG. 21 is a screen capture of an exemplary mobile device depicting a touch screen including an encryption button for sending an encrypted message that can be used with various embodiments of the invention.

FIG. 21 is a screen capture of an exemplary mobile device illustrating a touch screen, shown generally at 2000, depicting a touch screen for sending an encrypted message using a send encrypted button 2002 on said touch screen, that can be used with various embodiments of the invention. This provides a user with a "one-click" encrypt button on the same screen as the body of the message. By way of non-limiting example, a user can type a SMS text message and/or email to at least one recipient and touch the send encrypted button at the bottom of the touch screen for improved and time efficient encryption.

Figure 22:
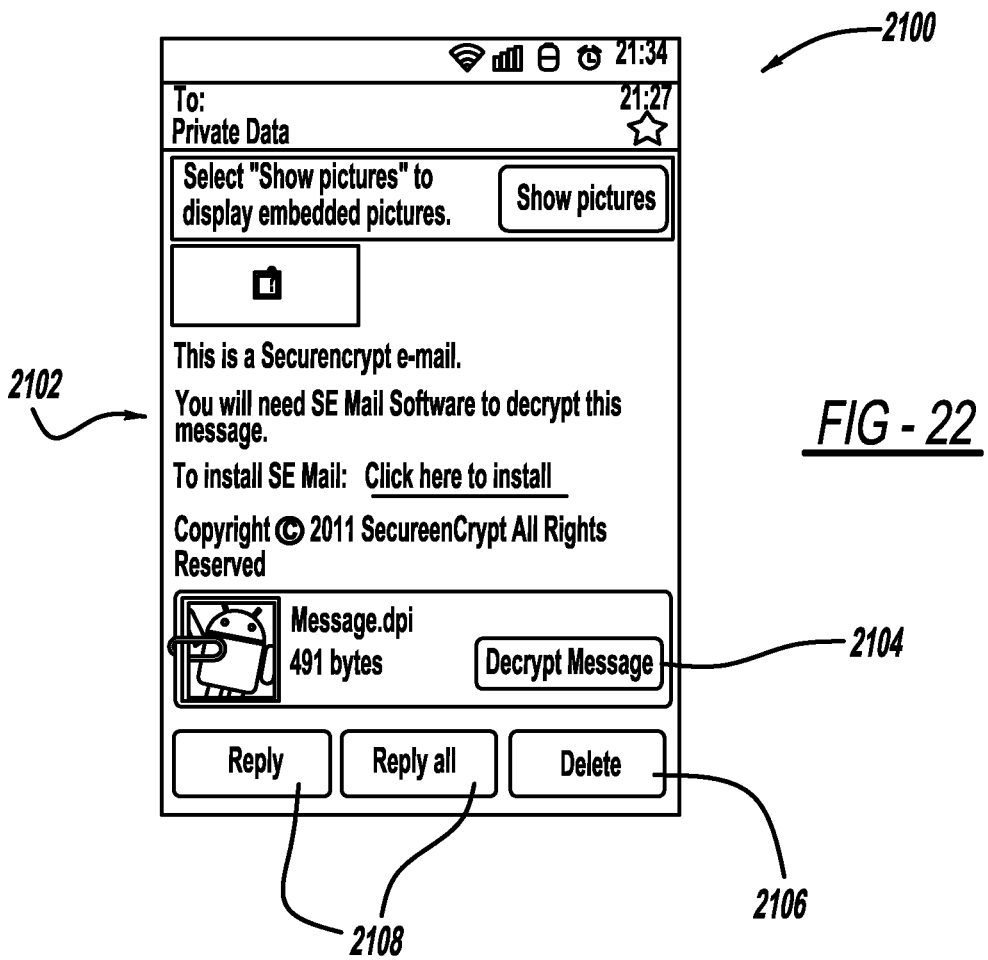
FIG. 22 is a screen capture of an exemplary mobile device depicting a touch screen including a decryption button for decrypting an encrypted message that can be used with various embodiments of the invention.

FIG. 22 is a screen capture of an exemplary mobile device depicting a touch screen for decrypting a message, shown generally at 2100, that can be used with various embodiments of the invention. The touch screen, shown generally at 2102, includes notification that the message and/or attachments are encrypted and need to be decrypted for viewing and/or links or instructions associated with decrypting the message. A decrypt message button 2104 is provided. This provides an authorized user with a "one-click" decrypt option on the same screen as the message. The user can also delete the message with a delete button 2106 on the touch screen and/or reply to the message sender(s) using the reply or reply all button 2108 on the touch screen.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A computer-implemented method of creating encryption and decryption of a computer file comprising the steps of:

assigning a key to a user;

retrieving and transmitting identification of said computer automatically upon said computer connecting to a network to at least one remote server;

comparing said computer identification with stored credentials identified for remote deletion for selectively deleting at least encrypted files from said computer if tagged for remote deletion;

receiving a request from a user that an action be performed to at least one item on a computer;

transmitting user credentials to said at least one remote server inputted by said user;

comparing said user credentials with stored credentials at said at least one remote server for authenticating said credentials associated with said user for controlling user requested access;

accessing said key where accessing said key comprises first said user sending an invitation, where said invitation is processed via asynchronous electronic mail service to improve performance, to a second user using said at least one remote server, and said second user accepting the invitation resulting in said user and second user being linked establishing a one-on-one relationship between these two parties;

applying said key assigned to said user that is unique to said user and stored on said remote server; and processing and performing said requested action of said authenticated user; and wherein asynchronous electronic mail service processing is via validated connections to database queues based on wait times.

2. The method of claim 1, further comprising identifying said requested action directed by said user as encrypting, decrypting, opening, and/or electronically sending of said at least one item.

3. The method of claim 1, wherein controlling user access further comprises matching said user credentials with pre-registered computer identification associated with said user credentials before granting said user access and performing said requested action.

4. The method of claim 1, wherein said key is an encryption and/or decryption key for selectively performing encryption and/or decryption of said at least one item.

5. The method of claim 1, further comprising selectively performing said requested action to said at least one item by retrieving and applying said key stored in one of at least one database on said at least one remote server.

6. The method of claim 1, further comprising
sending at least one encrypted item of said user electronically to said second user;
determining if said user and said second user are linked with one another using said at least one remote server;
accessing said key of said user if said user and said second user are linked;
applying said key for decrypting said at least one encrypted item;
decrypting said at least one encrypted item; and
displaying said at least one item in human-perceivable form to said at least one other user.

7. The method of claim 1, further comprising prompting said user to type in said key and applying said key for performing said user requested action to said at least one item.

8. The method of claim 1, further comprising
sending at least one encrypted item of said user electronically to said second user;
determining if said key can decrypt said at least one encrypted item;

displaying a message if said key is invalid for decrypting said at least one encrypted item;
displaying a computer window for typing another key or sending another invitation;
determining if the typed key can decrypt said at least one encrypted item;
decrypting said at least one encrypted item; and
displaying said at least one item in human-perceivable form to said at least one other user.

9. The method of claim 1, further comprising
sending at least one encrypted item of said user electronically to said second user;
determining if said key can decrypt said at least one encrypted item;
displaying a message if said key is invalid for decrypting said at least one encrypted item;
displaying a computer window for requesting another invitation be sent to link said user with said second user;
sending said another invitation using said at least one remote server;
determining if said key of said user after said user is linked with said at least one other user can decrypt said at least one encrypted item;
decrypting said at least one encrypted item; and
displaying said decrypted item.

10. The method of claim 1, wherein said user can have different keys for different users being provided encrypted items for decryption for added security.

11. The method of claim 1, wherein said user can send an invitation using said at least one remote server to at least one other user to link said user to said at least one other user for using said key stored at said at least one remote server for selectively decrypting items for as long as said user remains linked with said at least one other user.

12. The method of claim 1, further comprising
starting a Windows message communication channel for processing messages and requests received from said user;
determining if the action requested by said user involves Web-based electronic mail (Webmail);
determining if said user is logged in and authenticated; and
requesting said user to login for remote authentication if said user is determined to not be logged in and authenticated, and adding a reference of said Webmail to a processing queue.

13. The method of claim 12, further comprising
determining if said Webmail is encrypted;
determining whether at least one document has been attached to said Webmail;
encrypting any said attached document and encrypting the electronic mail hypertext markup language (HTML) body of said Webmail.

14. The method of claim 12, further comprising
determining if said Webmail is decrypted;
retrieving a list of users linked to one another;
applying said key if said users are linked;
decrypting the electronic mail hypertext markup language (HTML) body of said Webmail; and
displaying said decrypted item.

15. The method of claim 1, wherein said remote authentication further comprises
invoking a Windows message communication channel;
determining if a web camera is attached to said computer and if facial recognition is enabled;
determining a face template;
transmitting said face template to said Windows message communication channel for authentication; and generating a user login session and storing said login session in a database of said at least one remote server if authenticated.

16. The method of claim 1, further comprising encrypting the entire computer requiring remote authentication prior to decrypting.

17. The method of claim 1, wherein said user does not need to send said key to at least one other user provided encrypted items by said user for decrypting.

18. The method of claim 1, wherein said key and user credentials are not stored on said user's computer.

19. The method of claim 1, further comprising activating automatic encryption of all outgoing electronic mail if said user is logged in and authenticated.

20. The method of claim 1, further comprising activating automatic decryption of all incoming electronic mail if said user is logged in and authenticated.

21. The method of claim 1, wherein said remote deletion and said remote authentication are parallel processes activated substantially simultaneously.

22. The method of claim 1, wherein said computer is a mobile device.

23. The method of claim 1 wherein said user credentials are selected from the group consisting of username, password, secret answers, face recognition, and combinations thereof.

24. The method of claim 1, wherein said method further comprises invoking a Windows Communication Foundation (WCF) service for enabling requested actions.

25. The method of claim 1, further comprising
receiving a user request to mark said computer as compromised;
storing identifying compromised computer information at said at least one remote server;
generating a list of items and directories containing items for remote deletion;
retrieving said compromised computing device identification automatically upon said computing device connecting to a network;
comparing said computing device identification with said remotely stored credentials;
controlling remote deletion of at least encrypted items and/or directories; and
reporting said deleted items as deleted to said at least one remote server.

26. The method of claim 1, wherein deleting at least encrypted files from said computer further comprises deleting the entire contents of said computer if tagged for remote deletion.

27. The method of claim 1, wherein a user touch screen is provided with a touch screen button for encryption and/or a touch screen button for decryption, for selectively requesting actions to be performed by a single touch of the respective button.

28. The method of claim 1, further comprising backing up encrypted items onto at least one database on said at least one remote server for allowing said authenticated user to retrieve and restore said backed up items onto said computer and/or onto another computer.

29. The method of claim 1, further comprising selectively applying encryption to the entire said at least one item, where the link to said at least one remote server is only to facilitate access to an encryption key to complete the encryption process.

30. A computer-implemented method of creating encryption and decryption of a computer file in a computer comprising the steps of:
assigning a key to a user, where the key is utilizable with at least more than one file or item;
retrieving and transmitting identification of said computer automatically upon said computer connecting to a network to at least one remote server;
comparing said computer identification with stored credentials identified for remote deletion for selectively deleting at least encrypted files from said computer if tagged for remote deletion;
receiving a request from a user that an action be performed to at least one item on a computer;
transmitting user credentials to said at least one remote server inputted by said user;
comparing said user credentials with stored credentials at said at least one remote server for authenticating said credentials associated with said user for controlling user requested access;
accessing said key where accessing said key comprises first said user sending an invitation, where said invitation is processed via asynchronous electronic mail service to improve performance, to a second user using said at least one remote server, and said second user accepting the invitation resulting in said user and second user being linked establishing a one-on-one relationship between these two parties;
applying said key assigned to said user that is unique to said user and stored on said remote server;
processing and performing said requested action of said authenticated user; and wherein
asynchronous electronic mail service processing is via validated connections to database queues based on wait times.

31. The method of claim 30, wherein applying said key further comprises retrieving said key, typing said key, and/or sending an invitation to at least one other user using said at least one remote server creating a link between said users.

32. The method of claim 30, further comprising
sending at least one encrypted item of said user electronically to at least one other user;
determining if said user and said at least one other user are linked with one another using said at least one remote server;
retrieving a key of said user if said user and said at least one other user are linked;
applying said key for decrypting said at least one encrypted item;
decrypting said at least one encrypted item; and
displaying said at least one item in human-perceivable form to said at least one other user.

33. The method of claim 30, further comprising said authenticated user retrieving and restoring said backed up items onto another computer of the user.

* * * * *